(12) United States Patent
Egami et al.

(10) Patent No.: US 12,734,612 B2
(45) Date of Patent: Sep. 15, 2026

(54) PROCESSING SYSTEM AND MEASUREMENT MEMBER

(71) Applicant: NIKON CORPORATION, Tokyo (JP)

(72) Inventors: Shigeki Egami, Tokyo (JP); Yosuke Tatsuzaki, Saitama (JP)

(73) Assignee: NIKON CORPORATION, Tokyo (JP)

( * ) Notice: Subject to any disclaimer, the term of this patent is extended or adjusted under 35 U.S.C. 154(b) by 908 days.

(21) Appl. No.: 17/917,802

(22) PCT Filed: Apr. 15, 2020

(86) PCT No.: PCT/JP2020/016604
§ 371 (c)(1),
(2) Date: Oct. 7, 2022

(87) PCT Pub. No.: WO2021/210104
PCT Pub. Date: Oct. 21, 2021

(65) Prior Publication Data
US 2023/0133779 A1 May 4, 2023

(51) Int. Cl.
*B23K 26/36* (2014.01)
*B23K 26/70* (2014.01)

(52) U.S. Cl.
CPC ............ *B23K 26/36* (2013.01); *B23K 26/705* (2015.10)

(58) Field of Classification Search
CPC .............................. B23K 26/36; B23K 26/705
See application file for complete search history.

(56) References Cited

U.S. PATENT DOCUMENTS

2001/0018153 A1 8/2001 Irie
2002/0017509 A1 2/2002 Ishide et al.
2014/0132751 A1* 5/2014 Myoung ................ H10K 71/00 348/95
2014/0209576 A1* 7/2014 Ozbaysal ............. C23C 24/106 219/137 R
2021/0362277 A1* 11/2021 Riechel ................ B23K 26/083

FOREIGN PATENT DOCUMENTS

CN 104400217 A 3/2015
JP H03-184742 A 8/1991
JP H0763923 * 7/1995
(Continued)

OTHER PUBLICATIONS

Oct. 24, 2023, Office Action issued in Japanese Patent Application No. 2022-514927.
(Continued)

*Primary Examiner* — Woody A Lee, Jr.
(74) *Attorney, Agent, or Firm* — Oliff PLC

(57) ABSTRACT

A processing system is a processing system that is configured to process an object by irradiating the object with an energy beam, and includes: a placing apparatus on which the object is placed; an irradiation apparatus that is configured to irradiate the object with the energy beam; and a light reception apparatus that includes: a beam passing member having an attenuation area in which the energy beam is attenuated and a plurality of passing areas through each of which the energy beam is allowed to pass; and a light reception part that is configured to optically receive the energy beam that has passed through the plurality of passing areas.

24 Claims, 28 Drawing Sheets

(56) References Cited

FOREIGN PATENT DOCUMENTS

| | | | |
|---|---|---|---|
| JP | H07-239210 | A | 9/1995 |
| JP | H08-025071 | A | 1/1996 |
| JP | 2001-319871 | A | 11/2001 |
| JP | 2006-289443 | A | 10/2006 |
| JP | 2008-119716 | A | 5/2008 |
| WO | 2019/236616 | A1 | 12/2019 |

OTHER PUBLICATIONS

Jul. 7, 2020 Search Report issued in International Patent Application No. PCT/JP2020/016604.

Jul. 7, 2020 Written Opinion of the International Searching Authority issued in International Patent Application No. PCT/JP2020/016604.

Dec. 6, 2023 Extended European Search Report issued in European Patent Application No. 20930739.6.

Mar. 24, 2025 Office Action issued in Chinese Patent Application No. 202080099822.3.

* cited by examiner

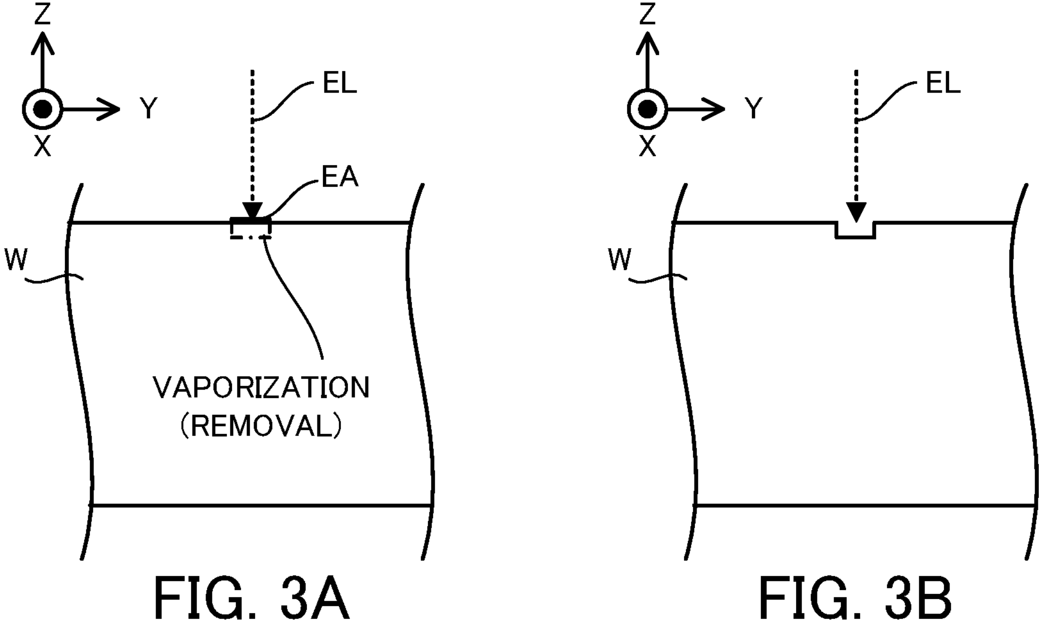
FIG. 3A
FIG. 3B
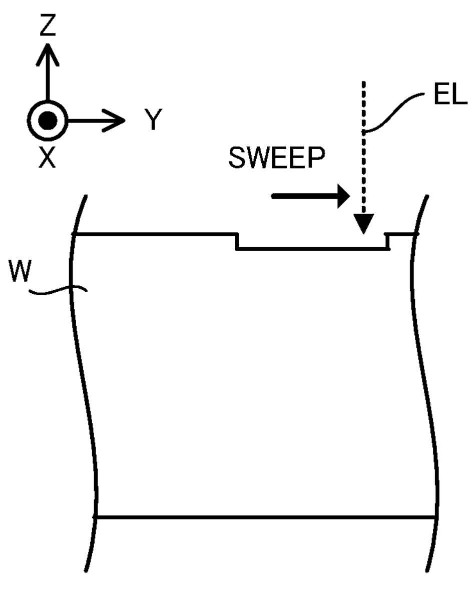
FIG. 3C

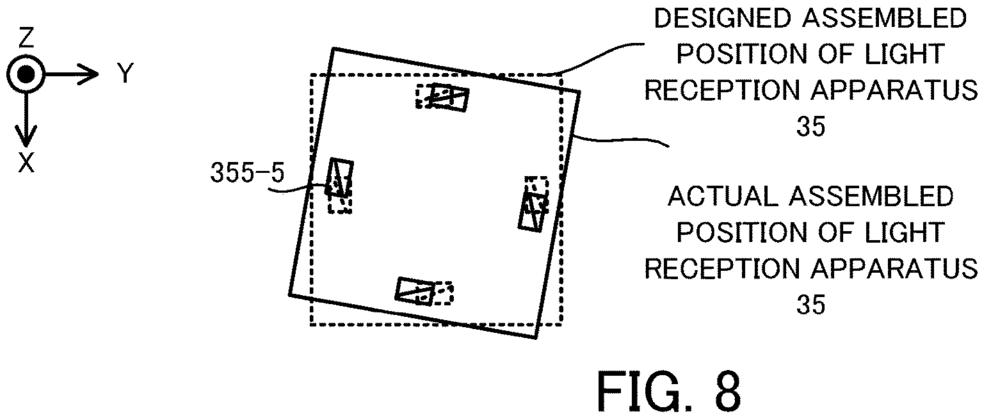
FIG. 8
Z
Y
X
SWEEPING TRAJECTORY OF PROCESSING LIGHT EL
355#11
356-5
355#2
355#12
FIG. 9
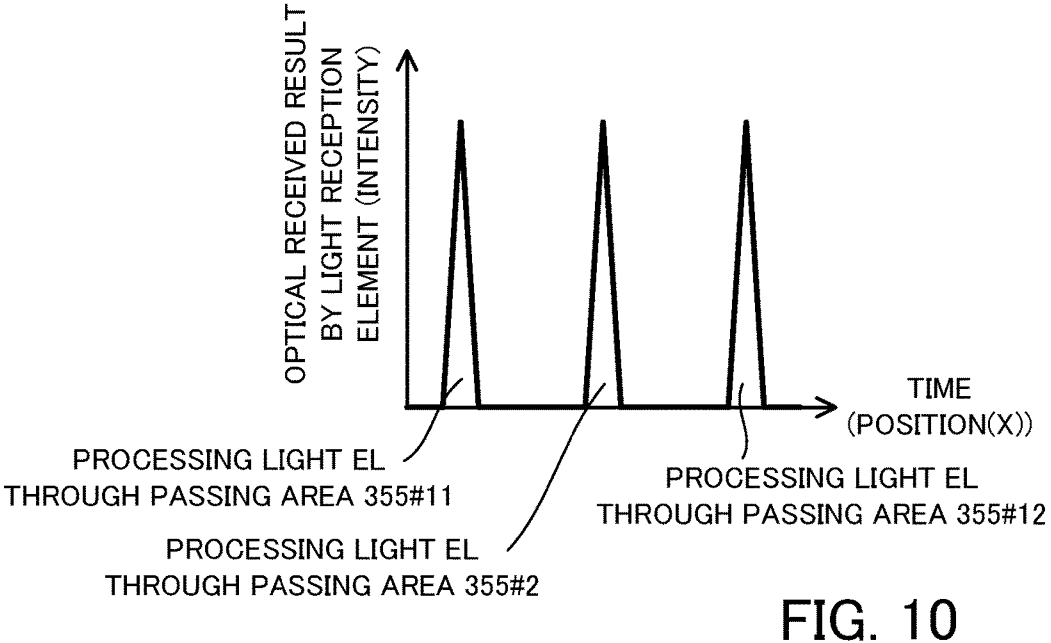
FIG. 10

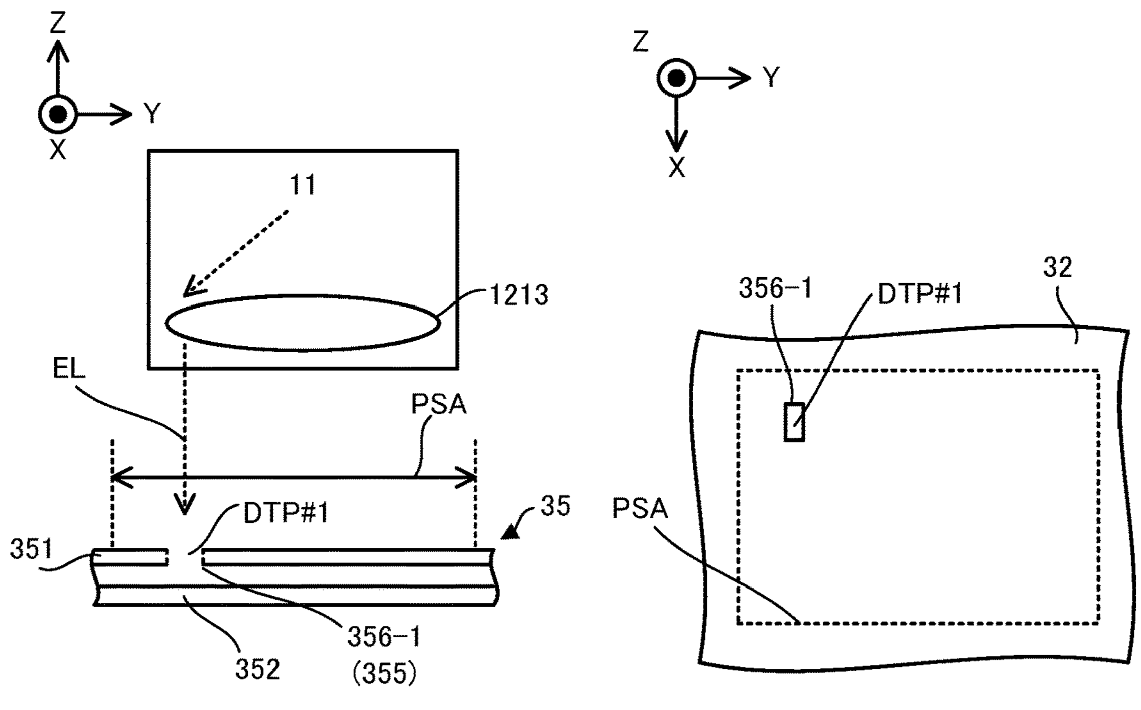
FIG. 18A
FIG. 18B
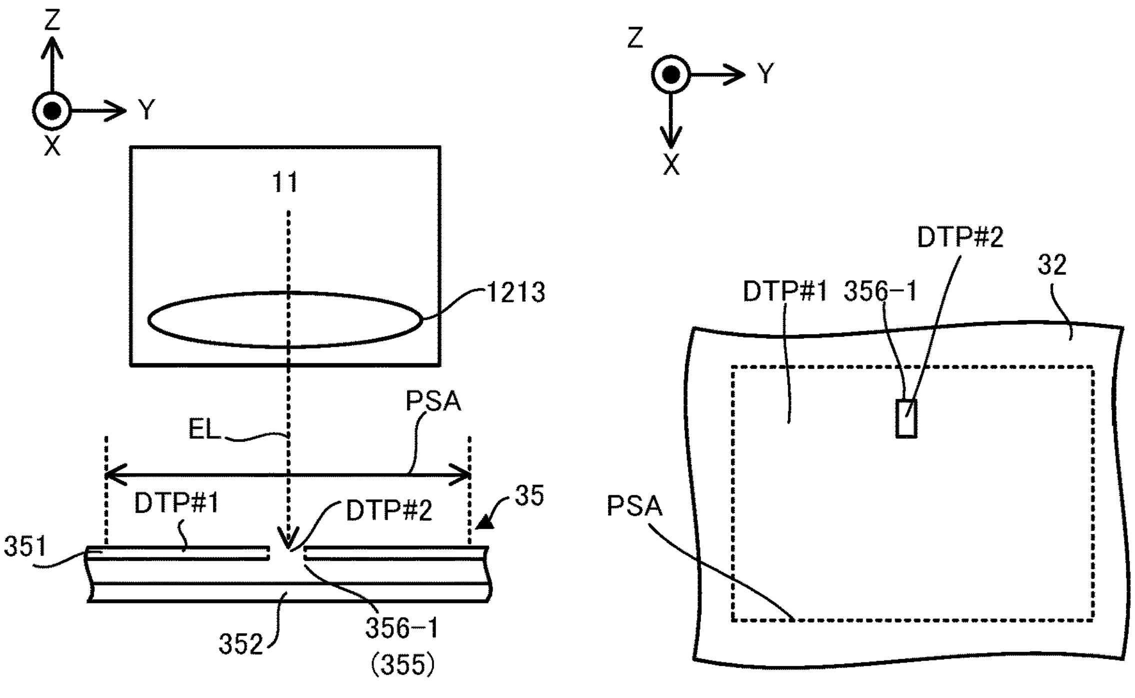
FIG. 19A
FIG. 19B

PROCESSING SYSTEM AND MEASUREMENT MEMBER

TECHNICAL FIELD

The present invention relates to a processing system that is configured to process an object by an energy beam and a measurement member that is used by the processing system.

BACKGROUND ART

A Patent Literature 1 discloses a processing system that is configured to process an object by irradiating the object with an energy beam. This type of processing system is required to properly process the object.

CITATION LIST

Patent Literature

Patent Literature 1: US2002/0017509A1

SUMMARY OF INVENTION

A first aspect provides a processing system that is configured to process an object by irradiating the object with an energy beam, wherein the processing system includes: a placing apparatus on which the object is placed; an irradiation apparatus that is configured to irradiate the object with the energy beam; and a light reception apparatus that includes: a beam passing member having an attenuation area in which the energy beam is attenuated and a plurality of passing areas through each of which the energy beam is allowed to pass; and a light reception part that is configured to optically receive the energy beam that has passed through the plurality of passing areas.

A second aspect provides a measurement member used by a processing system that includes: an irradiation apparatus configured to irradiate an object with an energy beam from a beam source; and a measurement apparatus configured to measure the object by a measurement beam and that is configured to process the object, the measurement member includes: a passing area through which the energy beam propagating toward a light reception part, which is configured to optically receive the energy beam, is allowed to pass; and a mark that is measured by the measurement apparatus and that has a predetermined positional relationship relative to the passing area.

A third aspect provides a processing system that is configured to process an object by irradiating the object with an energy beam, wherein the processing system includes: a placing apparatus on which the object is placed; an irradiation apparatus that is configured to irradiate the object with the energy beam; a light reception apparatus that includes: a beam passing member having an attenuation area in which the energy beam is attenuated and a passing area through which the energy beam is allowed to pass; and a light reception part that is configured to optically receive the energy beam that has passed through the passing area; and a cover member that covers the passing area.

A fourth aspect provides a processing system that is configured to process an object by irradiating the object with an energy beam, wherein the processing system includes: a placing apparatus on which the object is placed; an irradiation apparatus that is configured to irradiate the object with the energy beam; a light reception apparatus that includes a light reception part configured to optically receive the energy beam and at least a part of which is disposed in the placing apparatus; a measurement apparatus that is configured to measure at least one of the object and at least a part of the light reception apparatus; a movement apparatus that is configured to move the placing apparatus; an obtaining apparatus that is configured to obtain an information related to a position of the placing apparatus; and a control apparatus that is configured to control the movement apparatus, the control apparatus is configured to: move the placing apparatus to a measurement allowable position at which the measurement apparatus is allowed to measure at least a part of the light reception apparatus; obtain, by using the obtaining apparatus, a measurement position information related to the position of the placing apparatus that has moved to the measurement allowable position; and control the position of the placing apparatus based on the measurement position information.

A fifth aspect provides a processing system that is configured to process an object by irradiating the object with an energy beam, wherein the processing system includes: a placing apparatus on which the object is placed; an irradiation apparatus that is configured to irradiate the object with the energy beam; a light reception apparatus which includes a light reception part configured to optically receive the energy beam and at least a part of which is disposed in the placing apparatus; a measurement apparatus that is configured to measure at least one of the object and at least a part of the light reception apparatus; a movement apparatus that is configured to move the placing apparatus; an obtaining apparatus that is configured to obtain an information related to the position of the placing apparatus; and a control apparatus that is configured to control the movement apparatus, the control apparatus is configured to: move the placing apparatus to a irradiation allowable position at which the irradiation apparatus is allowed to irradiate at least a part of the light reception apparatus with the energy beam; obtain, by using the obtaining apparatus, an irradiation position information related to the position of the placing apparatus that has moved to the irradiation allowable position; and control the position of the placing apparatus based on the irradiation position information.

BRIEF DESCRIPTION OF DRAWINGS

FIG. 3 Each of FIG. 3A to FIG. 3C is a cross-sectional view that illustrates an aspect of a removal processing performed on a workpiece.

FIG. 8 is a planar view that illustrates the light reception apparatus having an assembly error relative to a stage.

FIG. 9 is a planar view that illustrates a sweeping trajectory of a processing light with which a search mark is irradiated.

FIG. 10 is a graph that illustrates an optical received result of the processing light through the search mark.

FIG. 18A is a cross-sectional view that illustrates a positional relationship between the processing head and the light reception apparatus in a period during which a state detection operation is performed and FIG. 18B is a planar view that illustrates the positional relationship between the processing head and the light reception apparatus in the period during which the state detection operation is performed.

FIG. 19A is a cross-sectional view that illustrates the positional relationship between the processing head and the light reception apparatus in the period during which the state detection operation is performed and FIG. 19B is a planar view that illustrates the positional relationship between the processing head and the light reception apparatus in the period during which the state detection operation is performed.

DESCRIPTION OF EMBODIMENTS

Next, with reference to drawings, an example embodiment of a processing system and a measurement member will be described. In the below described description, the example embodiment of the processing system and the measurement member will be described by using a processing system SYS that is configured to process a workpiece W by using a processing light EL. However, the present invention is not limited to the below described embodiment.

Moreover, in the below described description, a positional relationship of various components that constitute the processing system SYS will be described by using an XYZ rectangular coordinate system that is defined by a X axis, a Y axis and a Z axis that are perpendicular to one another. Note that each of an X axis direction and a Y axis direction is assumed to be a horizontal direction (namely, a predetermined direction in a horizontal plane) and a Z axis direction is assumed to be a vertical direction (namely, a direction that is perpendicular to the horizontal plane, and substantially an up-down direction), for the purpose of simple description, in the below described description. Moreover, rotational directions (in other words, inclination directions) around the X axis, the Y axis and the Z axis are referred to as a OX direction, a OY direction and a OZ direction, respectively. Here, the Z axis direction may be a gravity direction. An XY plane may be a horizontal direction.

(1) Processing System SYSa in First Example Embodiment

Firstly, the processing system SYS in a first example embodiment (in the below described description, the processing system SYS in the first example embodiment is referred to as a "processing system SYSa") will be described.

(1-1) Configuration of Processing System SYSa

Figure 1:
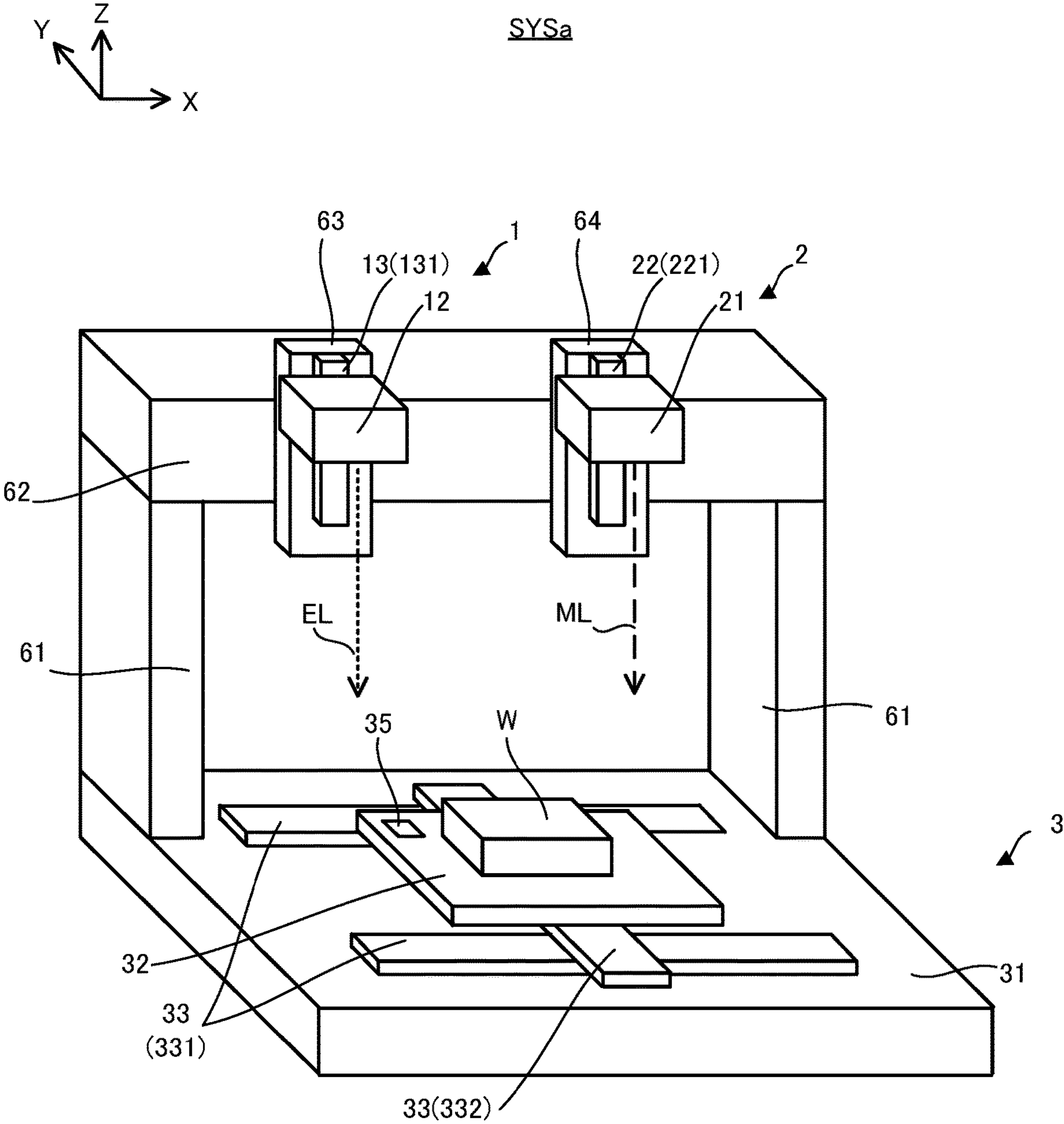
FIG. 1 is a perspective view that conceptionally illustrates an exterior appearance of a processing system in a first example embodiment.
Figure 2:
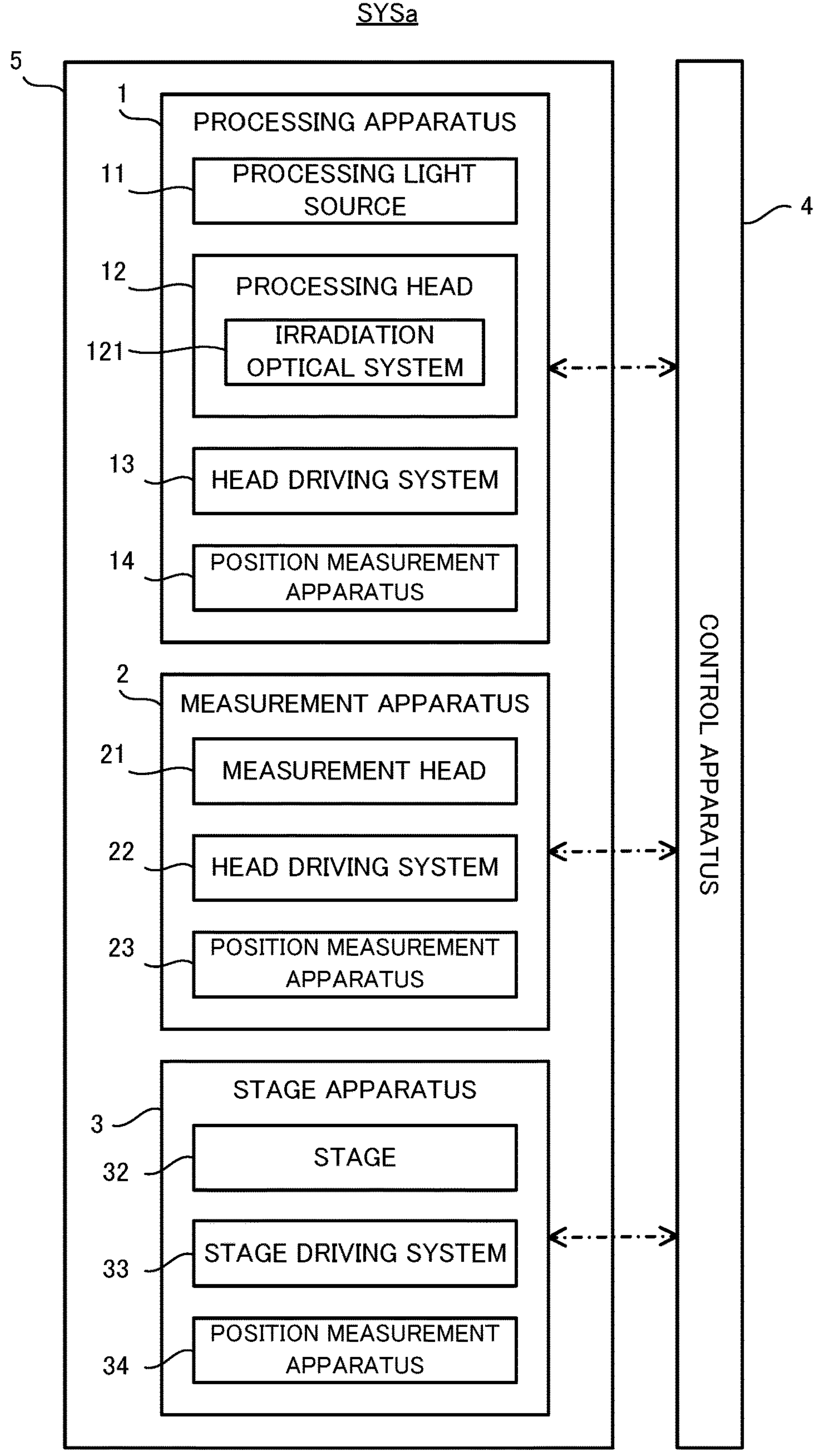
FIG. 2 is a system configuration diagram that illustrates a system configuration of the processing system in the first example embodiment.

Firstly, with reference to FIG. 1 and FIG. 2, a configuration of the processing system SYSa in the first example embodiment will be described. FIG. 1 is a perspective view that conceptionally illustrates an exterior appearance of the processing system SYSa in the first example embodiment. FIG. 2 is a system configuration diagram that illustrates a system configuration of the processing system SYSa in the first example embodiment.

As illustrated in FIG. 1 and FIG. 2, the processing system SYSa includes a processing apparatus 1, a measurement apparatus 2, a stage apparatus 3 and a control apparatus 4. The processing apparatus 1, the measurement apparatus 2 and the stage apparatus 3 are contained in a housing 5. However, the processing apparatus 1, the measurement apparatus 2 and the stage apparatus 3 may not be contained in the housing 5. Namely, the processing system SYSa may not include the housing 5 in which the processing apparatus 1, the measurement apparatus 2 and the stage apparatus 3 are contained.

The processing apparatus 1 is configured to processes the workpiece W under the control of the control apparatus 4. The workpiece W may be a metal, may be an alloy (for example, a duralumin and the like), may be a semiconductor (for example, a silicon), may be a resin, may be a composite material such as a CFRP (Carbon Fiber Reinforced Plastic), may be a glass, may be a ceramic or may be an object that is made from any other material, for example.

The processing apparatus 1 may perform a removal processing for removing a part of the workpiece W by irradiating the workpiece W with the processing light EL. The removal processing may include at least one of a surface processing, a cylindrical processing, a smoothing processing, a cutting-off processing and a carving processing (in other words, a stamp processing) for forming (in other words, carving) any character or any pattern.

Here, with reference to each of FIG. 3A to FIG. 3C, one example of the removal processing using the processing light EL will be described. Each of FIG. 3A to FIG. 3C is a cross-sectional view that illustrates an aspect of the removal processing performed on the workpiece W. As illustrated in FIG. 3A, the processing apparatus 1 irradiates a target irradiation area EA set (in other words, formed) on a surface of the workpiece W with the processing light EL. When the target irradiation area EA is irradiated with the processing light EL, an energy of the processing light EL is transmitted to the target irradiation area EA and a part that is in vicinity of the target irradiation area EA of the workpiece W. When a heat caused by the energy of the processing light EL is transmitted, a material constituting the target irradiation area EA and a part that is in vicinity of the target irradiation area EA of the workpiece W is melted due to the heat caused by the energy of the processing light EL. The melted material spatters as liquid drop. Alternatively, the melted material evaporates due to the heat caused by the energy of the processing light EL. As a result, the target irradiation area EA and a part that is in vicinity of the target irradiation area EA of the workpiece W is removed. Namely, as illustrated in FIG. 3B, a concave part (in other words, a groove part) is formed at the surface of the workpiece W. In this case, it can be said that the processing apparatus 1 processes the workpiece W by using a principle of what we call a thermal processing. Furthermore, the processing apparatus 1 moves the target irradiation area EA on the surface of the workpiece W by using a Galvano mirror 1212 described below. Namely, the processing apparatus 1 sweeps the surface of the workpiece W with the processing light EL. As a result, as illustrated in FIG. 3C, the surface of the workpiece W is partially removed along a sweeping trajectory of the processing light EL (namely, a moving trajectory of the target irradiation area EA). Thus, the processing apparatus 1 appropriately removes a part of the workpiece W on which the removal processing should be performed by sweeping the surface of the workpiece W with the processing light EL along a desired sweeping trajectory corresponding to an area on which the removal processing should be performed.

On the other hand, the processing apparatus 1 may process the workpiece W by using a principle of non-thermal processing (for example, an ablation processing) depending on a characteristic of the processing light EL. Namely, the processing apparatus 1 may perform the non-thermal processing (for example, the ablation processing) on the workpiece W. For example, when a pulsed light an ON time of which is equal to or shorter than pico-second (alternatively, equal to or shorter than nano-second or femto-second in some cases) is used as the processing light EL, the material constituting the target irradiation area EA and a part that is in vicinity of the target irradiation area EA of the workpiece W evaporates and spatters in a moment. Note that the material constituting the target irradiation area EA and a part that is in vicinity of the target irradiation area EA of the workpiece W may be sublimated without being in a melted state when the pulsed light the ON time of which is equal to or shorter than pico-second (alternatively, equal to or shorter than nano-second or femto-second in some cases) is used as the processing light EL. Thus, the concave part (in other words, the groove part) is formed at the surface of the workpiece W while reducing an influence of the heat caused by the energy of the processing light EL to the workpiece W as much as possible.

When the removal processing is performed, the processing apparatus 1 may form a riblet structure on the workpiece W. The riblet structure may be a structure by which a resistance (especially, at least one of a frictional resistance and a turbulent frictional resistance) of the surface of the workpiece W to a fluid is reducible. The riblet structure may include a structure by which a noise, which is generated when the fluid and the surface of the workpiece W relatively move, is reducible. The riblet structure may include a structure in which a plurality of grooves each of which extends along a first direction (for example, the Y axis direction) that is along the surface of the workpiece W are arranged along a second direction (for example, the X axis direction) that is along the surface of the workpiece W and that intersects with the first direction, for example.

When the removal processing is performed, the processing apparatus 1 may form any structure having any shape on the surface of the workpiece W. A structure that generates a swirl relative to a flow of the fluid on the surface of the workpiece W is one example of any structure. A structure for giving a hydrophobic property to the workpiece W is one example of any structure. A fine texture structure (typically, a concave and convex structure) that is formed regularly or irregularly in a micro/nano-meter order is another example of any structure. This fine texture structure may include at least one of a shark skin structure and a dimple structure that has a function of reducing a resistance from a fluid (a liquid and/or a gas). The fine texture structure may include a lotus leaf surface structure that has at least one of a liquid repellent function and a self-cleaning function (for example, has a lotus effect). The fine texture structure may include at least one of a fine protrusion structure that has a liquid transporting function (US2017/0044002A1), a concave and convex structure that has a lyophile effect, a concave and convex structure that has an antifouling effect, a moth eye structure that has at least one of a reflectance reduction function and a liquid repellent function, a concave and convex structure that intensifies only light of a specific wavelength by interference to have a structural color, a pillar array structure that has an adhesion function using van der Waals force, a concave and convex structure that has an aerodynamic noise reduction function, a honeycomb structure that has a droplet collection function, a concave and convex structure that improve an adhesion to a layer formed on the surface and so on.

Again in FIG. 1 and FIG. 2, in order to process the workpiece W, the processing apparatus 1 includes a processing light source 11, a processing head 12, a head driving system 13 and a position measurement apparatus 14.

The processing light source 11 is configured to emit, as the processing light EL, at least one of an infrared light, a visible light, a ultraviolet light and an Extreme ultraviolet light, for example. However, another type of light may be used as the processing light EL. The processing light EL may include a pulsed light (namely, a plurality of pulsed beams). The processing light EL may be a laser light. In this case, the processing light source 11 may include a semiconductor laser such as a laser light source (for example, a Laser Diode (LD)). The laser light source may be a fiber laser, a $CO_2$ laser, a YAG laser, an Excimer laser and the like. However, the processing light EL may not be the laser light. The processing light source 11 may include any light source (for example, at least one of a LED (Light Emitting Diode), a discharge lamp and the like).

Figure 4:
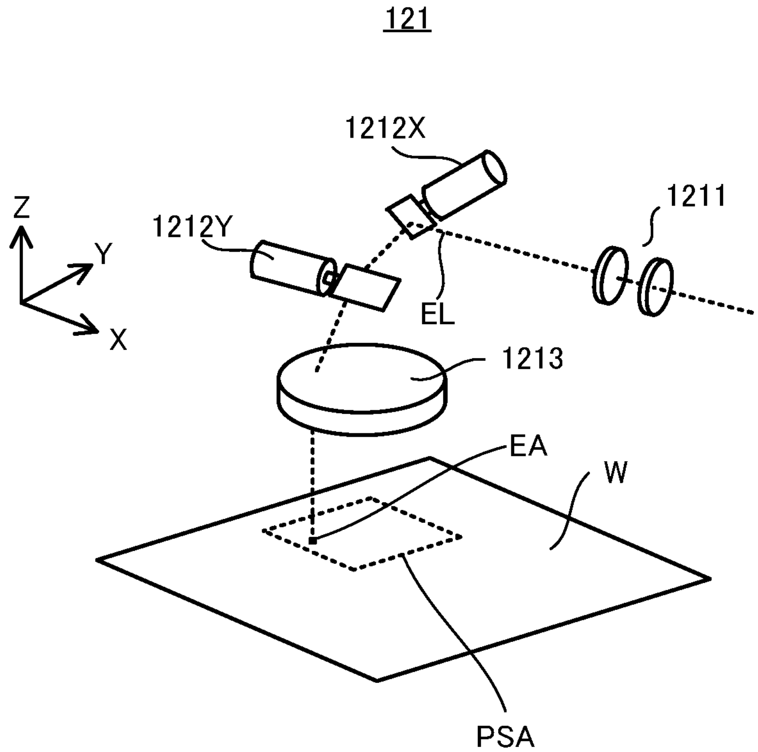
FIG. 4 is a perspective view that conceptionally illustrates a configuration of an irradiation optical system.

The processing head 12 is configured to irradiate the workpiece W with the processing light EL from the processing light source 11. Thus, the processing head 12 may be referred to as an irradiation apparatus. In an example illustrated in FIG. 1, a stage 32 on which the workpiece W is allowed to be placed is disposed below the processing head 12. Thus, the processing head 12 irradiates the workpiece W with the processing light EL by emitting the processing light EL in a downward direction from the processing head 12. In order to irradiate the workpiece W with the processing light EL, the processing head 12 includes a irradiation optical system 121. Next, with reference to FIG. 4, the irradiation optical system 121 will be described. FIG. 4 is a perspective view that conceptionally illustrates a configuration of the irradiation optical system 121.

As illustrated in FIG. 4, the irradiation optical system 121 includes a focus change optical system 1211, the Galvano mirror 1212 and a fθ lens 1213, for example.

The focus change optical system 1211 is an optical member that is configured to change a light concentration position of the processing light EL (namely, a converged position of the processing light EL) along a propagating direction of the processing light EL. Thus, the focus change optical system 1211 may be referred to as a beam converged position change member. The focus change optical system 1211 may include a plurality of lenses that are arranged along the propagating direction of the processing light EL, for example. in this case, the light concentration position of the processing light EL may be changed by moving at least one of the plurality of lenses along its optical axis direction.

The processing light EL that has passed through the focus change optical system 1211 enters the Galvano mirror 1212. The Galvano mirror 1212 changes an emitting direction of the processing light EL from the Galvano mirror 1212 by deflecting the processing light EL (namely, changing an emitting angle of the processing light EL). Thus, the Galvano mirror 1212 may be referred to as an emitting direction change member. When the emitting direction of the processing light EL from the Galvano mirror 1212 is changed, a position at which the processing light EL is emitted from the processing head 12 is changed. When the position at which the processing light EL is emitted from the processing head 12 is changed, an irradiation position of the processing light EL on the surface of the workpiece W is changed. Therefore, the Galvano mirror 1212 is configured to change (namely, is configured to move) the irradiation position of the processing light EL on the surface of the workpiece W by deflecting the processing light EL. Thus, the Galvano mirror 1212 may be referred to as an irradiation position movement member.

The Galvano mirror 1212 includes a X sweeping mirror 1212X and a Y sweeping mirror 1212Y, for example. Each of the X sweeping mirror 1212X and the Y sweeping mirror 1212Y is a movable optical member that is disposed on an optical path of the processing light EL between the processing light source 11 and the fθ lens 1213. Each of the X sweeping mirror 1212X and the Y sweeping mirror 1212Y is tilt angle variable mirror an angle of which is variable relative to the optical path of the processing light EL entering each mirror. The X sweeping mirror 1212X reflects the processing light EL to the Y sweeping mirror 1212Y. The X sweeping mirror 1212X is configured to swing or rotate around a rotational axis along the Y axis direction. Due to the swing or the rotation of the X sweeping mirror 1212X, the surface of the workpiece W is swept with the processing light EL along the X axis direction. Due to the swing or the rotation of the X sweeping mirror 1212X, the target irradiation area EA moves on the surface of the workpiece W along the X axis direction. The Y sweeping mirror 1212Y reflects the processing light EL to the fθ lens 1213. The Y sweeping mirror 1212Y is configured to swing or rotate around a rotational axis along the X axis. Due to the swing or the rotation of the Y sweeping mirror 1212Y, the surface of the workpiece W is swept with the processing light EL along the Y axis direction. Due to the swing or the rotation of the Y sweeping mirror 1212X, the target irradiation area EA moves on the surface of the workpiece W along the Y axis direction.

The Galvano mirror 1212 allows a processing shot area PSA defined with respect to the processing head 12 to be swept with the processing light EL. Namely, the Galvano mirror 1212 allows the target irradiation area EA to move in the processing shot area PSA defined with respect to the processing head 12. Note that the processing shot area PSA indicates an area (in other words, a range) that is processable by the processing apparatus 1 in a state where a positional relationship between the processing head 12 and the workpiece W is fixed (namely, is not changed). Typically, the processing shot area PSA is set to be an area that is same as or narrower than a swept range of the processing light EL that is deflected by the Galvano mirror 1212 in a state where the positional relationship between the processing head 12 and the workpiece W is fixed. When the processing shot area PSA is smaller than a part of the workpiece W that should be processed, an operation for processing a certain part of the workpiece W by sweeping the processing shot area PSA set at the certain part on the workpiece W with the processing light EL and an operation for changing a position of the processing shot area PSA on the workpiece W by changing the positional relationship between the processing head 12 and the workpiece W are repeated.

Incidentally, the irradiation optical system 121 may include any optical member that is configured to deflect the processing light EL (namely, that is configured to change at least one of the emitting direction and the irradiation position of the processing light EL), in addition to or instead of the Galvano mirror 1212. A polygonal mirror having a plurality of reflection surfaces angles of which are different from each other is one example of the optical member. The polygonal mirror is rotatable so as to change an incident angle of the processing light EL with respect to one reflection surface in a period during which the one reflection surface is irradiated with the processing light EL and to switch the reflection surface that is irradiated with the processing light EL between the plurality of reflection surfaces.

The fθ lens 1213 is an optical system that is configured to emit, toward the workpiece W, the processing light EL from the Galvano mirror 1212. Especially, the fθ lens 1213 is an optical element that is configured to condense the processing light EL from the Galvano mirror 1212 on a condensed plane. Thus, the fθ lens 1213 may be referred to as a condensing optical system. The condensed plane of the fθ lens 1213 may be set on the surface of the workpiece W, for example. in this case, the fθ lens 1213 is configured to condense the processing light EL from the Galvano mirror 1212 on the surface of the workpiece W.

Again in FIG. 1 and FIG. 2, the head driving system 13 is configured to move the processing head 12 along at least one of the X axis direction, the Y axis direction, the Z axis direction, the OX direction, the OY direction and the OZ direction. FIG. 1 illustrates an example in which the head driving system 13 moves the processing head 12 along the Z axis direction. In this case, the head driving system 13 may include a Z slide member 131 that extends along the Z axis direction, for example. The Z slide member 131 is disposed at a support frame that is disposed on a below described surface plate 31 through a vibration isolator. The support frame 6 may include: a pair of leg members 61 that are disposed on the surface plate 31 through the vibration isolator and that extends along the Z axis direction; and a beam member 62 that extends along the X axis direction and that is disposed on the pair of the leg members 61 so as to connect upper end parts of the pair of the leg members 61. The Z slide member 131 is disposed at the beam member 62 through a support member 63 that extends along the Z axis direction, for example. The processing head 12 is connected to the Z slide member 131 so that the processing head 12 is movable along the Z slide member 131.

When the processing head 12 moves, a positional relationship between the processing head 12 and the stage 32 (moreover, the workpiece W placed on the stage 32) changes. Therefore, moving the processing head 12 is equivalent to changing the positional relationship between the processing head 12 and each of the stage 32 and the workpiece W.

The position measurement apparatus 14 is configured to measure (in other word, is configured to detect) a position of the processing head 12. The position measurement apparatus 14 may include at least one of an encoder and an interferometer, for example.

The measurement apparatus 2 is configured to measure the workpiece W under the control of the control apparatus 4. In order to measure the workpiece W, the measurement apparatus 2 includes a measurement head 21, a head driving system 22 and a position measurement apparatus 23.

The measurement head 21 is configured to measure the workpiece W under the control of the control apparatus 4. For example, the measurement head 21 may be an apparatus that is configured to measure a state of the workpiece W. The state of the workpiece W may include a position of the workpiece W. The position of the workpiece W may include a position of the surface of the workpiece W. The position of the surface of the workpiece W may include a position of each surface part, which is obtained by segmentalizing the surface of the workpiece W, in at least one of the X axis direction, the Y axis direction and the Z axis direction. The state of the workpiece W may include the shape (for example, a three-dimensional shape) of the workpiece W. The shape of the workpiece W may include the shape of the surface of the workpiece W. The shape of the surface of the workpiece W may include a direction of each surface part (for example, a direction of a normal line of each surface part, and it is substantially equivalent to an inclined amount of each surface part with respect to at least one of the X axis, the Y axis and the Z axis), which is obtained by segmentalizing the surface of the workpiece W, in addition to or instead of the above described position of the surface of the workpiece W. A measurement information related to a measured result by the measurement head 21 is outputted from the measurement head 21 to the control apparatus 4.

The measurement head 21 measures the workpiece W by a unit of a measurement shot area MSA. The measurement shot area MSA indicates an area (in other words, a range) that is measurable by the measurement head 21 in a state where a positional relationship between the measurement head 21 and the workpiece W is fixed (namely, is not changed). Note that the measurement shot area MSA may be referred to as a measurable range or a measurable field.

The measurement head 21 may optically measure the workpiece W. Namely, the measurement head 21 may measure the workpiece W by using any measurement beam such as a measurement light and the like. For example, the measurement head 21 may measure the workpiece W by using a light section method that projects a slit light on the surface of the workpiece W and measures a shape of the projected slit light. For example, the measurement head 21 may measure the workpiece W by using a white light interference method that measures an interference pattern of a white light through the workpiece W and a white light not through the workpiece W. For example, the measurement head 21 may measure the workpiece W by using at least one of a pattern projection method that projects a light pattern on the surface of the workpiece W and measures a shape of the projected pattern, a time of flight method that performs an operation, which emits a light to the surface of the workpiece W and measures a distance to the workpiece W based on an elapsed time until the emitted light returns, at plurality of positions on the workpiece W, a moiré topography method (specifically, a grid irradiation method or a grid projection method), a holography interference method, an auto collimation method, a stereo method, an astigmatism method, a critical angle method, a knife edge method, an interference measurement method and a confocal method. For example, the measurement head 21 may measure the workpiece W by capturing an image of the workpiece W that is illuminated with an illumination light. In any case, the measurement head 21 may include a light source that is configured to emit a measurement light ML (for example, the slit light, the white light or a illumination light) and a light receiver that is configured to optically receive a light (for example, a reflected light of the measurement light) from the workpiece W that is irradiated with the measurement light ML.

The head driving system 22 is configured to move the measurement head 21 along at least one of the X axis direction, the Y axis direction, the Z axis direction, the OX direction, the OY direction and the OZ direction. FIG. 1 illustrates an example in which the head driving system 22 moves the measurement head 21 along the Z axis direction. In this case, the head driving system 22 may include a Z slide member 221 that extends along the Z axis direction, for example. The Z slide member 221 may be disposed at the beam member 62 through a support member 64 that extends along the Z axis direction. The measurement head 21 is connected to the Z slide member 221 so that the measurement head 21 is movable along the Z slide member 221.

When the measurement head 21 moves, a positional relationship between the measurement head 21 and the stage 32 (moreover, the workpiece W placed on the stage 32) changes. Therefore, moving the measurement head 21 is equivalent to changing the positional relationship between the measurement head 21 and each of the stage 32 and the workpiece W.

The position measurement apparatus 23 is configured to measure (in other word, is configured to detect) a position of the measurement head 21. The position measurement apparatus 23 may include at least one of an encoder and an interferometer, for example.

The stage apparatus 3 includes the surface plate 31, the stage, a stage driving system 33, a position measurement apparatus 34 and a light reception apparatus 35.

The surface plate 31 is disposed on a button surface of the housing 5 (alternatively, a support surface such as a floor surface on which the housing 5 is placed). The stage 32 is disposed on the surface plate 31. A non-illustrated vibration isolator that reduces a transmission of vibration from the surface plate 31 to the stage 32 may be disposed between the surface plate 31 and the bottom surface of the housing 5 or the support surface such as the floor surface on which the housing 5 is placed. Moreover, the above described support frame 6 may be disposed on the surface plate 31.

The stage 32 is a placing apparatus on which the workpiece W is placed. The stage 32 may be configured to hold the workpiece W placed on the stage 32. Alternatively, the stage 32 may not be configured to hold the workpiece W placed on the stage 32. In this case, the workpiece W may be placed on the stage 32 without a clamp.

The stage driving system 33 is configured to move the stage 32. Thus, the stage driving system 33 may be referred to as a movement apparatus. When the stage 32 moves, the workpiece W placed on the stage 32 also moves together with the stage 32. Thus, it can be said that the workpiece W is placed on the stage 32 so as to be movable (specifically, movable together with the stage 32). The stage driving system 33 is configured to move the stage 32 along at least one of the X axis direction, the Y axis direction, the Z axis direction, the OX direction, the OY direction and the OZ direction. FIG. 1 illustrates an example in which the stage driving system 33 moves the stage along each of the X axis and the Y axis. In this case, the stage driving system 33 may include a X slide member 331 (two X slide members 331 in the example illustrated in FIG. 1) that extends along the X axis direction and a Y slide member 332 (one Y slide members 332 in the example illustrated in FIG. 1) that extends along the Y axis direction, for example. The two X slide members 331 are disposed on the surface plate 31 so as to be arranged along the Y axis direction. The Y slide member 332 is connected to the two X slide members 331 so as to be movable along the two X slide members 331. The stage 32 is connected to the Y slide member 332 so as to be movable along the Y slide member 332. Incidentally, it can be said that each of the X slide member 331 and the Y slide member 332 is a movement member that moves the stage 32 along a linear direction.

When the stage 32 moves, a positional relationship between each of the stage 32 and the workpiece W and each of the processing head 12 and the measurement head 21 changes. Therefore, moving the stage 32 is equivalent to changing the positional relationship between each of the stage 32 and the workpiece W and each of the processing head 12 and the measurement head 21.

The position measurement apparatus 34 is configured to measure (in other word, is configured to detect) a position of the stage 32. The position measurement apparatus 34 may include at least one of an encoder and an interferometer, for example.

The light reception apparatus 35 includes a light reception part that is configured to optically receive the processing light EL from the processing head 12. Furthermore, the light reception apparatus 35 includes a measurement member that is measurable by the measurement head 21. An optical received result of the processing light EL by the light reception apparatus 35 and a measured result of the light reception apparatus 35 by the measurement head 21 are used to control an operation of the processing system SYSa. Note that a configuration of the light reception apparatus 35 will be described later in detail with reference to FIG. 5 to FIG. 7.

The control apparatus 4 is configured to control the operation of the processing system SYSa. For example, the control apparatus 4 may set a processing condition of the workpiece W and control the processing apparatus 1 and the stage apparatus 3 so that the workpiece W is processed based on the set processing condition.

The control apparatus 4 is configured to control an operation of the processing system SYSa. The control apparatus 4 may include an arithmetic apparatus and a storage apparatus. The arithmetic apparatus may include at least one of a CPU (Central Processing Unit) and a GPU (Graphic Processing Unit), for example. The storage apparatus may include a memory, for example. The control apparatus 4 serves as an apparatus for controlling the operation of the processing system SYSa by means of the arithmetic apparatus executing a computer program. The computer program is a computer program that allows the arithmetic apparatus to execute (namely, to perform) a below described operation that should be executed by the control apparatus 4. Namely, the computer program is a computer program that allows the control apparatus 4 to function so as to make the processing system SYSa execute the below described operation. The computer program executed by the arithmetic apparatus may be recorded in the storage apparatus (namely, a recording medium) of the control apparatus 4, or may be recorded in any recording medium (for example, a hard disk or a semiconductor memory) that is built in the control apparatus 4 or that is attachable to the control apparatus 4. Alternatively, the arithmetic apparatus may download the computer program that should be executed from an apparatus disposed at the outside of the control apparatus 4 through a network interface.

The control apparatus 4 may not be disposed in the processing system SYSa. For example, the control apparatus 4 may be disposed at the outside of the processing system SYSa as a server or the like. In this case, the control apparatus 4 may be connected to the processing system SYSa through a wired and/or wireless network (alternatively, a data bus and/or a communication line). A network using a serial-bus-type interface such as at least one of IEEE1394, RS-232x, RS-422, RS-423, RS-485 and USB may be used as the wired network. A network using a parallel-bus-type interface may be used as the wired network. A network using an interface that is compatible to Ethernet such as at least one of 10-BASE-T, 100BASE-TX or 1000BASE-T may be used as the wired network. A network using an electrical wave may be used as the wireless network. A network that is compatible to IEEE802.1x (for example, at least one of a wireless LAN and Bluetooth (registered trademark)) is one example of the network using the electrical wave. A network using an infrared ray may be used as the wireless network. A network using an optical communication may be used as the wireless network. In this case, the control apparatus 4 and the processing system SYSa may be configured to transmit and receive various information through the network. Moreover, the control apparatus 4 may be configured to transmit an information such as a command and a control parameter to the processing system SYSa through the network. The processing system SYSa may include a reception apparatus that is configured to receive the information such as the command and the control parameter from the control apparatus 4 through the network. The processing system SYSa may include a transmission apparatus that is configured to transmit the information such as the command and the control parameter to the control apparatus 4 through the network (namely, an output apparatus that is configured to output an information to the control apparatus 4). Alternatively, a first control apparatus that is configured to perform a part of the arithmetic processing performed by the control apparatus 4 may be disposed in the processing system SYSa and a second control apparatus that is configured to perform another part of the arithmetic processing performed by the control apparatus 4 may be disposed at an outside of the processing system SYSa.

Note that at least one of an optical disc such as a CD-ROM, a CD-R, a CD-RW, a flexible disc, a MO, a DVD-ROM, a DVD-RAM, a DVD-R, a DVD+R, a DVD-RW, a DVD+RW and a Blu-ray (registered trademark), a magnetic disc such as a magnetic tape, an optical-magnetic disc, a semiconductor memory such as a USB memory, and another medium that is configured to store the program may be used as the recording medium recording therein the computer program that should be executed by the control apparatus 8. Moreover, the recording medium may include a device that is configured to record the computer program (for example, a device for a universal use or a device for an exclusive use in which the computer program is embedded to be executable in a form of at least one of a software, a firmware and the like). Moreover, various arithmetic processing or functions included in the computer program may be realized by a logical processing block that is realized in the control apparatus 8 by means of the control apparatus 8 (namely, a computer) executing the computer program, may be realized by a hardware such as a predetermined gate array (a FPGA, an ASIC) of the control apparatus 8, or may be realized in a form in which the logical process block and a partial hardware module that realizes an partial element of the hardware are combined.

(1-2) Configuration of Light Reception Apparatus 35

Figure 5:
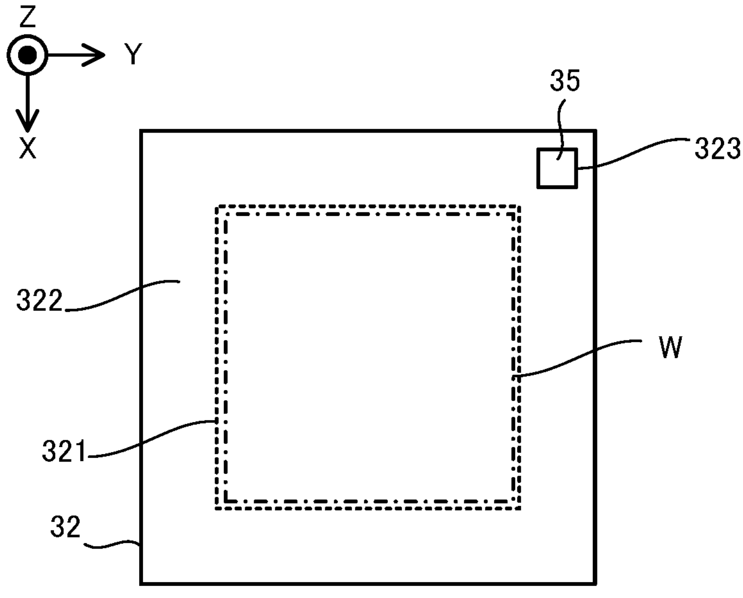
FIG. 5 is a planar view that illustrates a position at which a light reception apparatus is disposed.
Figure 6:
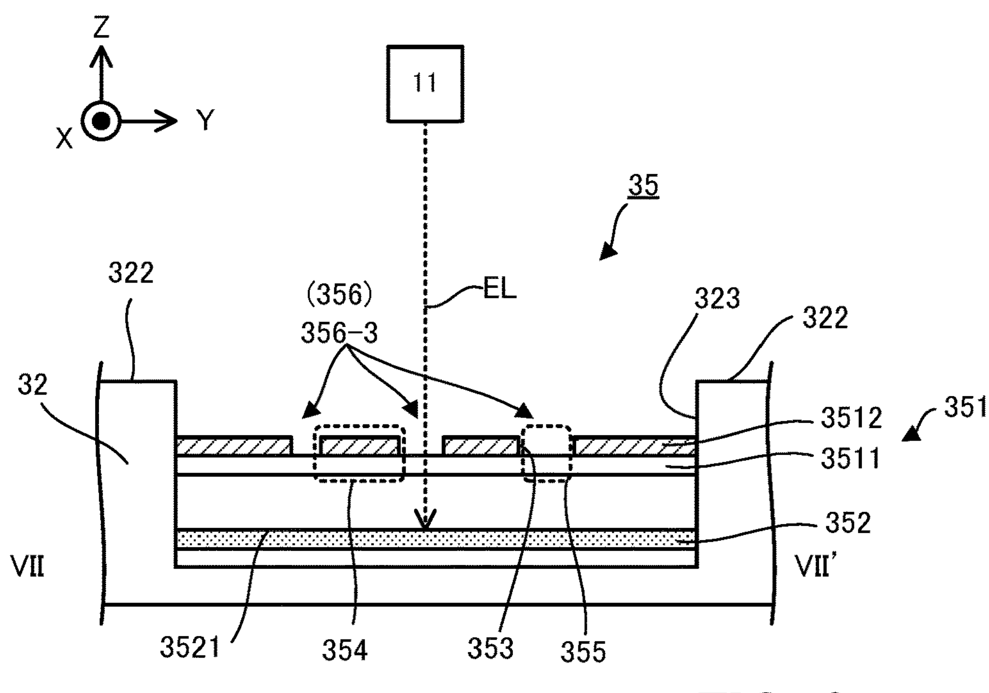
FIG. 6 is a cross-sectional view that illustrates a configuration of the light reception apparatus.
Figure 7:
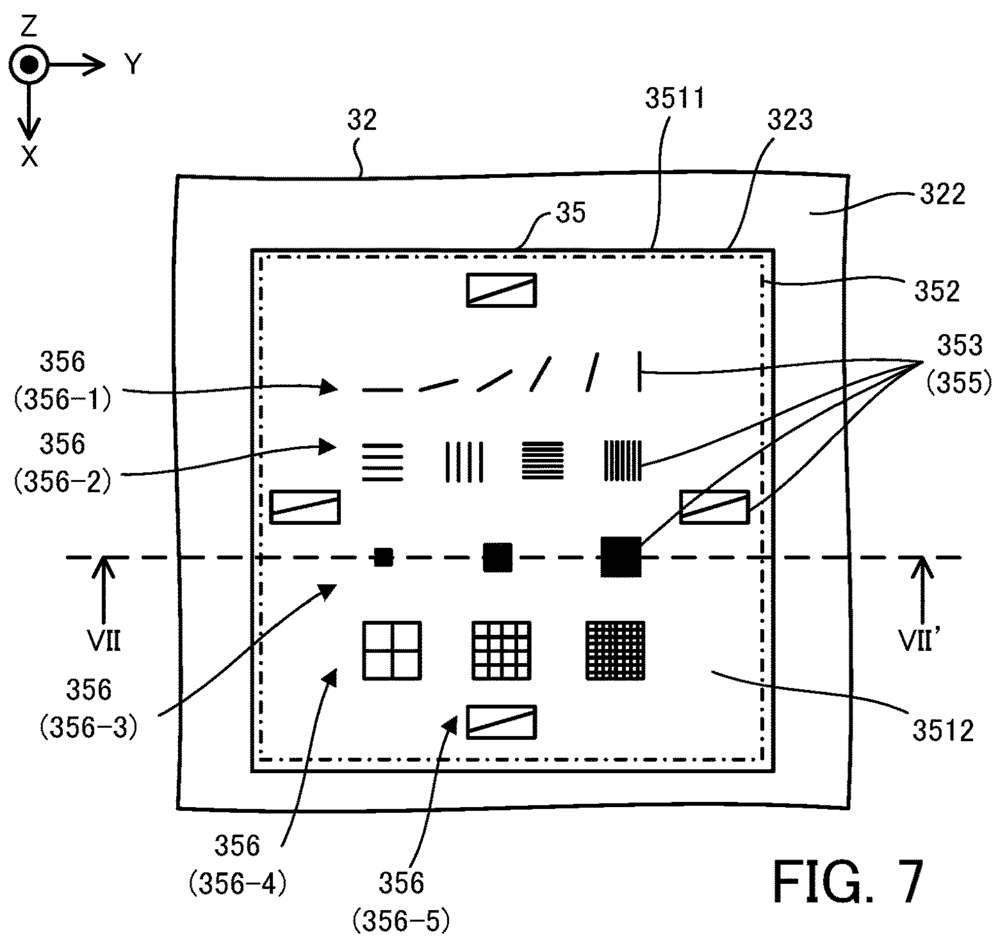
FIG. 7 is a planar view that illustrates a configuration of the light reception apparatus.

Next, with reference to FIG. 5 to FIG. 7, the configuration of the light reception apparatus 35 of the stage 32 will be described. FIG. 5 is a planar view that illustrates a position at which the light reception apparatus 35 is disposed. FIG. 6 is a cross-sectional view that illustrates the configuration of the light reception apparatus 35. FIG. 7 is a planar view that illustrates the configuration of the light reception apparatus 35. Note that FIG. 6 is a VII-VII' cross-sectional view of FIG. 7.

As illustrated in FIG. 5, the light reception apparatus 35 is disposed in the stage 32. The light reception apparatus 35 may be disposed at a position that is different from a placement surface 321 of the stage 32 on which the workpiece W is placed. For example, the light reception apparatus 35 may be disposed at a position on the stage 32 that is away from the placement surface 321 in at least one of the X axis direction and the Y axis direction. For example, the light reception apparatus 35 may be disposed in an outer circumference surface 322 of the stage 32 located at an outside of the placement surface (more specifically, a member of the stage 32 a surface of which is the outer circumference surface 322). However, the light reception apparatus 35 may be placed at the placement surface 321 (more specifically, a member of the stage 32 a surface of which is the placement surface 321). The light reception apparatus 35 may be placed at any position on the stage 32. At least a part of the light reception apparatus 35 may be detachable from the stage 32. Alternatively, the light reception apparatus 35 may be integrated with the stage 32. Moreover, a plurality of light reception apparatuses 35 may be disposed in the stage 32. In this case, one of the plurality of light reception apparatuses 35 may be disposed at an end part in the −X direction and an end part in the +Y direction of the outer circumference surface 322 of the stage 32 illustrated in FIG. 5, another one of the plurality of light reception apparatuses 35 may be disposed at an end part in the +X direction and an end part in the −Y direction of the outer circumference surface 322 of the stage 32. Namely, at least two of the plurality of light reception apparatuses 35 may be disposed at opposite corners of the stage 32. Moreover, the plurality of light reception apparatuses 35 may be disposed at four corners of the stage 42. Note that the stage 32 may be referred to as a table.

As illustrated in FIG. 6, the light reception apparatus 35 includes a beam passing member 351 and a light reception element 352. The beam passing member 351 is a plate-like member along the XY plane. A shape of the beam passing member 351 in the XY plane is a rectangular shape, however, may be any other shape (for example, a circular shape or an oval shape). A size of one side of the beam passing member 351 is a several millimeters to a dozen millimeters, however, may be another size. The light reception element has a light reception surface 3521 that spread along the XY plane. A shape of the light reception surface 3521 in the XY plane is a rectangular shape, however, may be any other shape (for example, a circular shape or an oval shape). A size of one side of the light reception surface 3521 may be equal to the size of one side of the beam passing member 351, may be smaller than the size of one side of the beam passing member 351 and may be larger than the size of one side of the beam passing member 351.

The beam passing member 351 and the light reception element 352 are disposed in a hole 323 (namely, a concave part) formed in the stage 32. Namely, the beam passing member 351 and the light reception element 352 are disposed in the hole 323 that is depressed from the outer circumference surface 322 toward the −Z side. Incidentally, since the light reception apparatus 35 is disposed in the outer circumference surface 322 as described above, the hole 323 is formed at the outer circumference surface 322. However, at least one of the beam passing member 351 and the light reception element 352 may be disposed at a position that is different from the hole 323.

The beam passing member 351 is disposed above the light reception element 352 in the hole 323. Namely, the beam passing member 351 is disposed at a position closer to processing head 12 and the measurement head 21 than the light reception element 352 is. In this case, as illustrated in FIG. 6, a surface of the beam passing member 351 (specifically, a surface facing toward the processing head 12 and measurement head 21 side, and the surface at the +Z side) may be located below the outer circumference surface 322 (namely, the surface of the stage 32). In this case, the light reception apparatus 35 does not protrude from the surface of the stage 32, and thus, there is a smaller possibility that the workpiece W placed on the stage 32 accidentally contacts with the light reception apparatus 35 (especially, the beam passing member 351). As a result, there is a smaller possibility that the beam passing member 351 is damaged or contaminated due to the contact between the workpiece W and the beam passing member 351. However, the surface of the beam passing member 351 may be located at a same height as the outer circumference surface 322 or may be located above the outer circumference surface 322.

The beam passing member 351 includes a glass substrate 3511 and an attenuation film 3512 that is formed on at least a part of a surface of the glass substrate 3511. The attenuation film 3512 is a member that is configured to attenuate the processing light EL entering the attenuation film 3512. Note that "the attenuation of the processing light EL by the attenuation film 3512" in the first example embodiment may include not only allowing an intensity of the processing light EL that has passed through the attenuation film 3512 to be lower than an intensity of the processing light EL entering the attenuation film 3512 but also shielding (namely, blocking) the processing light EL entering the attenuation film 3512. Therefore, when the processing light EL enters the attenuation film 3512, the processing light EL that has been attenuated by the attenuation film 3512 enters the light reception element 352 through the attenuation film 3512 or the processing light EL does not enter the light reception element 352 because of the attenuation film 3512 shielding the processing light EL. Note that the attenuation film 3512 may be formed by a chromium film or a chromium oxide film.

At least one aperture 353 is formed in the attenuation film 3512. In an example illustrated in FIG. 6, a plurality of apertures 353 are formed in the attenuation film 3512. The aperture 353 is a through hole that penetrates the attenuation film 3512 in the Z axis direction. Thus, when the processing light EL enters the aperture 353 formed in the attenuation film 3512, the processing light EL passes through the beam passing member 351 through the aperture 353. Namely, the processing light EL is not attenuated or shielded by the attenuation film 3512 to enter the light reception element 352 through the aperture 353.

In this manner, a part of the glass substrate 3511 on which the attenuation film 3512 is formed (namely, a part at which the aperture 353 is not formed) serves as an attenuation area 354 in which the processing light EL is attenuated. On the other hand, a part of the glass substrate 3511 on which the attenuation film 3512 is not formed (namely, a part at which the aperture 353 is formed) serves as a passing area 355 through which the processing light EL is allowed to pass. In this case, the passing area 355 does not attenuate the processing light EL passing through the passing area 355. However, the passing area 355 may attenuate the processing light EL passing through the passing area 355. Namely, the passing area 355 may not be an area through which all (namely, 100%) of the processing light EL entering the passing area 355 passes, and may be an area through which a part of the processing light EL entering the passing area 355 passes. However, an attenuation rate of the attenuation rate by the passing area 355 is smaller than an attenuation rate of the attenuation rate by the attenuation area 354. The attenuation area 354 is typically disposed to be adjacent to the passing area 355. Namely, the attenuation area 354 is disposed between the plurality of passing areas 355 that are formed by the plurality of apertures 353, respectively. The plurality of passing areas 355 are disposed in the attenuation area 354. Incidentally, when the surface of the beam passing member 351 is located below the outer circumference surface 322 (namely, the surface of the stage 32) as described above, a part of the beam passing member 351 that serves as the attenuation area 354 and a part of the beam passing member 351 that serves as the passing area 355 are also located below the outer circumference surface 322 (namely, the surface of the stage 32).

At least one of the plurality of passing areas 355, which are formed by the plurality of apertures 353, respectively, may form a mark (namely, a pattern) 356 having a predetermined shape in a plane (typically, the XY plane) along the surface of the attenuation film 3512. This mark 356 is measured by the measurement head 21. Therefore, the beam passing member 351 in which the mark 356 that is measurable by the measurement head 21 is formed may be referred to as a measurement member.

For example, as illustrated in FIG. 7, a slit mark 356-1 that is one example of the mark 356 may be formed in the beam passing member 351. The slit mark 356-1 is a mark that is formed by the passing area 355 having a single linear shape (for example, a slit-like shape) in the plane along the surface of the attenuation film 3512. A length (namely, a size in a longitudinal direction) of the linear passing area 355 forming the slit mark 356-1 is 0.1 mm to 1 mm, for example, however, may be another length. A width (namely, a size in a short direction) of the linear passing area 355 forming the slit mark 356-1 is several μm, for example, however, may be another width. In an example illustrated in FIG. 7, a plurality of slit marks 356-1 that intersect with each of the X axis and the Y axis by different angles, respectively are formed in the beam passing member 351. In the example illustrated in FIG. 7, the plurality of slit marks 356-1 are arranged along the Y axis direction, however, the plurality of slit marks 356-1 may be formed at any position. However, the single slit mark 356-1 may be formed in the beam passing member 351.

For example, as illustrated in FIG. 7, a fine mark 356-2 that is one example of the mark 356 may be formed in the beam passing member 351. The fine mark 356-2 is a mark that is formed by the plurality of linear passing areas 355 each of which extends along one direction and which are arranged along another direction intersecting with the one direction. A length (namely, a size in a longitudinal direction) of the linear passing area 355 forming the fine mark 356-2 is 0.1 mm to 1 mm, for example, however, may be another length. A width (namely, a size in a short direction)

of the linear passing area 355 forming the fine mark 356-2 is several μm, for example, however, may be another width. A plurality of fine marks 356-2 between which an extending direction of the linear passing area 355 is different may be formed in the beam passing member 351. For example, as illustrated in FIG. 7, the fine mark 356-2 that is formed by the plurality of linear passing areas 355 each of which extends along the Y axis direction and which are arranged along X axis direction and the fine mark 356-2 that is formed by the plurality of linear passing areas 355 each of which extends along the X axis direction and which are arranged along Y axis direction may be formed in the beam passing member 351. Moreover, a plurality of fine marks 356-2 between which an arrangement pitch of the plurality of linear passing areas 355 (namely, an interval between adjacent two passing areas 355) is different may be formed in the beam passing member 351. For example, as illustrated in FIG. 7, the fine mark 356-2 that is formed by the plurality of linear passing areas 355 the arrangement pitch of which is a first pitch and the fine mark 356-2 that is formed by the plurality of linear passing areas 355 the arrangement pitch of which is a second pitch that is smaller than the first pitch may be formed in the beam passing member 351. In the example illustrated in FIG. 7, the plurality of fine marks 356-2 are arranged along the Y axis direction, however, the plurality of fine marks 356-2 may be formed at any position. However, the single fine mark 356-2 may be formed in the beam passing member 351.

For example, as illustrated in FIG. 7, a rectangular mark 356-3 that is one example of the mark 356 may be formed in the beam passing member 351. The rectangular mark 356-3 is a mark that is formed by the passing area 355 having a rectangular shape in a plane along the surface of the attenuation film 3512. A size of the rectangular-shaped passing area 355 forming the rectangular mark 356-3 is 0.1 μm to several dozen μm, for example, however, may be another length. A plurality of rectangular marks 356-3 between which the size (for example, the size in at least one of the X axis direction and the Y axis direction) of the passing area 355 is different may be formed in the beam passing member 351. In the example illustrated in FIG. 7, the plurality of rectangular marks 356-3 are arranged along the Y axis direction, however, the plurality of rectangular marks 356-3 may be formed at any position. However, the single rectangular mark 356-3 may be formed in the beam passing member 351.

For example, as illustrated in FIG. 7, a cross mark 356-4 that is one example of the mark 356 may be formed in the beam passing member 351. The cross mark 356-4 is a mark that is formed by the plurality of linear passing areas 355 each of which extends along a first direction and which are arranged along a second direction intersecting with the first direction and the plurality of linear passing areas 355 each of which extends along a third direction intersecting with the first direction and which are arranged along a fourth direction intersecting with the third direction. In an example illustrated in FIG. 7, the cross mark 356-4 is a mark that is formed by the plurality of linear passing areas 355 each of which extends along the X axis direction and which are arranged along the Y axis direction and the plurality of linear passing areas 355 each of which extends along the Y axis direction and which are arranged along the X axis direction. In this case, the cross mark 356-4 may be regarded as a grid mark. A width (namely, a size in a short direction) of the linear passing area 355 forming the cross mark 356-4 is several μm to several dozen μm, for example, however, may be another width. A size (namely, a size in at least one of the X axis direction and the Y axis direction) of the cross mark 356-4 is 0.1 mm to several mm, for example, however, may be another size. A plurality of cross marks 356-4 between which an arrangement pitch of the plurality of linear passing areas 355 (namely, an interval between adjacent two passing areas 355) is different may be formed in the beam passing member 351. When the cross mark 356-4 is the grid mark, a change of the arrangement pitch of the plurality of linear passing areas 355 result in a change of the number of the grid formed by the cross marks 356-4. Thus, the plurality of cross marks 356-4 between which the number of the grid is different may be formed in the beam passing member 351. In the example illustrated in FIG. 7, the plurality of cross marks 356-4 are arranged along the Y axis direction, however, the plurality of cross marks 356-4 may be formed at any position. However, the single cross mark 356-4 may be formed in the beam passing member 351.

For example, as illustrated in FIG. 7, a search mark 356-5 that is one example of the mark 356 may be formed in the beam passing member 351. The search mark 356-5 is a mark that is formed by two first linear passing areas 355 each of which extends along a fifth direction and which are away from each other along a sixth direction perpendicular to the fifth direction and a second linear passing area 355 that extends along a seventh direction inclined with respect to (namely, obliquely intersecting with) the fifth direction. In an example illustrated in FIG. 7, the search mark 356-5 is a mark that is formed by the two first linear passing areas 355 each of which extends along the Y axis direction and which are away from each other along the X axis direction and the second linear passing area 355 that is disposed between the two first linear passing areas and that extends along a direction inclined with respect to the Y axis direction. In this case, the search mark 356-5 may be regarded as a grid mark. A length (namely, a size in a longitudinal direction) of the first linear passing area 355 forming the search mark 356-5 is 0.1 mm to 1 mm, for example, however, may be another length. A width (namely, a size in a short direction) of the linear passing area 355 forming the search mark 356-5 is several μm, for example, however, may be another width. A size (namely, a size in at least one of the X axis direction and the Y axis direction) of the search mark 356-5 is 0.1 mm to several mm, for example, however, may be another size. A distance between the two first linear passing areas 355 forming the search mark 356-5 is 0.1 mm to 1 mm, for example, however, may be another distance. An angle between the first linear passing area 355 and the second linear passing area 355, which is inclined with respect to the first linear passing area 355, is 10 degree to 20 degree (for example, 15 degree), for example, however, may be another angle. In the example illustrated in FIG. 7, the plurality of search marks 356-5 are formed around other marks 356 other than the search marks 356-4, however, the plurality of search marks 356-5 may be formed at any position.

The light reception element 352 is a light reception part that is configured to optically receive (for example, is configured to detect) the processing light EL, which enters the light reception element 352 through the passing area 355 (namely, the aperture 353), by the light reception surface 3521. The light reception element 352 is a light reception part that is configured to optically receive the processing light EL, which has passed through the passing area 355 (namely, the aperture 353), by the light reception surface 3521. A photoelectric converter that is configured to photoelectric-converts the received processing light EL is one example of the light reception part.

The light reception element 352 is configured to optically receive, by the light reception surface 3521, the processing light EL entering the light reception element 352 through each of the plurality of passing areas 355. Note that the light reception surface 3521 may be formed by one photoelectric conversion surface of a photoelectric conversion element. For example, the light reception element 352 may be configured to optically receive, by a first part of the light reception surface 3521, the processing light EL entering the light reception element 352 through a first passing area 355 (for example, the passing area 355 forming one slit mark 356-1). For example, the light reception element 352 may be configured to optically receive, by a second part of the light reception surface 3521, the processing light EL entering the light reception element 352 through a second passing area 355 (for example, the passing area 355 forming another slit mark 356-1 different from the one slit mark 356-1). For example, the light reception element 352 may be configured to optically receive, by a third part of the light reception surface 3521, the processing light EL entering the light reception element 352 through a third passing area 355 (for example, the passing area 355 forming one fine mark 356-2). In this manner, in the first example embodiment, the light reception apparatus 35 may not include a plurality of light reception elements 352 that correspond to the plurality of passing areas 355, respectively. The light reception apparatus 35 may include the light reception element 352 common to the plurality of passing areas 355. However, the light reception apparatus 35 may include the plurality of light reception elements 352 that correspond to the plurality of passing areas 355, respectively.

When the light reception element 352 optically receives the processing light through the passing area 355, the light concentration position of the processing light EL may be set on or near the passing area 355 of the beam passing member 351. On the other hand, when the workpiece W is processed by the processing light EL, the light concentration position of the processing light EL may be set on or near the surface of the workpiece W. Thus, the control apparatus 4 may set the light concentration position of the processing light EL at a proper position by using the focus change optical system 1211. In this case, the control apparatus 4 may control the light concentration position of the processing light EL based on an information related to a distance (especially, a distance in the Z axis direction corresponding to the propagating direction of the processing light EL) between a front surface of the stage 32 (for example, the placement surface 321 or the outer circumference surface 322) and the light reception surface 3521. For example, a state of the processing system SYSa is switched between a state where the workpiece W is processed by the processing light EL and a state where the light reception element 352 optically receives the processing light EL through the passing area 355, the control apparatus 4 may move the light concentration position of the processing light EL by a change amount that is determined based on the distance between the front surface of the workpiece W (for example, the placement surface 321 or the outer circumference surface 322) and the light reception surface 3521

Considering that the workpiece W is processed by the irradiation of the processing light EL, there is a possibility that at least a part of the light reception apparatus 35 is also processed (substantially, damaged) by the irradiation of the processing light EL. Thus, the intensity (for example, an energy amount per unit area in a plane intersecting with the propagating direction of the processing light EL) of the processing light EL may be controlled so that the intensity (for example, an energy amount per unit area in the light reception surface 3521 of the light reception element 352) of the processing light EL with which the light reception apparatus 35 is irradiated is lower than the intensity (for example, an energy amount per unit area in the surface of the workpiece W) of the processing light EL with which the workpiece W is irradiated to process the workpiece W. In this case, the intensity of the processing light EL may be reduced by controlling the processing light source 11 itself, and the intensity of the processing light EL may be reduced by controlling an attenuation member (not illustrated) that is disposed at an emitting side of the processing light source 11.

The optical received result by the light reception element 352 includes an information related to a state of the processing light EL that has entered the light reception element 352. For example, the optical received result by the light reception element 352 includes an information related to an intensity (specifically, an intensity in to plane intersecting with the XY plane) of the processing light EL that has entered the light reception element 352. More specifically, the optical received result by the light reception element 352 includes an information related to an intensity distribution of the processing light EL in a plane along the XY plane. The optical received result by the light reception element 352 is outputted to the control apparatus 4.

In addition, when the mark 356 is measured by the measurement head 21 as described above, a measured result of the mark 356 by the measurement head 21 is outputted to the control apparatus 4.

The control apparatus 4 controls the processing system SYSa (for example, at least one of the processing apparatus 1, the measurement apparatus 2 and the stage apparatus 3) based on at least one of the optical received result of the processing light EL by the light reception element 352 and the measured result of the mark 356 by the measurement head 21 so that the processing system SYSa properly processes the workpiece W. Namely, the processing system SYSa controls the processing system SYSa (for example, at least one of the processing apparatus 1, the measurement apparatus 2 and the stage apparatus 3) by using the light reception apparatus 35 so that the processing system SYSa properly processes the workpiece W. Next, a use case of the light reception apparatus 35 used to control the processing system SYSa will be described.

(1-2) Use Case of Light Reception Apparatus 35

In one example embodiment, for example, the control apparatus 4 may perform, based on the optical received result of the processing light EL through the passing area 355 forming the search mark 356-5, an assembly error measurement operation for measuring an assembly error of the light reception apparatus 35 relative to the stage 32. For example, the control apparatus 4 may perform, based on the optical received result of the processing light EL through the passing area 355 forming the slit mark 356-1, a focus control operation for controlling the light concentration position of the processing light EL. For example, the control apparatus 4 may perform, based on the optical received result of the processing light EL through the passing area 355 forming the fine mark 356-2 and the measured result of the cross mark 356-4 by the measurement head 21, a B-CHK operation (a baseline measurement operation) for measuring a distance (what we call a baseline) between an apparatus origin point AO of the processing system SYSa and each of a processing origin point PO and a measurement origin point MO. For example, the control apparatus 4 may perform, based on the optical received result of the processing light EL through the passing area 355 forming the slit mark 356-1, a light state control operation for reducing an influence of a variation of a state (for example, a beam profile) of the processing light EL with which the surface of the workpiece W is swept. For example, the control apparatus 4 may perform, based on the optical received result of the processing light EL through the passing area 355 forming the slit mark 356-1, a Galvano control operation for controlling the Galvano mirror 1212 so as to reduce an influence of a temperature drift that is one of phenomenon that the irradiation position of the processing light EL varies in a plane along the XY plane due to a temperature (namely, a heat) of the Galvano mirror 1212.

The control apparatus 4 may perform at least a part of these operations (for example, the assembly error measurement operation, the focus control operation, the B-CHK operation, the light state control operation and the Galvano control operation) before starting to irradiate the workpiece W with the processing light EL in order to perform the above described removal processing. The control apparatus 4 may perform at least a part of these operations after finishing irradiating the workpiece W with the processing light EL in order to perform the above described removal processing. The control apparatus 4 may perform at least a part of these operations in at least a part of a period during which the workpiece W is irradiated with the processing light EL in order to perform the above described removal processing.

Next, the assembly error measurement operation, the focus control operation, the B-CHK operation, the light state control operation and the Galvano control operation will be described in order.

(1-2-1) Assembly Error Measurement Operation

Firstly, with reference to FIG. 8, the assembly error of the light reception apparatus 35 relative to the stage 32 will be described. FIG. 8 is a planar view that illustrates the light reception apparatus 35 having the assembly error relative to the stage 32.

As illustrated in FIG. 7, there is a possibility that the light reception apparatus 35 is assembled in a position that is different from an ideal assembly position (namely, a designed assembly position). For example, there is a possibility that the light reception apparatus 35 is assembled in a position that is away from the ideal assembly position along the X axis direction. For example, there is a possibility that the light reception apparatus 35 is assembled in a position that is away from the ideal assembly position along the Y axis direction. For example, there is a possibility that the light reception apparatus 35 is assembled in a position that is away from the ideal position along the θZ axis direction (namely, a position that is rotated around the Z axis from the ideal assembly position).

The control apparatus 4 obtains the optical received result of the processing light through the passing area 355 forming the search mark 356-5 in order to measure the assembly error of the light reception apparatus 35. Specifically, the control apparatus 4 controls the stage driving system 33 to move the stage 32 to a position at which the processing head 12 is capable of irradiating one search mark 356-5 of the plurality of search marks 356-5 with the processing light EL when the light reception apparatus 35 is assembled in the ideal assembly position. Namely, the control apparatus 4 moves the stage 32 so that one search mark 356-5 is located in the processing shot area PSA. In this case, the control apparatus 4 may move the processing head 12 in addition to or instead of the stage 32. Then, the control apparatus 4 controls the processing head 12 to irradiate the one search mark 356-5 with the processing light EL. In this case, as illustrated in FIG. 9 that is a planar view illustrating a sweeping trajectory of the processing light EL with which the search mark 356-5 is irradiated, the control apparatus 4 sweeps the search mark 356-5 with the processing light EL along a direction intersecting with the three linear passing areas 355 forming the search mark 356-5 so that the three linear passing areas 355 forming the search mark 356-5 are irradiated with the processing light EL in order. Namely, the irradiation area of the processing light EL on the beam passing member 351 in which the search mark 356-5 is formed (namely, a position of the processing light EL relative to the beam passing member 351) changes along a direction in which the three linear passing areas 355 forming the search mark 356-5 are arranged. Specifically, as described above, the search mark 356-5 is formed by the two first linear passing areas 355 (passing areas 355 #11 and 355 #12 in an example illustrated in FIG. 9) each of which extends along the Y axis direction and which are away from each other along the X axis direction and the second linear passing area 355 (a passing area 355 #2 in the example illustrated in FIG. 9) that extends along the direction inclined with respect to the Y axis direction. In this case, the control apparatus 4 sweeps the search mark 356-5 with the processing light EL along the X axis direction in which the passing areas 355 #11, 355 #2 and 355 #12 are arranged so that the passing areas 355 #11, 355 #2 and 355 #12 are irradiated with the processing light EL in order. In this case, the light reception element 352 optically receives the processing light EL through the passing area 355 #11, the processing light EL through the passing area 355 #2 and the processing light EL through the passing area 355 #12 in order. As a result, as illustrated in FIG. 10 that is a graph illustrating the optical received result of the processing light EL through the search mark 356-5, the optical received result of the processing light EL obtained from the light reception element 352 by the control apparatus 4 include a light reception signal in which a pulse waveform corresponding to the processing light EL through the passing area 355 #11, a pulse waveform corresponding to the processing light EL through the passing area 355 #2 and a pulse waveform corresponding to the processing light EL through the passing area 355 #12 appears in order. Namely, the optical received result of the processing light EL obtained from the light reception element 352 by the control apparatus 4 include the light reception signal indicating that the intensity of the processing light EL in a period during which the passing area 355 is irradiated with at least a part of the processing light EL is higher than the intensity of the processing light EL in a period during which the passing area 355 is not irradiated with the processing light EL. Here, it is preferable that a control signal for the Galvano mirror 1212 be synchronized with the light reception signal of the light reception element 352.

Figures 11A, 11B, 11C, 11D:
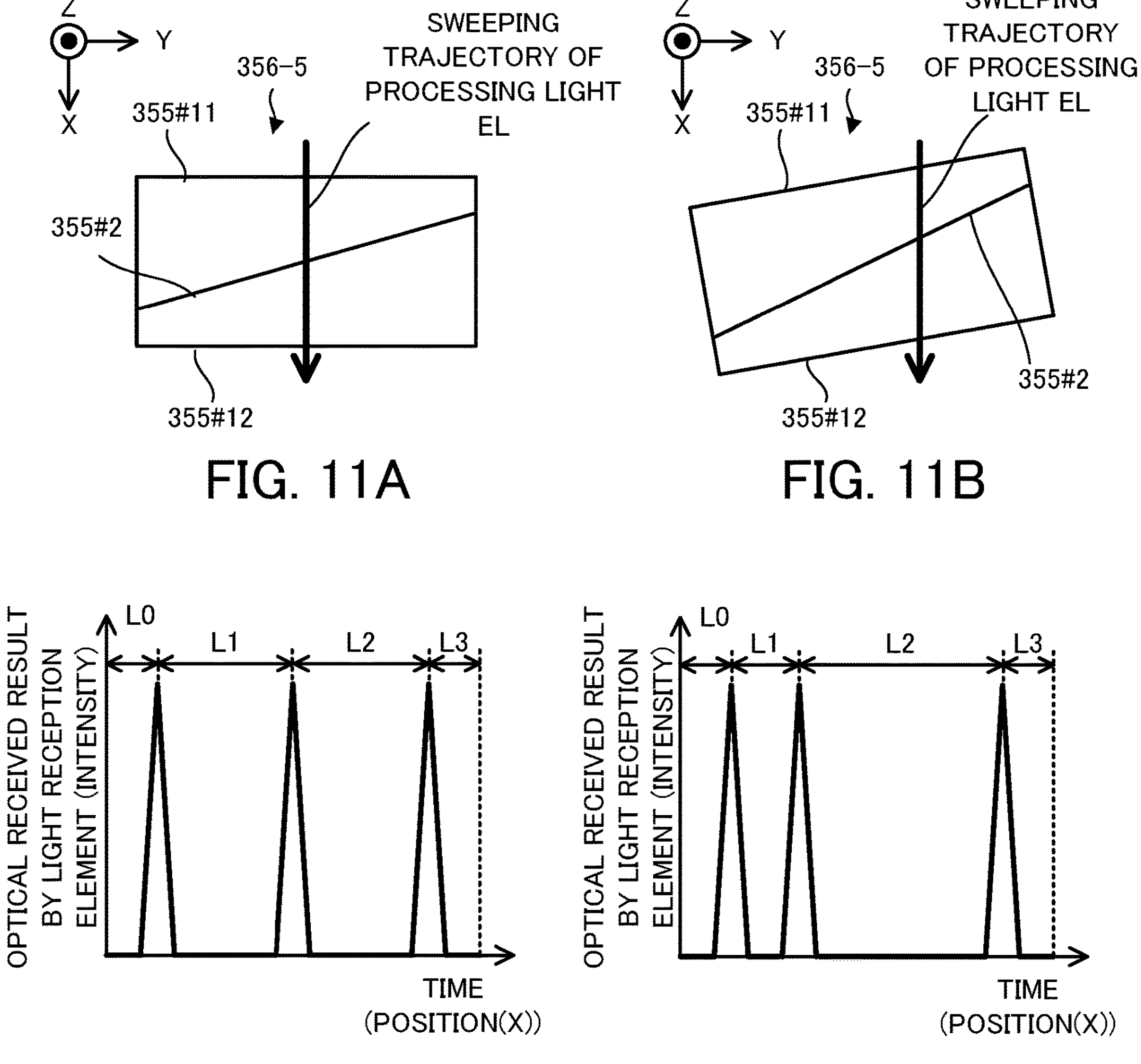
FIG. 11A is a planar view that illustrates the search mark of the light reception apparatus assembled in an ideal assembly position.
FIG. 11B is a planar view that illustrates the search mark of the light reception apparatus assembled in a position that is different from the ideal assembly position.
FIG. 11C is a graph that illustrates a light reception signal corresponding to the optical received result of the processing light through the search mark of the light reception apparatus assembled in the ideal assembly position.
FIG. 11D is a graph that illustrates the light reception signal corresponding to the optical received result of the processing light through the search mark of the light reception apparatus assembled in the position that is different from the ideal assembly position.

Positions of the plurality of pulse waveforms included in the light reception signal depends on an actual assembly position of the light reception apparatus 35. For example, FIG. 11A illustrates the search mark 356-5 of the light reception apparatus 35 assembled in the ideal assembly position, FIG. 11B illustrates the search mark 356-5 of the light reception apparatus 35 assembled in the position that is different from the ideal assembly position, and on the other hand, FIG. 11C is illustrates the light reception signal corresponding to the optical received result of the processing light EL through the search mark 356-5 of the light reception apparatus 35 assembled in the ideal assembly position. FIG. 11D illustrates the light reception signal corresponding to the optical received result of the processing light EL through the search mark 356-5 of the light reception apparatus 35 assembled in the position that is different from the ideal assembly position. As illustrated in FIG. 11A to FIG. 11D, the positions of the plurality of pulse waveform included in the light reception signal obtained when the light reception apparatus 35 is assembled in the ideal assembly position is different from the positions of the plurality of pulse waveform included in the light reception signal obtained when the light reception apparatus 35 is assembled in the position that is different from the ideal assembly position. Namely, intervals L1 and L2 (see FIG. 11C) between the plurality of pulse waveform included in the light reception signal obtained when the light reception apparatus 35 is assembled in the ideal assembly position are different from intervals L1 and L2 (see FIG. 11D) between the plurality of pulse waveform included in the light reception signal obtained when the light reception apparatus 35 is assembled in the position that is different from the ideal assembly position.

Thus, the control apparatus 4 is capable of calculating a difference between the ideal position of the one search mark 356-5 and the actual position of the one search mark 356-5 based on the optical received result of the processing light EL through the one search mark 356-5. For example, the control apparatus 4 is capable of calculating the difference between the ideal position of the one search mark 356-5 and the actual position of the one search mark 356-5 in each of the X axis direction and the Y axis direction. In this case, the control apparatus 4 may calculate the difference of the position by using the intervals L1 and L2 between the plurality of pulse waveforms included in the light reception signal.

The control apparatus 4 performs an operation for obtaining the optical received result of the processing light EL through the search mark 356-5 for all of (alternatively, a part of) the search marks 356-5 of the light reception apparatus 35 in order. As a result, the control apparatus 4 is capable of calculating the difference between the ideal position of each search mark 356-5 and the actual position of each search mark 356-5. Namely, the control apparatus 4 is capable of calculating the difference of the actual position of each of the plurality of search marks 356-5.

Then, the control apparatus 4 calculates the assembly error of the light reception apparatus 35 relative to the stage 32 based on the difference of the actual position of each of the plurality of search marks 356-5. For example, the control apparatus 4 may calculate the assembly error of the light reception apparatus 35 in each of the X axis direction and the Y axis direction based on the difference of the actual position of one search mark 356-5. For example, the control apparatus 4 may calculate the assembly error of the light reception apparatus 35 in each of the X axis direction and the Y axis direction and the assembly error of the light reception apparatus 35 around the Z axis based on the differences of the actual positions of two or more search marks 356-5. Note that the control apparatus 4 may calculate the assembly error of the light reception apparatus 35 in each of the X axis direction and the Y axis direction and the assembly error of the light reception apparatus 35 around the Z axis based on a differences of an actual positions of at least one of the slit mark 356-1, the fine mark 356-2, the rectangular mark 356-3 and the cross mark 356-4, in addition to or instead of the difference of the actual position of the search mark 356-5.

After the assembly error of the light reception apparatus 35 is calculated, the control apparatus 4 controls the processing system SYSa (for example, at least one of the processing apparatus 1, the measurement apparatus 2 and the stage apparatus 3) based on an information relate to the calculated assembly error. For example, the control apparatus 4 may control at least one of the processing apparatus 1 and the stage apparatus 3 based on the information relate to the calculated assembly error so that the light reception apparatus 35 is irradiated with the processing apparatus in a same manner as a case where the assembly error is zero, even when the assembly error is not zero. For example, the control apparatus 4 may control at least one of the processing apparatus 1 and the stage apparatus 3 based on the information relate to the calculated assembly error so that the measurement apparatus 2 measures the light reception apparatus 35 (specifically, the mark 356 formed in the light reception apparatus 35) in a same manner as a case where the assembly error is zero, even when the assembly error is not zero. Typically, at least one of the processing head 12, the measurement head 21 and the stage 32 move so as to cancel the assembly error. As a result, even when the light reception apparatus has the assembly error, the processing system SYSa is capable of processing the workpiece W in a same manner as a case where the light reception apparatus 35 does not have the assembly error. Namely, the processing system SYSa is capable of properly processing the workpiece W.

(1-2-2) Focus Control Operation

Figure 12A:
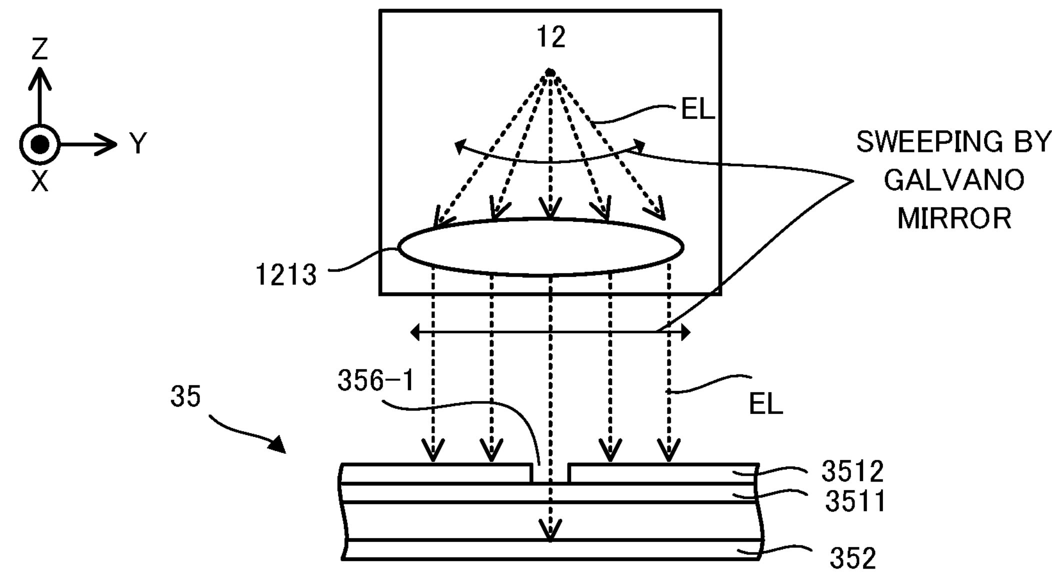
FIG. 12A is a cross-sectional view that illustrates an aspect in which a processing head irradiates the light reception apparatus with the processing light in order to perform a focus control operation.

Next, with reference to FIG. 12A to FIG. 12C, the focus control operation will be described. FIG. 12A is a cross-sectional view that illustrates an aspect in which the processing head 12 irradiates the light reception apparatus 35 with the processing light EL in order to perform the focus control operation, FIG. 12B is a planar view that illustrates an aspect in which the processing head 12 irradiates the light reception apparatus 35 with the processing light EL in order to perform the focus control operation, and FIG. 12C is a graph that illustrates the optical received result of the processing light EL by the light reception element 352 of the light reception apparatus 35.

Figure 12B:
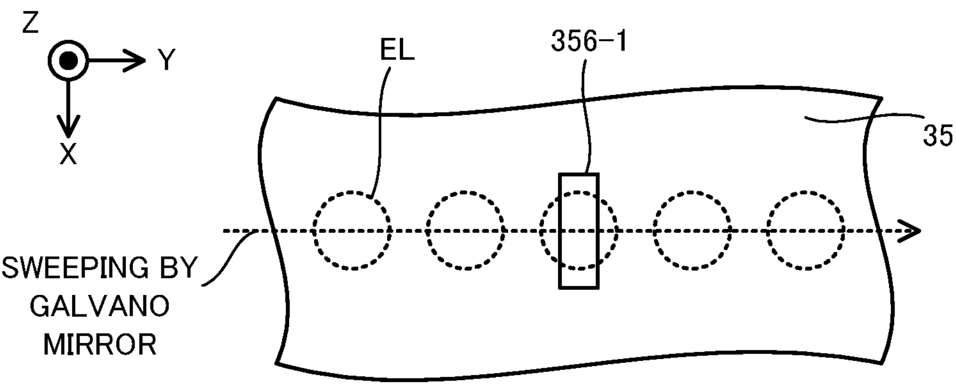
FIG. 12B is a planar view that illustrates an aspect in which the processing head irradiates the light reception apparatus with the processing light in order to perform the focus control operation.
Figure 12C:
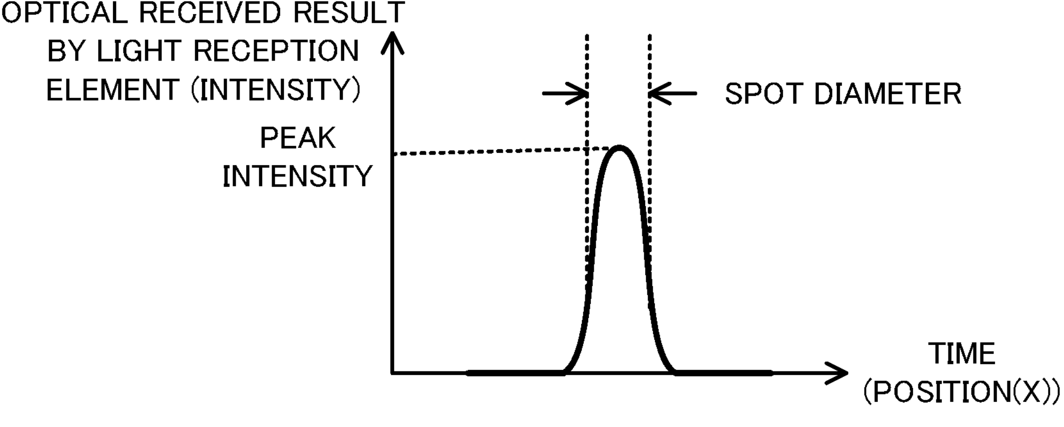
FIG. 12C is a graph that illustrates the optical received result of the processing light by a light reception element of the light reception apparatus.

As illustrated in FIG. 12A and FIG. 12B, in order to perform the focus control operation, the optical received result of the processing light EL through the passing area 355 forming the slit mark 356-1 is obtained. Specifically, the control apparatus 4 controls the stage driving system 33 so that stage 32 moves to a position that allows the processing head 12 to irradiate one slit mark 356-1 of the plurality of slit marks 356-1 with the processing head 12. Namely, the control apparatus 4 moves the stage 32 so that the one slit mark 356-1 is located in the processing shot area PSA. In this case, the control apparatus 4 may move the processing head 12 in addition to or instead of the stage 32. Then, the control apparatus 4 irradiates the processing head 12 to irradiate the one slit mark 356-1 with the processing light EL.

In this case, the processing head 12 deflects the processing light EL by using the Galvano mirror 1212 to sweep at least a part of the surface of the stage 32 (specifically, a surface including a part at which the one slit mark 356-1 is formed) with the processing light EL under the control of the control apparatus 4. Especially, the processing head 12 sweeps at least a part of the surface of the stage 32 with the processing light EL so that the processing light EL (more specifically, the target irradiation area EA of the processing light EL) traverses the passing area 355 forming the one slit mark 356-1 in a plane along the XY plane. Especially, the processing head 12 may sweep at least a part of the surface of the stage 32 with the processing light EL so that the processing light EL traverses the slit mark 356-1 along a short direction of the linear passing area 355 that forms the slit mark 356-1 in the plane along the XY plane. In an example illustrated in FIG. 12A and FIG. 12B, the processing head 12 sweeps at least a part of the surface of the stage 32 with the processing light EL so that the processing light EL traverses the slit mark 356-1, which is formed by the passing area 355 extending along the X axis direction, along the Y axis direction in the plane along the XY plane.

The stage 32 may not move in a period during which at least a part of the surface of the stage 32 is swept with the processing light EL. Namely, the positional relationship (especially, a direction along the XY plane) between the processing apparatus 1 and the stage 32 may be fixed in the period during which at least a part of the surface of the stage 32 is swept with the processing light EL. As a result, at least a part of the surface of the stage 32 is swept with the processing light EL at a constant sweeping speed that is determined based on a characteristic of the Galvano mirror 1212.

As a result, the one slit mark 356-1 is irradiated with the processing light EL in a certain timing in the period during which at least a part of the surface of the stage 32 is swept with the processing light EL. Namely, the light reception element 352 optically receives the processing light EL in a certain timing in the period during which at least a part of the surface of the stage 32 is swept with the processing light EL.

The control apparatus 4 obtains, as the optical received result of the processing light EL, the light reception signal indicating that the intensity of the processing light EL in a period during which the passing area 355 is irradiated with at least a part of the processing light EL is higher than the intensity of the processing light EL in a period during which passing area 355 forming the slit mark 356-1 is not irradiated with the processing light EL, as illustrated in FIG. 12C. Note that a time (an optical received timing) represented by a horizontal axis of FIG. 12C may be replaced by a relative position of the processing light EL and the stage 32 along the sweeping direction (the Y axis direction). Note that the speed of sweeping at least a part of the surface of the stage 32 with the processing light EL may not be constant. In this case, a driving amount (an angle) of the Galvano mirror 1212 may be replaced by the relative position of the processing light EL and the stage 32 along the sweeping direction (the Y axis direction).

The control apparatus 4 may calculate a spot diameter (namely, the spot diameter on the surface of the workpiece W) of the processing light EL based of the light reception signal. Specifically, the control apparatus 4 may determine a period during which the intensity of the processing light EL is higher than a predetermined value (namely, the period during which the passing area 355 is irradiated with at least a part of the processing light EL) from the light reception signal. In this case, the control apparatus 4 may calculate the spot diameter of the processing light based on the determined period and the sweeping speed of the processing light EL. In this case, the light reception signal includes a moving average by an amount of a slit width (a width of a light passing part of the slit mark 356-1 along the sweeping direction), and thus, the control apparatus 4 may calculate the spot diameter based on this amount (for example, an influence of the slit width). For example, the control apparatus 4 may approximate the waveform of the light reception signal by a Gaussian distribution based on the slit width and calculate the beam diameter based on an approximate curve obtained by the approximation.

Then, the control apparatus 4 may control the light concentration position of the processing light EL so that the calculated sport diameter is equal to the spot diameter that is set as the processing condition (for example, the spot diameter that is set by the above described initial setting operation). In this case, when the light concentration position is changed, the control apparatus 4 may control the focus change optical system 1211 of the processing apparatus 1 so that the light reception apparatus 35 redetects the processing light EL to determine whether or not the changed light concentration position is proper. In this case, the control apparatus 4 may determine whether or not the spot diameter that is recalculated based on the updated optical received result by the light reception element 352 is equal to the spot diameter that is set as the processing condition. As a result, the processing system SYSa is capable of processing the workpiece W by using the processing light EL the light concentration position of which is properly set. Thus, the processing system SYSa is capable of properly processing the workpiece W. Incidentally, when a telecentric property of the irradiation optical system 121 is good, the control apparatus 4 may control the head driving system 13 of the processing apparatus 1 so that the light reception apparatus 35 redetects the processing light EL to determine whether or not the changed light concentration position is proper.

Incidentally, when the plurality of slit marks 356-1 between which the angle relative to each of the X axis and the Y axis is different are formed in the beam passing member 351, the control apparatus 4 may calculate a degree of ellipticity of the spot of the processing light EL (for example, a ratio (difference) between a size of the spot in the X axis direction and a size of the spot in the Y axis direction) based on the optical received result of the processing light through each of at least two slit marks 356-1. Incidentally, when the degree of ellipticity of the spot of the processing light EL is larger than an allowable value, the irradiation optical system 121 may include an optical member for controlling (typically, reducing) the degree of ellipticity. An optical member in which refractive powers in two orthogonal directions are different from each other (for example, at least one of a toric lens, a cylindrical lens and the like) is one example of the optical member for controlling the degree of ellipticity. In this case, the degree of ellipticity may be controlled by rotating this optical member around an optical axis, and the degree of ellipticity may be controlled by changing a distance between the plurality of optical members and the like.

Moreover, in the above described description, the light reception apparatus 35 (especially, the slit mark 356-1 and the light reception element 352) that is used to perform the focus control operation may be regarded to form a beam profiler in what we call a slit type. Namely, the control apparatus 4 may be regarded to perform the focus control operation by using the beam profiler in the slit type. However, the control apparatus 4 may be regarded to perform the focus control operation by using a beam profiler that is different from the beam profiler in the slit type. For example, the control apparatus 4 may perform the focus control operation by calculating the spot diameter of the processing light EL by using a beam profiler in a knife edge type including the rectangular mark 356-3 and the light reception element 352. For example, when the rectangular mark 356-3 the size of which is so small that it can be regarded to be a pin-hole is formed, the control apparatus 4 may perform the focus control operation by calculating the spot diameter of the processing light EL by using a beam profiler in a pin-hole type including the rectangular mark 356-3 and the light reception element 352.

(1-2-3) B-CHK Operation

Next, the B-CHK operation will be described. The B-CHK operation is the operation for measuring the distance between the apparatus origin point AO of the processing system SYSa and each of the processing origin point PO and the measurement origin point MO.

Figure 13:
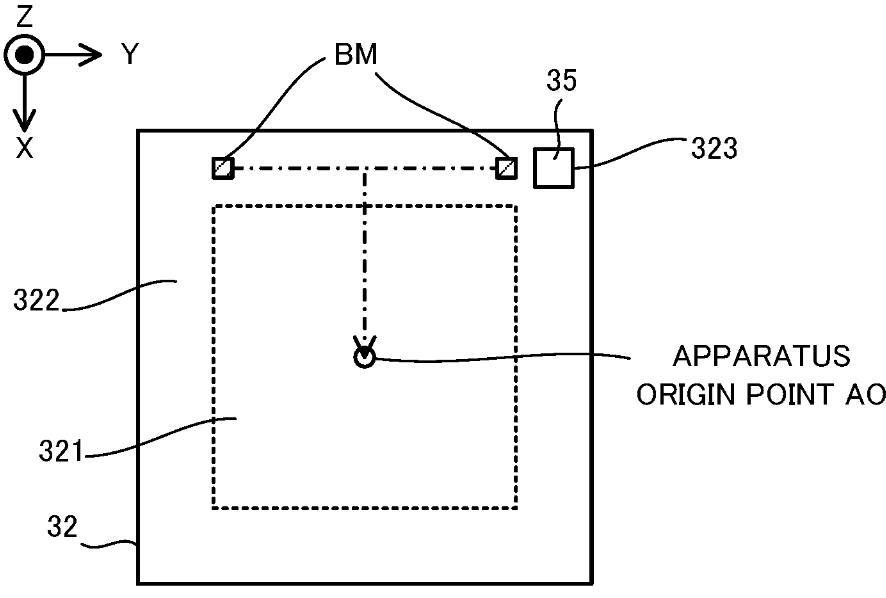
FIG. 13 is a planar view that illustrates the stage on which a fiducial mark is formed.

When the B-CHK operation is performed, the control apparatus 4 set the apparatus origin point AO that is an origin point of a stage coordinate system that is used to control the position of the stage 32. In order to set the apparatus origin point AO, the control apparatus 4 controls the measurement head 21 so as to measure a fiducial mark BM formed on the stage 32. The fiducial mark BM is a mark formed on the stage 32 to define the apparatus origin point AO. For example, as illustrated in FIG. 13 that a planar view illustrating the stage 32 on which the fiducial mark BM is formed, the fiducial mark BM may be formed on the outer circumference surface 322 of the stage 32. However, the fiducial mark BM may be formed on a part of the stage 32 that is different from the outer circumference surface 322. For example, the fiducial mark BM may be formed on the placement surface 321 of the stage 32. Moreover, a plurality of (two in an example illustrated in FIG. 3) fiducial marks BM are formed on the stage 32, however, a single fiducial mark BM may be formed on the stage 32. Incidentally, when the plurality of fiducial marks BM are formed on the stage 32, the control apparatus 4 may calculate a rotational position of the stage 32 around the Z axis based on a measured result of the fiducial marks BM.

In the first example embodiment, the apparatus origin point AO is set at a position that has a first predetermined positional relationship relative to the fiducial marks BM. For example, when the apparatus origin point AO is set at the center of the stage 32, the fiducial marks BM are formed at positions having the first predetermined positional relationship relative to the center of the stage 32. In an example illustrated in FIG. 13, the apparatus origin point AO, a position that is located on a line on which distances from the two fiducial marks BM are equal to each other and that is away from a midpoint of the two fiducial marks BM toward the +X side by a predetermined amount is set as the position of the apparatus origin point AO. In this case, the control apparatus 4 obtains, from the position measurement apparatus 34, the position of the stage 32 when the measurement head 21 measures each fiducial mark BM. Thus, the control apparatus 4 may serve as an obtaining apparatus that is configured to obtain an information related to the position of the stage 32. Then, the control apparatus 4 may set a position having the predetermined first positional relationship relative to the obtained position of the stage 32 to be the apparatus origin point AO. Note that the fiducial mark BM itself indicates the apparatus origin point AO. In this case, the position of the stage 32 when the measurement head 21 measures each fiducial mark BM is the apparatus origin point AO.

The fiducial marks BM may be formed at positions that have a predetermined second positional relationship relative to the light reception apparatus 35 (especially, the passing area 355 of the reception apparatus 35). In this case, it can be said that the apparatus origin point AO is substantially set at a position that has a predetermined third positional relationship relative to the light reception apparatus 35. When the fiducial marks BM are formed at the position that has the predetermined second positional relationship relative to the light reception apparatus 35, there is a lower possibility that a positional relationship among the fiducial marks BM, the apparatus origin point AO and the light reception apparatus 35 changes. As a result, the distance between the apparatus origin point AO and the measurement origin point MO and the distance between the apparatus origin point AO and the processing origin point PO are calculatable accurately.

Figure 14A:
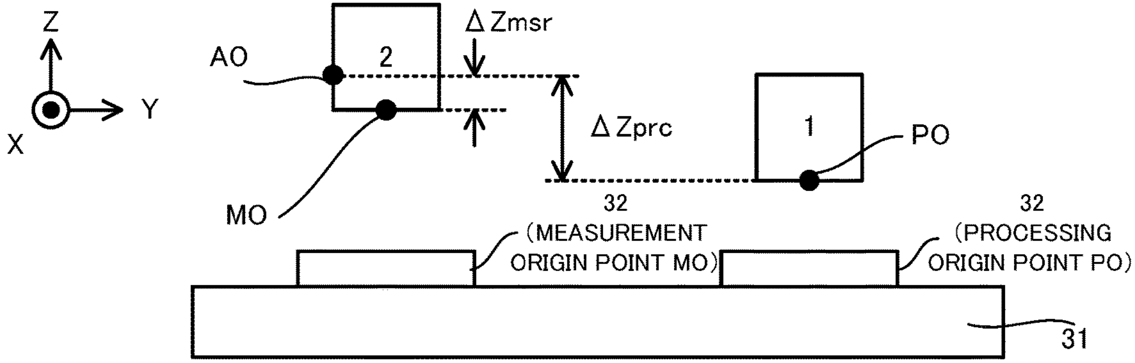
FIG. 14A is a cross-sectional view that illustrates one example of a processing baseline and a measurement baseline and FIG. 14B is a planar view that illustrates one example of the processing baseline and the measurement baseline.
Figure 14B:
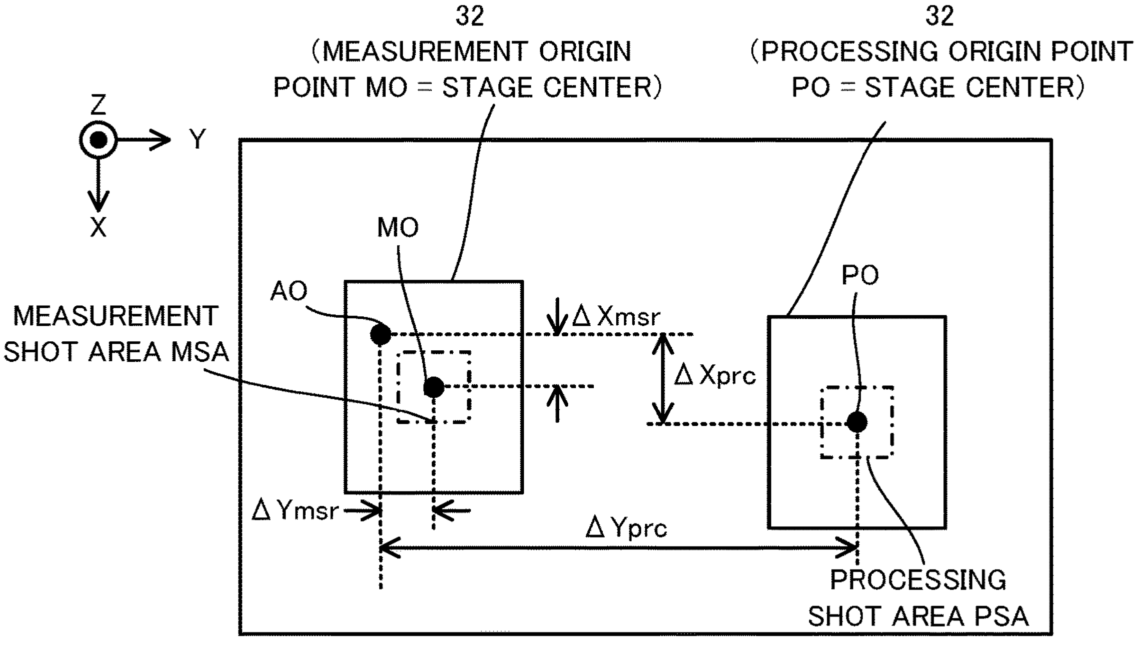

After the apparatus origin point AO is set, the control apparatus 4 calculates the distance between the apparatus origin point AO and the processing origin point PO and the distance between the apparatus origin point AO and the measurement origin point MO. The processing origin point PO corresponds to a position of the stage 32 when a center of the processing shot area PSA is located at the center of the stage 32 and the light concentration position of the processing light EL is located on the surface of the workpiece W. The measurement origin point MO corresponds to a position of the stage 32 when a center of the measurement shot area MSA is located at the center of the stage 32 and the light concentration position of the measurement light ML is located on the surface of the workpiece W. Moreover, in the below described description, the distance between the apparatus origin point AO and the processing origin point PO is referred to as a "processing baseline BLprc" and the distance between the apparatus origin point AO and the measurement origin point MO is referred to as a "measurement baseline BLmsr". FIG. 14A and FIG. 14B illustrates examples of the processing baseline BLprc and the measurement baseline BLmsr. As illustrated in FIG. 14A and FIG. 14B, the processing baseline BLprc may include a component ΔXprc corresponding to the distance between the apparatus origin point AO and the processing origin point PO in the X axis direction, a component ΔYprc corresponding to the distance between the apparatus origin point AO and the processing origin point PO in the Y axis direction and a component ΔZprc corresponding to the distance between the apparatus origin point AO and the processing origin point PO in the Z axis direction. The measurement baseline BLmsr may include a component ΔXmsr corresponding to the distance between the apparatus origin point AO and the measurement origin point MO in the X axis direction, a component ΔYmsr corresponding to the distance between the apparatus origin point AO and the measurement origin point MO in the Y axis direction and a component ΔZmsr corresponding to the distance between the apparatus origin point AO and the measurement origin point MO in the Z axis direction.

Note that the processing baseline BLprc may include a sum of a component corresponding to a designed distance between the apparatus origin point AO and the processing origin point PO in the X axis direction and a component corresponding to an error amount in the X axis direction, a sum of a component corresponding to a designed distance between the apparatus origin point AO and the processing origin point PO in the Y axis direction and a component corresponding to an error amount in the Y axis direction and a sum of a component corresponding to a designed distance between the apparatus origin point AO and the processing origin point PO in the Z axis direction and a component corresponding to an error amount in the Z axis direction. Moreover, the measurement baseline BLmsr may include a sum of a component corresponding to a designed distance between the apparatus origin point AO and the measurement origin point MO in the X axis direction and a component corresponding to an error amount in the X axis direction, a sum of a component corresponding to a designed distance between the apparatus origin point AO and the measurement origin point MO in the Y axis direction and a component corresponding to an error amount in the Y axis direction and a sum of a component corresponding to a designed distance between the apparatus origin point AO and the measurement origin point MO in the Z axis direction and a component corresponding to an error amount in the Z axis direction.

Note that the processing origin point PO and the measurement origin point MO may not be set at the center of the stage 32. The processing origin point PO and the measurement origin point MO may be set at positions different from the center of the stage 32. The processing origin point PO and the measurement origin point MO may be set at any positions.

In order to calculate the measurement baseline BLmsr, the control apparatus 4 obtains the measured result of the cross mark 356-4 by the measurement head 21. Specifically, the control apparatus 4 controls the stage driving system 33 to move the stage 32 in each of the X axis direction and the Y axis direction so that a fiducial of the light reception apparatus 35 is located at a center (including a vicinity of the center (a range that is so close to the center that it can be equate with the center), the same is applied to the below described description) of the measurement shot area MSA. For example, the control apparatus 4 moves the stage 32 so that one cross mark 356-4, which is usable as the fiducial of the light reception apparatus 35, is located at the center of the measurement shot area MSA. Alternatively, the control apparatus 4 may move the stage 32 so that any mark (this mark may have a predetermined (known) positional relationship relative to the passing area 355) of the light reception apparatus 35, which is usable as the fiducial of the light reception apparatus 35, is located at the center of the measurement shot area MSA. In this case, the control apparatus 4 may move the stage 32 so that at least one cross mark 356-4 is included in the measurement shot area MSA. Furthermore, the control apparatus 4 moves the stage 32 along the Z axis direction so that the light concentration position of the measurement light ML is located on the surface of the stage 32. Then, the measurement head 21 measures the one cross mark 356-4. Furthermore, the control apparatus 4 obtains, from the position measurement apparatus 34, the position of the stage 32 when the measurement head 21 measures the one cross mark 356-4. The position of the stage 32 obtained here corresponds to the position of the measurement origin point MO. Therefore, the control apparatus 4 is capable of calculating the distance between the apparatus origin point AO and the position of the stage 32 when the measurement head 21 measures the one cross mark 356-4 and calculating the measurement baseline BLmsr based on the calculated distance.

Note that the control apparatus 4 may calculate the measurement baseline BLmsr in each of the X axis direction and the Y axis direction, and may not calculate the measurement baseline BLmsr in the Z axis direction.

After the measurement baseline BLmsr is calculated, the control apparatus 4 may move, based on the calculated measurement baseline BLmsr, the stage 32 (furthermore, the measurement head 21 if needed) in a period during which the measurement head 21 measures the workpiece W and the like. Namely, the control apparatus 4 may control, based on the calculated measurement baseline BLmsr, the position of the stage 32 (furthermore, the measurement head 21 if needed) in the period during which the measurement head 21 measures the workpiece W and the like. As a result, the measurement shot area MSA is set at a desired position in the stage coordinate system that is based on the apparatus origin point AO. Namely, the processing system SYSa is capable of properly processing the workpiece W based on the proper measured result of the workpiece W by the measurement apparatus 2.

However, there is a possibility that the measurement baseline BLmsr varies over time due to an misalignment of at least one of the measurement head 21 and the stage 32. Namely, there is a possibility that the measurement baseline BLmsr at a first timing is different from the measurement baseline BLmsr at a second timing that is different from (for example, that is after) the first timing. Thus, the control apparatus 4 may perform an operation for calculating the measurement baseline BLmsr regularly or at a random timing. Note that the control apparatus 4 may separately manage a difference from a designed value (corresponding to the assembly error) and a varied amount over time in managing the measurement baseline BLmsr.

Specifically, after the measurement baseline BLmsr is calculated at the first timing, the control apparatus 4 moves the stage 32 at the second timing so that one cross mark 356-4 (specifically, one cross mark 356-4 that is measured to calculate the measurement baseline BLmsr at the first timing) is measurable by the measurement head 21. Furthermore, the control apparatus 4 obtains, from the position measurement apparatus 34, the position of the stage 32 when the measurement head 21 measures the one cross mark 356-4 (namely, when one cross mark 356-4 is measurable by the measurement head 21). Here, when the measurement baseline BLmsr at the first timing is same as the measurement baseline BLmsr at the second timing, the position of the stage 32 when the measurement head 21 measures the one cross mark 356-4 at the second timing should be same as the position of the stage 32 when the measurement head 21 measures the one cross mark 356-4 at the first timing. On the other hand, when the measurement baseline BLmsr at the first timing is different from the measurement baseline BLmsr at the second timing, the position of the stage 32 when the measurement head 21 measures the one cross mark 356-4 at the second timing should not be same as the position of the stage 32 when the measurement head 21 measures the one cross mark 356-4 at the first timing. Thus, the control apparatus 4 is capable of calculating a varied amount of the measurement baseline BLmsr (namely, a varied amount based on the measurement baseline BLmsr at the first timing) based on the position of the stage 32 when the measurement head 21 measures the one cross mark 356-4 at the second timing and the position of the stage 32 when the measurement head 21 measures the one cross mark 356-4 at the first timing. Namely, the control apparatus 4 is capable of calculating a varied amount of the position of the stage 32 when the one cross mark 356-4 is measurable by the measurement head 21 based on the position of the stage 32 when the measurement head 21 measures the one cross mark 356-4 at the second timing and the position of the stage 32 when the measurement head 21 measures the one cross mark 356-4 at the first timing. Thus, the control apparatus 4 is capable of calculating the measurement baseline BLmsr at the second timing based on the measurement baseline BLmsr calculated at the first timing and the varied amount of the measurement baseline BLmsr calculated at the second timing. Namely, the control apparatus 4 is capable updating the measurement baseline BLmsr. When the measurement baseline BLmsr is updated, the control apparatus 4 moves at least one of the measurement head 21 and the stage 32 based on the updated measurement baseline BLmsr.

Alternatively, the control apparatus 4 may move the measurement head 21 at the second timing based on the measurement baseline BLmsr calculated at the first timing so that the fiducial of the light reception apparatus 35 (for example, the one cross mark 356-4) is located at the center of the measurement shot area MSA and the light concentration position of the measurement light ML is located on the surface of the stage 32. Then, the measurement head 21 may measure the one cross mark 356-4. Here, when the measurement baseline BLmsr at the first timing is different from the measurement baseline BLmsr at the second timing, the measured result of the one cross mark 356-4 at the first timing is not same as the measured result of the same one cross mark 356-4 at the second timing. This is because there is a possibility that the stage 32, which moves based on the measurement baseline BLmsr calculated at the first timing, cannot move at the second timing so that the fiducial of the light reception apparatus 35 (for example, the one cross mark 356-4) is located at the center of the measurement shot area MSA, due to the variation of the measurement baseline BLmsr. Thus, the control apparatus 4 may calculate the varied amount of the measurement baseline BLmsr (namely, a varied amount based on the measurement baseline BLmsr at the first timing) by comparing the measured result of the one cross mark 356-4 at the first timing to the measured result of the one cross mark 356-4 at the second timing. Namely, the control apparatus 4 may update the measurement baseline BLmsr based on the measured result of the one cross mark 356-4 at the first timing and the measured result of the one cross mark 356-4 at the second timing.

Next, in order to calculate the processing baseline BLprc, the control apparatus 4 obtains the optical received result of the processing light EL, which is through the passing area 355 forming the fine mark 356-2, by the light reception element 352. Specifically, the control apparatus 4 controls the stage driving system 33 to move the stage 32 in each of the X axis direction and the Y axis direction so that the fiducial of the light reception apparatus 35 is located at a center (including a vicinity of the center (a range that is so close to the center that it can be equate with the center), the same is applied to the below described description) of the processing shot area PSA. For example, the control apparatus 4 moves the stage 32 so that one fine mark 356-2, which is usable as the fiducial of the light reception apparatus 35, is located at the center of the processing shot area PSA. Alternatively, the control apparatus 4 may move the stage 32 so that any mark (this mark may have a predetermined (known) positional relationship relative to the passing area 355) of the light reception apparatus 35, which is usable as the fiducial of the light reception apparatus 35, is located at the center of the processing shot area PSA. Furthermore, the control apparatus 4 controls the head driving mechanism 13 to move the processing head 12 along the Z axis direction so that the light concentration position of the processing light EL is located on the surface of the stage 32. Then, the processing head 12 irradiates the one fine mark 356-2 with the processing light EL.

In this case, the processing head 12 deflects the processing light EL by using the Galvano mirror 1212 to sweep at least a part of the surface of the stage 32 (specifically, a surface including a part at which the one fine mark 356-2 is formed) with the processing light EL under the control of the control apparatus 4. Especially, the processing head 12 sweeps at least a part of the surface of the stage 32 with the processing light EL so that the processing light EL (more specifically, the target irradiation area EA of the processing light EL) traverses the plurality of passing areas 355 forming the one fine mark 356-2 in order in a plane along the XY plane. Especially, the processing head 12 may sweep at least a part of the surface of the stage 32 with the processing light EL so that the processing light EL traverses the plurality of passing areas 355 in order along a short direction of the plurality of linear passing areas 355 that form the fine mark 356-2 in the plane along the XY plane.

Figure 15:
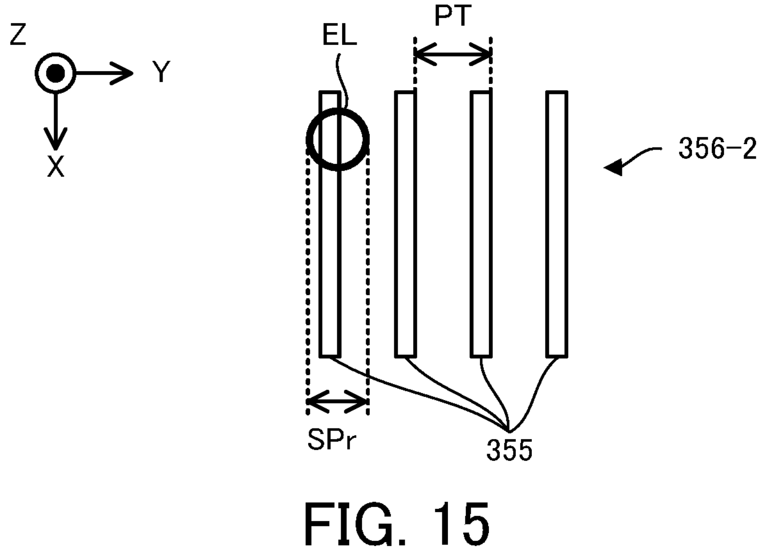
FIG. 15 is a planar view that illustrates a relationship between a spot diameter of the processing light and a fine mark.
Figure 16:
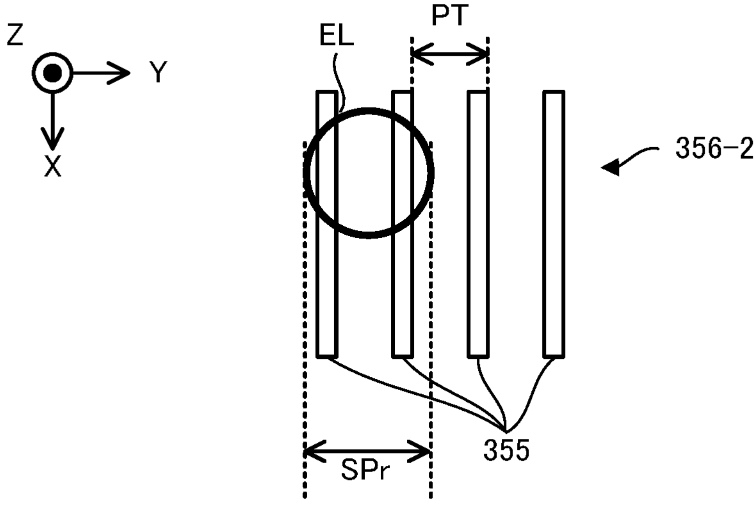
FIG. 16 is a planar view that illustrates a relationship between the spot diameter of the processing light and the fine mark.

When the fine mark 356-2 is irradiated with the processing light EL, the control apparatus 4 may set, based on the arrangement pitch of the plurality of passing areas 355 (namely, an interval or a distance between adjacent two passing areas 355) forming the fine mark 356-2, the spot diameter of the processing light EL on the surface of the beam passing member 351 in which the fine mark 356-2 is formed. Note that the spot diameter means a size of an area that is irradiated with the processing light EL on the surface of the beam passing member 351. For example, as illustrated in FIG. 15 that is a planar view illustrating a relationship between the spot diameter of the processing light EL and the fine mark 356-2, the control apparatus 4 may set the spot diameter SPr of the processing light EL so that the spot diameter SPr of the processing light EL is equal to or smaller than the arrangement pitch PT of the passing area 355 along a direction (the Y axis direction in an example illustrated in FIG. 15) in which the plurality of passing areas 355 forming the fine mark 356-2 is arranged. In this case, two or more passing areas 355 are not irradiated with the processing light EL at the same time. Alternatively, as illustrated in FIG. 16 that is a planar view illustrating the relationship between the spot diameter of the processing light EL and the fine mark 356-2, the control apparatus 4 may set the spot diameter SPr of the processing light EL so that the spot diameter SPr of the processing light EL is larger than the arrangement pitch PT of the passing area 355 along the direction (the Y axis direction in an example illustrated in FIG. 16) in which the plurality of passing areas 355 forming the fine mark 356-2 is arranged. In this case, two or more passing areas 355 are irradiated with the processing light EL at the same time in some cases. As a result, in some cases, the processing light EL through another passing area 355 that forms the fine mark 356-2 and that is different from one passing area 355 enters (namely, is emitted to) the light reception element 352 in at least a part of a period during which the processing light EL through the one passing area 355 forming the fine mark 356-2 enters (namely, is emitted to) the light reception element 352. When the processing light EL is the pulsed light, in at least a part of a period during which a series of pulsed lights through the one passing area 355 forming the fine mark 356-2 enter (namely, are emitted to) the light reception element 352, the same series of pulsed lights through another passing area 355 forming the fine mark 356-2 enter (namely, are emitted to) the light reception element 352.

Incidentally, when the plurality of fine marks 356-2 between which the arrangement pitch of the plurality of linear passing areas 355 is different are formed, a constraint due to the spot diameter SPr for performing the B-CHK operation is smaller. Namely, the processing system SYSa is capable of performing the B-CHK operation without being affected by the constraint due to the spot diameter SPr.

Note that the arrangement pitch of the plurality of passing areas 355 (namely, an interval or a distance between adjacent two passing areas 355) forming the fine mark 356-2 may be set based on the spot diameter of the processing light EL on the surface of the beam passing member 351 in which the fine mark 356-2 is formed. This spot diameter may be an actually measured value or may be a designed value.

The control apparatus 4 obtains, from the position measurement apparatus 34, the position of the stage 32 when the light reception element 352 optically receives the processing light EL. The position of the stage 32 obtained here corresponds to the position of the processing origin point PO.

Therefore, the control apparatus 4 is capable of calculating the distance between the apparatus origin point AO and the position of the stage 32 when the light reception element 352 optically receives the processing light EL through the one fine mark 356-2 and calculating the processing baseline BLprc based on the calculated distance.

After the processing baseline BLprc is calculated, the control apparatus 4 may move, based on the calculated processing baseline BLprc, the stage 32 (furthermore, the processing head 12 if needed) in a period during which the processing head 12 processes the workpiece W and the like. Namely, the control apparatus 4 may control, based on the calculated processing baseline BLprc, the position of the stage 32 (furthermore, the processing head 12 if needed) in the period during which the processing head 12 processes the workpiece W and the like. As a result, the processing shot area PSA is set at a desired position in the stage coordinate system that is based on the apparatus origin point AO. Namely, the processing system SYSa is capable of properly processing the workpiece W.

However, there is a possibility that the processing baseline BLprc varies over time due to an misalignment of at least one of the processing head 12 and the stage 32. Namely, there is a possibility that the processing baseline BLprc at a third timing is different from the processing baseline BLprc at a fourth timing that is different from (for example, that is after) the third timing. Thus, the control apparatus 4 may perform an operation for calculating the processing baseline BLprc regularly or at a random timing.

Specifically, after the processing baseline BLprc is calculated at the third timing, the control apparatus 4 moves the stage 32 at the fourth timing so that the processing head 12 is allowed to irradiate one fine mark 356-2 (specifically, one fine mark 356-2 that is irradiated with the processing light EL to calculate the processing baseline BLprc at the third timing) with the processing light EL. Furthermore, the control apparatus 4 obtains, from the position measurement apparatus 34, the position of the stage 32 when the light reception element 352 optically receives the processing light EL through the one fine mark 356-2 (namely, when one fine mark 356-2 is irradiated with the processing light EL). Here, when the processing baseline BLprc at the third timing is same as the processing baseline BLprc at the fourth timing, the position of the stage 32 when the light reception element 352 optically receives the processing light EL through the one fine mark 356-2 at the fourth timing should be same as the position of the stage 32 when the light reception element 352 optically receives the processing light EL through the one fine mark 356-2 at the third timing. On the other hand, when the processing baseline BLprc at the third timing is different from the processing baseline BLprc at the fourth timing, the position of the stage 32 when the light reception element 352 optically receives the processing light EL through the one fine mark 356-2 at the fourth timing should not be same as the position of the stage 32 when the light reception element 352 optically receives the processing light EL through the one fine mark 356-2 at the third timing. Thus, the control apparatus 4 is capable of calculating a varied amount of the processing baseline BLprc (namely, a varied amount based on the processing baseline BLprc at the third timing) based on the position of the stage 32 when the light reception element 352 optically receives the processing light EL through the one fine mark 356-2 at the fourth timing and the position of the stage 32 when the light reception element 352 optically receives the processing light EL through the one fine mark 356-2 at the third timing. Namely, the control apparatus 4 is capable of calculating a varied amount of the position of the stage 32 when the processing head 12 is allowed to irradiate one fine mark 356-2 with the processing light EL based on the position of the stage 32 when the light reception element 352 optically receives the processing light EL through the one fine mark 356-2 at the fourth timing and the position of the stage 32 when the light reception element 352 optically receives the processing light EL through the one fine mark 356-2 at the third timing. Thus, the control apparatus 4 is capable of calculating the processing baseline BLprc at the fourth timing based on the processing baseline BLprc calculated at the third timing and the varied amount of the processing baseline BLprc calculated at the fourth timing. Namely, the control apparatus 4 is capable updating the processing baseline BLprc. When the processing baseline BLprc is updated, the control apparatus 4 moves at least one of the processing head 12 and the stage 32 based on the updated processing baseline BLprc.

Alternatively, the control apparatus 4 may move the processing head 12 at the fourth timing based on the processing baseline BLprc calculated at the third timing so that the fiducial of the light reception apparatus 35 (for example, the one fine mark 356-2) is located at the center of the processing shot area PSA and the light concentration position of the processing light EL is located on the surface of the stage 32. Then, the processing head 12 may irradiate the one fine mark 356-2 with the processing light EL. Here, when the processing baseline BLprc at the third timing is different from the processing baseline BLprc at the fourth timing, the optical received result of processing light EL through the one fine mark 356-2 at the third timing is not same as the optical received result of processing light EL through the one fine mark 356-2 at the fourth timing. This is because there is a possibility that the stage 32, which moves based on the processing baseline BLprc calculated at the third timing, cannot move at the fourth timing so that the fiducial of the light reception apparatus 35 (for example, the one cross mark 356-4) is located at the center of the processing shot area PSA, due to the variation of the processing baseline BLprc. Thus, the control apparatus 4 may calculate the varied amount of the processing baseline BLprc (namely, a varied amount based on the processing baseline BLprc at the third timing) by comparing the optical received result of processing light EL through the one fine mark 356-2 at the third timing to the optical received result of processing light EL through the one fine mark 356-2 at the fourth timing. Namely, the control apparatus 4 may update the processing baseline BLprc based on the optical received result of processing light EL through the one fine mark 356-2 at the third timing and the optical received result of processing light EL through the one fine mark 356-2 at the fourth timing.

Incidentally, in the above described description, the measurement head 21 measures the cross mark 356-4 in the B-CHK operation. However, the measurement head 21 may measure the mark 356 that is different from the cross mark 356-4. Namely, the measurement baseline BLmsr may be calculated based on the measured result of the mark 356 that is different from the cross mark 356-4.

In the above described description, the processing head 12 irradiates the passing area 355, which forms the fine mark 356-2, with the processing light EL in the B-CHK operation. However, the processing head 12 may irradiate the passing area 355, which forms the mark 356 that is different from the fine mark 356-2, with the processing light EL. Namely, the processing baseline BLprc may be calculated based on the optical received result of the processing light EL through the mark 356 that is different from the fine mark 356-2.

Incidentally, in the above described description, an operation for calculating the measurement baseline BLmsr at the first and second timings and an operation for calculating the processing baseline BLprc at the third and fourth timings may be performed, whichever comes first. For example, the processing system SYSa may perform the operation for calculating the processing baseline BLprc at the third and fourth timings after performing the operation for calculating the measurement baseline BLmsr at the first and second timings. For example, the processing system SYSa may perform the operation for calculating the measurement baseline BLmsr at the first and second timings after performing the operation for calculating the processing baseline BLprc at the third and fourth timings.

(1-2-4) Light State Control Operation

Figure 17:
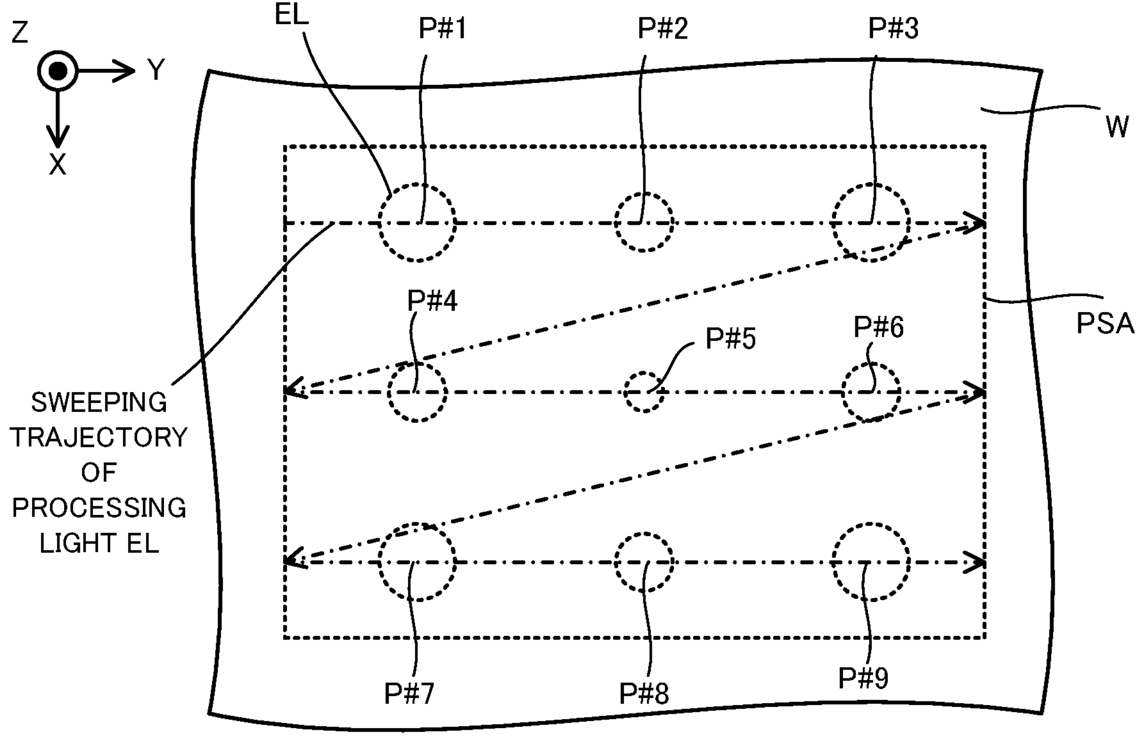
FIG. 17 is a planar view that conceptionally illustrates the spot diameter of the processing light at each position on a surface of the workpiece when the surface of the workpiece is swept with the processing light that is deflected by a Galvano mirror and that is displaced by a fθ lens.

Next, the light state control operation will be described. Firstly, with reference to FIG. 17, a technical reason why the light state control operation is performed. FIG. 17 is a planar view that conceptionally illustrates the spot diameter of the processing light EL at each position on the surface of the workpiece W when the surface of the workpiece W is swept with the processing light EL that is deflected by the Galvano mirror 1212 and that is displaced by the fθ lens 1213.

As illustrated in FIG. 17, the deflection of the processing light EL by the Galvano mirror 1212 allows a surface part of the surface of the workpiece W included in the processing shot area PSA to be swept by the processing light EL. In this case, a state where the state of the processing light EL is constant at any position in the processing shot area PSA is one example of an ideal state for processing the workpiece W with high accuracy. For example, a state where the state of the processing light EL with which a position P #1 is irradiated, the state of the processing light EL with which a position P #2 is irradiated, the state of the processing light EL with which a position P #3 is irradiated, the state of the processing light EL with which a position P #4 is irradiated, the state of the processing light EL with which a position P #5 is irradiated, the state of the processing light EL with which a position P #6 is irradiated, the state of the processing light EL with which a position P #7 is irradiated, the state of the processing light EL with which a position P #8 is irradiated and the state of the processing light EL with which a position P #9 is irradiated are same as one another is one example of the ideal state.

However, actually, as illustrated in FIG. 17, there is a possibility that the state of the processing light EL with which a certain position in the processing shot area PSA is irradiated is not same as the state of the processing light EL with which another position in the processing shot area PSA is irradiated. Namely, there is a possibility that the state of the processing light EL varies in the processing shot area PSA depending on the position that is irradiated with the processing light EL. Note that FIG. 17 illustrates an example in which the spot diameter of the processing light EL with which a certain position in the processing shot area PSA is irradiated is not same as the spot diameter of the processing light EL with which another position in the processing shot area PSA is irradiated. At least one of the characteristic of the Galvano mirror 1212 and a characteristic (typically, an aberration, a distribution of a transmittance and the assembly error) of the fθ lens 1213 is one reason for this.

Thus, the control apparatus 4 performs the light state control operation to change the state of the processing light EL in synchronization with the sweeping of the processing light EL so that a difference between the state of the processing light EL with which a certain position in the processing shot area PSA is irradiated and the state of the processing light EL with which another position in the processing shot area PSA is irradiated is smaller than that in the case where the light state control operation is not performed.

Firstly, the control apparatus 4 performs, as a part of the light state control operation, a state detection operation for detecting, by the light reception apparatus 35, the state of the processing light EL with which each of a plurality of positions in the processing shot area PSA is irradiated. In order to perform the state detection operation, as illustrated in FIG. 18A that is a cross-sectional view that illustrates a positional relationship between the processing head 12 and the light reception apparatus 35 in a period during which a state detection operation is performed and FIG. 18B that is a planar view that illustrates a positional relationship between the processing head 12 and the light reception apparatus 35 in a period during which a state detection operation is performed, the stage 32 and/or the processing head 12 moves so that the light reception apparatus 35 (especially, the passing area 355 forming the slit mark 356-1) is located in the processing shot area PSA. Namely, the control apparatus 4 changes the positional relationship between the processing head 12 and the light reception apparatus 35 (more specifically, a positional relationship between the processing shot area PSA and the slit mark 356-1) in a plane along the XY plane so that the slit mark 356-1 is located in the processing shot area PSA. As a result, the slit mark 356-1 is located at a first position DTP #1 in the processing shot area PSA. Then, the processing head 12 sweeps the surface part of the surface of the stage 32 included in the processing shot area PSA with the processing light EL. As a result, the light reception element 352 optically receives the processing light EL at a timing when the processing light EL traverses the slit mark 356-1 located at the first position DTP #1. Namely, the slit mark 356-1 located at the first position DTP #1 is irradiated with the processing light EL and the light reception element 352 optically receives the processing light EL at a timing when a displacement amount (in other words, a deflected angle) of the processing light EL is a first displacement amount. Thus, the control apparatus 4 obtains, from the light reception element 352, an information related to the state of the processing light EL with which the first position DTP #1 in the processing shot area PSA is irradiated. Namely, the control apparatus 4 obtains, from the light reception element 352, an information related to the state of the processing light EL the displacement amount of which is the first displacement amount. Furthermore, when the light reception element 352 optically receives the processing light EL, the control apparatus 4 obtains, from the position measurement apparatus 34, an information related to the position of the stage 32 at the timing when the light reception element 352 optically receives the processing light EL together. Since the light reception apparatus 35 is disposed in the stage 32, the information related to the position of the stage 32 includes an information related to the position of the light reception apparatus 35 (especially, the position of the slit mark 356-1).

Then, as illustrated in FIG. 19A that is a cross-sectional view illustrating the positional relationship between the processing head 12 and the light reception apparatus 35 in the period during which the state detection operation is performed and FIG. 19B that is a planar view illustrating the positional relationship between the processing head 12 and the light reception apparatus 35 in the period during which the state detection operation is performed, the stage 32 and/or the processing head 12 moves so that the light reception apparatus 35 (especially, the slit mark 356-1) is located at a position at which the light reception element 352 does not yet optically receive the processing light EL in the processing shot area PSA. Namely, the control apparatus 4 changes the positional relationship between the processing head 12 and the light reception apparatus 35 to change the positional relationship between the processing shot area PSA and the slit mark 356-1 in the plane along the XY plane. As a result, the slit mark 356-1 is located at a second position in the processing shot area PSA. Then, the processing head 12 sweeps the surface part of the surface of the stage 32 included in the processing shot area PSA with the processing light EL. As a result, the light reception element optically receives the processing light EL at a timing when the processing light EL traverses the slit mark 356-1 located at the second position. Namely, the slit mark 356-1 located at the second position is irradiated with the processing light EL and the light reception element optically receives the processing light EL at a timing when the displacement amount of the processing light EL is a second displacement amount. Thus, the control apparatus 4 obtains, from the light reception element 352, an information related to the state of the processing light EL with which the second position in the processing shot area PSA is irradiated. Namely, the control apparatus 4 obtains, from the light reception element 352, an information related to the state of the processing light EL the displacement amount of which is the second displacement amount. Even in this case, the control apparatus 4 obtains, from the position measurement apparatus 34, an information related to the position of the stage 32.

Then, the operation for changing the positional relationship between the processing shot area PSA and the slit mark 356-1 in the plane along the XY plane and the operation for obtaining the information related to the state of the processing light EL and the information related to the position of the stage 32 are repeated necessary times. As a result, the control apparatus 4 obtains the information related to the state of the processing light EL with which each of the plurality of positions in the processing shot area PSA is irradiated After the state detection operation is performed, the control apparatus 4 performs, as another part of the light state control operation, a state control operation for controlling the state of the processing light EL in synchronization with the sweeping of the processing light EL based on the information obtained by the state detection operation. Specifically, firstly, the control apparatus 4 calculates the position (especially, the position in the stage coordinate system) of the slit mark 356-1 at the timing when the light reception element 352 optically receives the processing light EL based on the information related to the position of the stage 32 that is obtained by the state detection operation. As a result, the control apparatus 4 obtains an information related to a relationship between the position of the slit mark 356-1 and the state of the processing light EL that is optically received through the slit mark 356-1. Moreover, the position of the slit mark 356-1 in the stage coordinate system is convertible to the position of the slit mark 356-1 in the processing shot area PSA. Thus, the control apparatus 4 obtains an information related to a relationship between the position of the slit mark 356-1 in the processing shot area PSA and the state of the processing light EL that is optically received through the slit mark 356-1. Namely, the control apparatus 4 obtains an information related to a relationship between the irradiation position of the processing light EL in the processing shot area PSA and the state of the processing light EL with which the irradiation position is irradiated.

When the obtained information indicates that the state of the processing light EL is constant (namely, does not change) regardless of the irradiation position of the processing light EL in the processing shot area PSA, it is estimated that the state of the processing light EL is the ideal state that is the state where the state of the processing light EL is constant at any position in the processing shot area PSA. Therefore, in this case, the control apparatus 4 may not change the state of the processing light EL in synchronization with the sweeping of the processing light EL when the workpiece W is actually processed. On the other hand, when the obtained information indicates that the state of the processing light EL changes depending on the irradiation position of the processing light EL in the processing shot area PSA, it is estimated that the state of the processing light EL is not the ideal state. Therefore, in this case, the control apparatus 4 changes the state of the processing light EL in synchronization with the sweeping of the processing light EL when the workpiece W is actually processed. Specifically, the control apparatus 4 changes the state of the processing light EL in synchronization with the sweeping of the processing light EL so that the difference between the state of the processing light EL with which a certain position in the processing shot area PSA is irradiated and the state of the processing light EL with which another position in the processing shot area PSA is irradiated becomes small. The control apparatus 4 changes the state of the processing light EL in synchronization with the sweeping of the processing light EL so that a variation of the state of the processing light EL in the processing shot area PSA becomes small. In this case, the control apparatus 4 may change the state of the processing light EL in synchronization with the sweeping of the processing light EL so that the state of the processing light EL is constant at any position in the processing shot area PSA. The control apparatus 4 may change the state of the processing light EL in synchronization with the sweeping of the processing light EL so that there is no variation of the state of the processing light EL in the processing shot area PSA. Note that the control apparatus 4 may not change the state of the processing light EL in synchronization with the sweeping of the processing light EL when the workpiece W is actually processed, even when the state of the processing light EL changes depending on the irradiation position of the processing light EL in the processing shot area PSA For example, the control apparatus 4 may change the state of the processing light EL in synchronization with the sweeping of the processing light EL to satisfy such a spot diameter condition that a difference between the spot diameter of the processing light EL at the first position in the processing shot area PSA and the spot diameter of the processing light EL at the second position in the processing shot area PSA is smaller than (alternatively, equal to) a predetermined allowable value. In this case, the control apparatus 4 may change the light concentration position of the processing light EL in synchronization with the sweeping of the processing light EL to satisfy the spot diameter condition. For example, the control apparatus 4 may change the light concentration position of the processing light EL to a desired value that is determined based on the irradiation position of the processing light EL to satisfy the spot diameter condition. For example, the control apparatus 4 may change the light concentration position of the processing light EL to a desired value that differs or is optimized for each irradiation position of the processing light EL to satisfy the spot diameter condition.

For example, the control apparatus 4 may change the state of the processing light EL in synchronization with the sweeping of the processing light EL to satisfy such an intensity condition that a difference between the intensity (for example, the energy amount per unit area) of the processing light EL at the first position in the processing shot area PSA and the intensity of the processing light EL at the second position in the processing shot area PSA is smaller than (alternatively, equal to) a predetermined allowable value. In this case, the control apparatus 4 may change the intensity of the processing light EL generated by the processing light source 11 in synchronization with the sweeping of the processing light EL to satisfy the intensity condition. The control apparatus 4 may change a controlling aspect of the intensity distribution of the processing light EL by a not-illustrated intensity distribution control member of the irradiation optical system 121 in synchronization with the sweeping of the processing light EL to satisfy the intensity condition.

For example, the control apparatus 4 may change the state of the processing light EL in synchronization with the sweeping of the processing light EL to satisfy such an intensity distribution condition that a difference between the intensity distribution of the processing light EL at the first position in the processing shot area PSA and the intensity distribution of the processing light EL at the second position in the processing shot area PSA is smaller than (alternatively, equal to) a predetermined allowable range. In this case, the control apparatus 4 may change the controlling aspect of the intensity distribution of the processing light EL by the not-illustrated intensity distribution control member of the irradiation optical system 121 in synchronization with the sweeping of the processing light EL to satisfy the intensity distribution condition.

According to the above described light state control operation, the variation of the state of the processing light EL caused by the characteristic of at least one of the Galvano mirror 1212 and the fθ lens 142 is reduced. Therefore, the processing system SYSa is capable of properly processing the workpiece W by using the processing light EL the variation of the state of which is reduced.

In the above described description, the processing head 12 irradiates the passing area 355 forming the slit mark 356-1 with the processing light EL in the light state control operation. However, the processing head 12 may irradiate the passing area 355 forming the mark 356 (for example, the rectangular mark 356-3) that is different from the slit mark 356-1 with the processing light EL. Namely, the state of the processing light EL may be controlled based on the optical received result of the processing light EL through the mark 356 (for example, the rectangular mark 356-3) that is different from the slit mark 356-1.

(1-2-5) Galvano Control Operation

Next, the Galvano control operation will be described. As described above, the Galvano control operation is an operation for controlling the Galvano mirror 1212 to reduce the influence of the temperature drift that is the phenomenon that the irradiation position of the processing light EL in the plane along the XY plane varies depending on the temperature (namely, the heat) of the Galvano mirror 1212. Firstly, with reference to FIG. 20A and FIG. 20B, the phenomenon that the irradiation position of the processing light EL in the plane along the XY plane varies depending on the temperature of the Galvano mirror 1212 will be described.

Figure 20A:
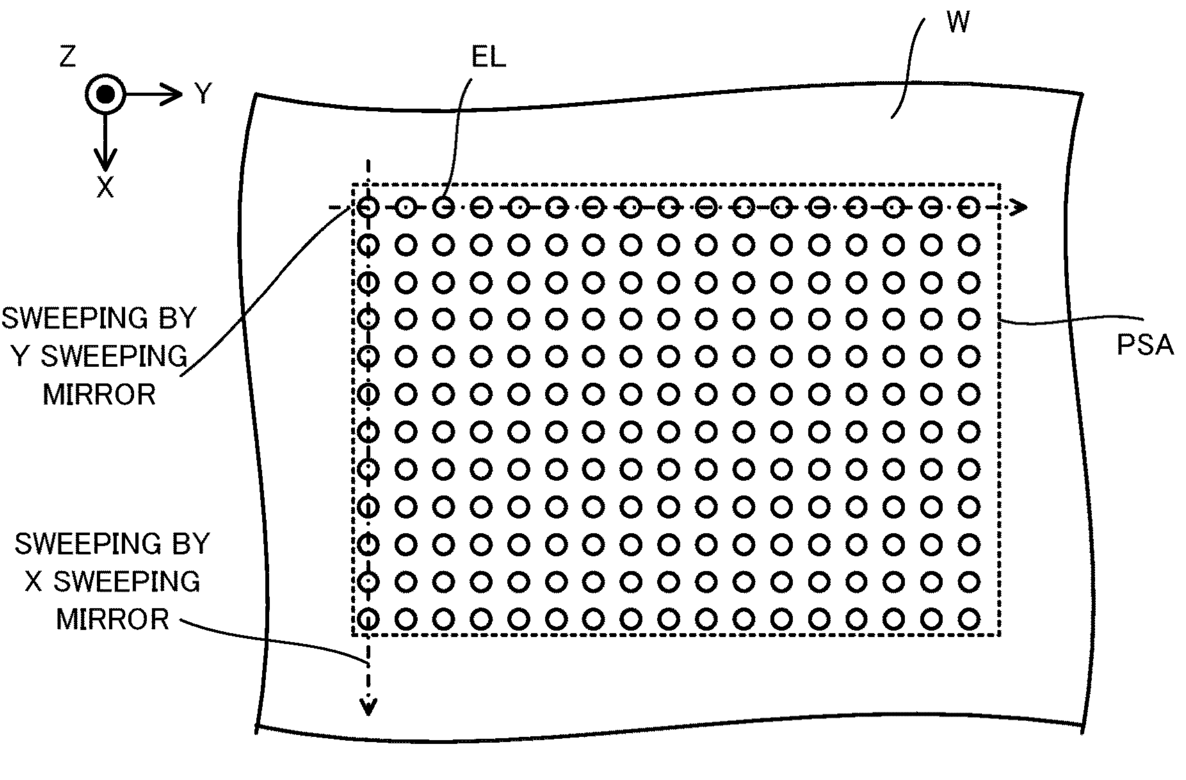
FIG. 20A is a planar view that illustrates an irradiation position of the processing light on a surface of the workpiece (namely, a surface along a XY plane) in a situation where a temperature draft does not arise and FIG. 20B a planar view that illustrates the irradiation position of the processing light on the surface of the workpiece (namely, a surface along a XY plane) in a situation where the temperature draft arises.
Figure 20B:
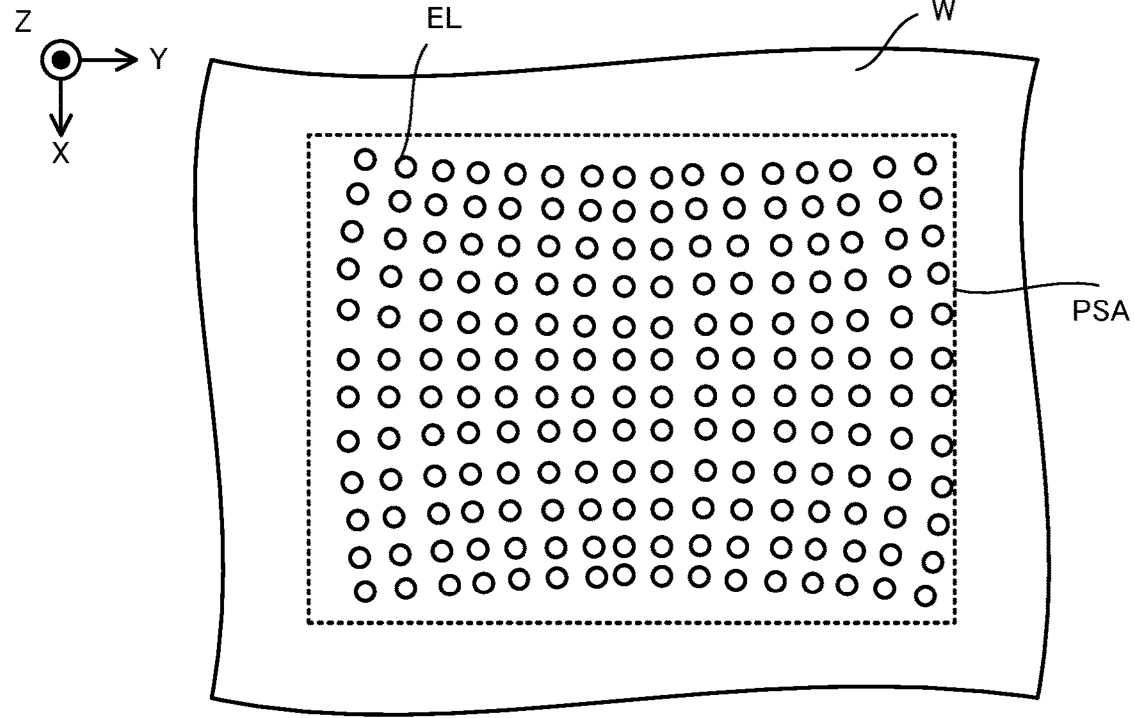

FIG. 20A is a planar view that illustrates the irradiation position of the processing light EL on the surface of the workpiece W (namely, in the plane along the XY plane) in the situation where the temperature drift does not arise. FIG. 20B is a planar view that illustrates the irradiation position of the processing light EL on the surface of the workpiece W (namely, in the plane along the XY plane) in the situation where the temperature drift arises. As illustrated in FIG. 20A, when the temperature drift does not arise, the processing light EL is allowed to sweep the surface of the workpiece W (namely, the plane along the XY plane) along an ideal sweeping trajectory in the processing shot area PSA. Specifically, when the temperature drift does not arise, the moving direction of the irradiation position of the processing light EL by the Y sweeping mirror 1212Y is same as the moving direction of the stage 32 by the Y slide member 332 (typically, the Y axis direction in the stage coordinate system). Similarly, when the temperature drift does not arise, the moving direction of the irradiation position of the processing light EL by the X sweeping mirror 1212X is same as the moving direction of the stage 32 by the X slide member 331 (typically, the X axis direction in the stage coordinate system). On the other hand, as illustrated in FIG. 20B, when the temperature drift arises, there is a possibility that the processing light EL sweeps the surface of the workpiece W along a sweeping trajectory that is different from the ideal sweeping trajectory in the processing shot area PSA. There is a possibility that the moving direction of the irradiation position of the processing light EL by the Y sweeping mirror 1212Y is not same as the moving direction of the stage 32 by the Y slide member 332. Similarly, there is a possibility that the moving direction of the irradiation position of the processing light EL by the X sweeping mirror 1212X is not same as the moving direction of the stage 32 by the X slide member 331.

Namely, when the temperature drift arises, there is a possibility that the irradiation position of the processing light EL deflected by the Galvano mirror 1212 is different from an ideal position (for example, a designed position), compared to the case where the temperature drift does not arise. When the temperature drift arises, there is a possibility that the sweeping trajectory of the processing light EL deflected by the Galvano mirror 1212 is different from the ideal sweeping trajectory (for example, a designed sweeping trajectory), compared to the case where the temperature drift does not arise. This state in which the irradiation position of the processing light EL is different from the ideal position is not desirable from the viewpoint of the appropriate processing of workpiece W.

Thus, the control apparatus 4 determines, based on the optical received result by the light reception element 352, the irradiation position of the processing light EL in the plane along the XY plane in a period during which the Galvano mirror 1212 deflects the processing light EL. Then, the control apparatus 4 controls the Galvano mirror 1212 so that the irradiation position of the processing light EL in the plane along the XY plane in the period during which the Galvano mirror 1212 deflects the processing light EL comes close to (or coincides with) the ideal position.

The control apparatus 4 firstly performs, as a part of the Galvano control operation, an irradiation position detection operation for detecting the irradiation position of the processing light EL, which is deflected by the Galvano mirror 1212, by the light reception apparatus 35. In order to perform the irradiation position detection operation, the stage 32 and/or the processing head 12 moves so that the light reception apparatus 35 (especially, the slit mark 356-1) is located in the processing shot area PSA. In this state, the processing head 12 sweeps a surface portion of the surface of the stage 32 that is included in the processing shot area PSA with the processing light EL. As a result, the light reception element 352 optically receives the processing light EL at the timing when the processing light EL traverses the slit mark 356-1. In this case, the control apparatus 4 obtains the information related to the position of the stage 32 at the timing when the light reception element 352 optically receives the processing light EL from the position measurement apparatus 34. Since the light reception apparatus 35 is disposed in the stage 32, the information relating to the position of the stage 32 includes the information related to the position of the light reception apparatus 35 (especially, the position of the slit mark 356-1). The above described operation is repeated while moving the light reception apparatus 35 (especially, the slit mark 356-1) in the processing shot area PSA. For example, the light reception element 352 optically receives the processing light EL with which a first irradiation position in the processing shot area PSA is irradiated and optically receives the processing light EL with which a second irradiation position in the processing shot area PSA is irradiated. Namely, the light reception element 352 optically receives the processing light EL when the stage 32 moves to a first position so that the slit mark 356-1 is located at the first irradiation position in the processing shot area PSA, and optically receives the processing light EL when the stage 32 moves to a second position so that the slit mark 356-1 is located at the second irradiation position in the processing shot area PSA. As a result, the control apparatus 4 obtains an information related to a plurality of irradiation positions each of which is irradiated with the processing light EL deflected by the Galvano mirror 1212. Namely, the control apparatus 4 obtains an information related to the irradiation position of the processing light EL in each of the plurality of areas in the plane along the XY plane. Considering that a trajectory connecting the plurality of irradiation positions in sequence is the sweeping trajectory of the processing light EL (namely, the moving direction of the irradiation position of the processing light EL), the control apparatus 4 obtains an information related to the sweeping trajectory of the processing light EL (namely, the moving direction of the irradiation position of the processing light EL) deflected by the Galvano mirror 1212.

After the irradiation position detection operation is performed, the control apparatus 4 performs, as another part of the Galvano control operation, a control operation for actually controlling the Galvano mirror 1212 based on the information obtained by the irradiation position detection operation. Specifically, the control apparatus 7 firstly calculates, based on the information related to the irradiation positions of the processing light EL obtained by the irradiation position detection operation, a difference between the irradiation position of the processing light EL and the ideal position in the plane along the XY plane in the period during which the Galvano mirror 1212 deflects the processing light EL. Then, the control apparatus 4 controls the Galvano mirror 1212 so that the calculated difference is reduced (alternatively, reduced to zero). For example, the control apparatus 4 may control a driving amount (specifically, a swinging amount or a rotating amount) of the X sweeping mirror 1212X and the Y sweeping mirror 1212Y of the Galvano mirror 1212. As a result, the irradiation position (namely, the sweeping position) of the processing light EL in the plane along the XY plane is corrected to come close to or coincide with the ideal position. The irradiation position of the processing light EL in at least one of the X axis direction and the Y axis direction is corrected to come close to or coincide with the ideal position. The sweeping trajectory of the processing light EL is corrected to come close to or coincide with the ideal trajectory. Typically, the moving direction of the irradiation position of the processing light EL by the Y sweeping mirror 1212Y is same as the moving direction of the stage 32 by the Y slide member 332. Similarly, the moving direction of the irradiation position of the processing light EL by the X sweeping mirror 1212X is same as the moving direction of the stage 32 by the X slide member 331.

According to the above described Galvano control operation, the influence of the temperature drift, which is the phenomenon that the irradiation position of the processing light EL in the plane along the XY plane varies (namely, fluctuates) depending on the temperature of the Galvano mirror 1212, is reduced. Therefore, the processing system SYS is capable of processing the workpiece W with relatively high accuracy by irradiating the processing light EL deflected by the Galvano mirror 1212 at the ideal position. Note that a phenomenon that the irradiation position of the processing light EL in the plane along the XY plane varies (namely, fluctuates) depending on a temperature of an optical system (the fθ lens 1213 as one example) other than the Galvano mirror 1212 may be reduced in the same manner as this example.

In the above described description, the processing head 12 irradiates the passing area 355 forming the slit mark 356-1 with the processing light EL in the Galvano control operation. However, the processing head 12 may irradiate the passing area 355 forming the mark 356 (for example, the rectangular mark 356-3) that is different from the slit mark 356-1 with the processing light EL. Namely, the Galvano mirror 1212 may be controlled based on the optical received result of the processing light EL through the mark 356 (for example, the rectangular mark 356-3) that is different from the slit mark 356-1.

(1-3) Technical Effect of Processing System SYSa

The above described processing system SYSa is capable of properly processing the workpiece W by using at least one of the optical received result of the processing light EL by the light reception apparatus 35 and the measured result of the mark 356 of the light reception apparatus 35 by the measurement apparatus 2.

(2) Processing System SYSb in Second Example Embodiment

Figure 21:
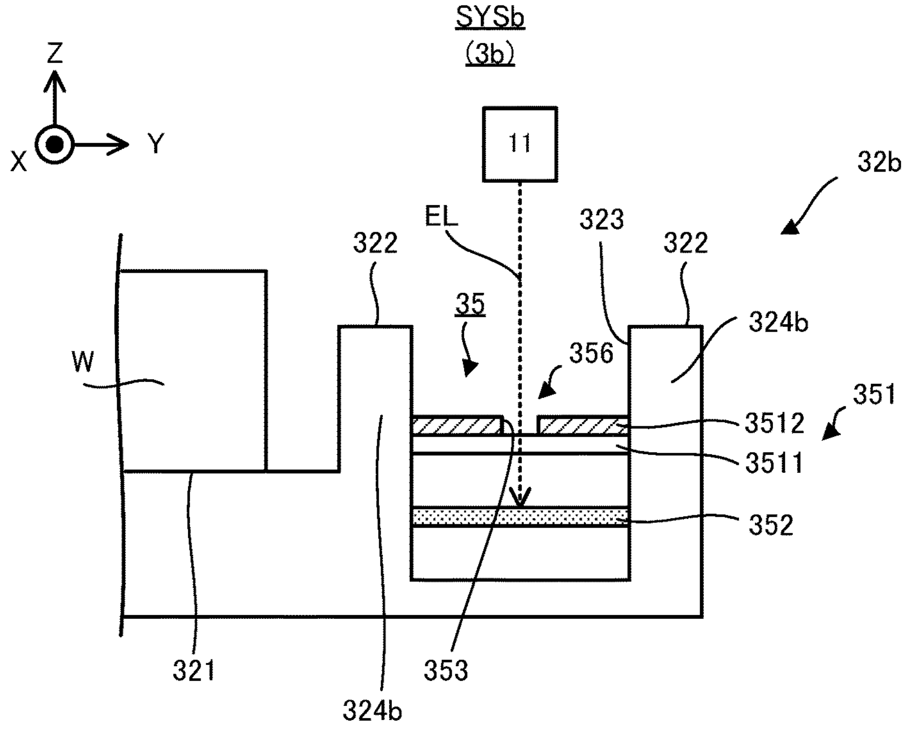
FIG. 21 is a cross-sectional view that illustrates a configuration of the stage in a second example embodiment.

Next, the processing system SYS in a second example embodiment (in the below described description, the processing system SYS in the second example embodiment is referred to as a "processing system SYSb") will be described. The processing system SYSb in the second example embodiment is different from the above described processing system SYSa in the first example embodiment in that it includes a stage apparatus 3*b* instead of the stage apparatus 3. Another feature of the processing system SYSb may be same as another feature of the processing system SYSa. The stage apparatus 3*b* is different from the stage apparatus 3 in that it includes a stage 32*b* instead of the stage 32. Another feature of the stage apparatus 3*b* may be same as another feature of the stage apparatus 3. Thus, in the below describe description, with reference to FIG. 21, the stage 32*b* in the second example embodiment will be described. FIG. 21 is a cross-sectional view that illustrates a configuration of the stage 32*b* in the second example embodiment.

As illustrated in FIG. 21, the stage 32*b* in the second example embodiment is different from the stage 32 in the first example embodiment in that at least a part of the outer circumference surface 322 is located above the placement surface 321 In this case, an outer circumference member 324*b* of the stage 32*b* including the outer circumference surface 322 located above the placement surface 321 (namely, the outer circumference member 324*b* of the stage 32*b* located around the placement surface 321) forms a convex part that protrudes from the placement surface 321.

Even in the second example embodiment, the hole 323 in which the light reception apparatus 35 is disposed is formed at the outer circumference surface 322 (especially, the outer circumference surface 322 located above the placement surface 321). In this case, the hole 323 is formed to be adjacent to the outer circumference member 324*b* that is the convex part protruding from the placement surface 321. Especially, the hole 323 is formed to be surrounded by the outer circumference member 324*b* that is the convex part protruding from the placement surface 321

The processing system SYSb in the second example embodiment is capable of achieving an effect that is same as an effect achievable by the above described processing system SYSa in the first example embodiment.

(3) Processing System SYSc in Third Example Embodiment

Figure 22:
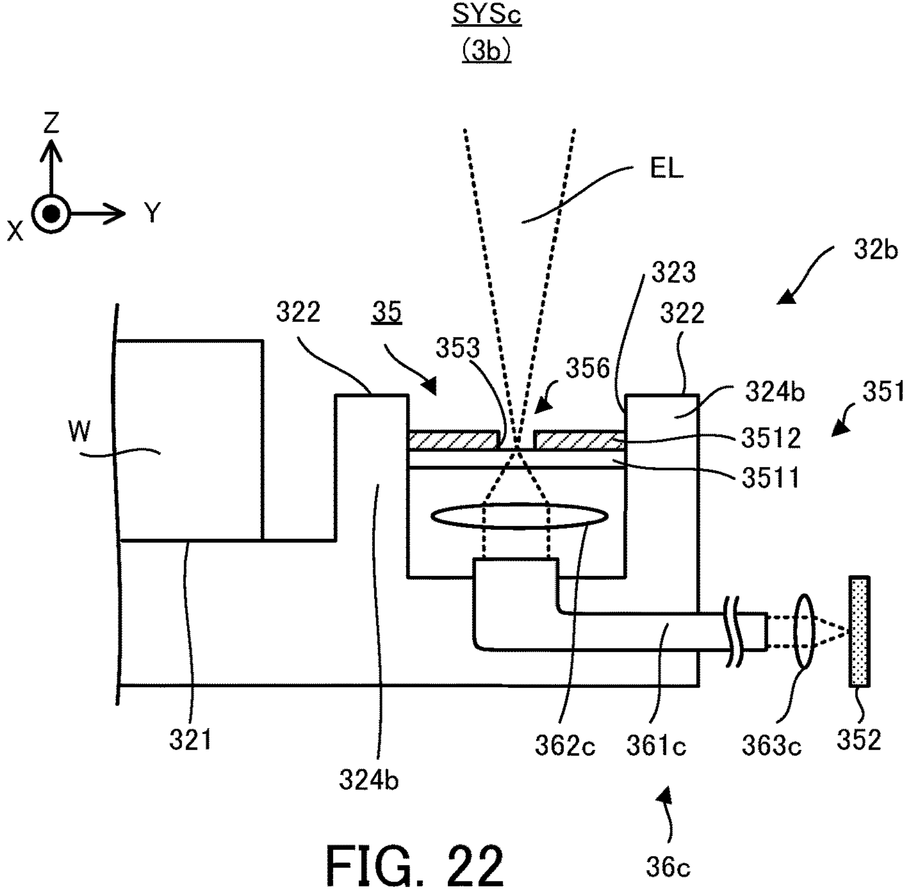
FIG. 22 is a cross-sectional view that illustrates an arrangement method the light reception apparatus in a third example embodiment.

Next, the processing system SYS in a third example embodiment (in the below described description, the processing system SYS in the third example embodiment is referred to as a "processing system SYSc") will be described. The processing system SYSc in the third example embodiment is different from the above described processing system SYSb in the second example embodiment in that the arrangement method of the light reception apparatus 35 is different. Another feature of the processing system SYSc may be same as another feature of the processing system SYSb. Thus, in the below describe description, with reference to FIG. 22, the arrangement method of the light reception apparatus 35 in the third example embodiment will be described. FIG. 22 is a cross-sectional view that illustrates the arrangement method of the light reception apparatus 35 in the third example embodiment.

As illustrated in FIG. 22, in the third example embodiment, a part of the light reception apparatus 35 may be disposed in the hole 323 and another part of the light reception apparatus 35 may not be disposed in the hole 323. Namely, a part of the light reception apparatus 35 may be disposed inside the hole 323 and another part of the light reception apparatus 35 may be disposed outside the hole 323. In an example illustrated in FIG. 22, the beam passing member 351 is disposed inside the hole 323 and the light reception element 352 is disposed outside the hole 323.

A part of the light reception apparatus 35 disposed inside the hole 323 may be optically connected to another part of the light reception apparatus 35 disposed outside the hole 323 through a light transmission member 36*c* through which the processing light EL entering the light reception apparatus 35 is transmittable. For example, in the example illustrated in FIG. 22, the beam passing member 351 disposed inside the hole 323 may be optically connected to the light reception element 352 disposed outside the hole 323 through the light transmission member 36*c*. Note that a state where "the beam passing member 351 is optically connected to the light reception element 352 through the light transmission member 36*c*" may mean a state where "the processing light EL entering the beam passing member 351 is transmittable to the light reception element 352 through the light transmission member 36*c*". The light transmission member 36*c* may include, for example, a light guide 361*c*, an optical system 362*c* that is configured to guide the processing light EL through the beam passing member 351 (namely, the processing light EL through a part of the light reception apparatus 35 disposed inside the hole 323) to an input end of the light guide 361*c*, and an optical system 363*c* that is configured to guide the processing light EL from an output end of the light guide 361*c* to the light reception element 352 (namely, another part of the light reception apparatus 35 disposed outside the hole 323).

The processing system SYSc in the third example embodiment is capable of achieving an effect that is same as an effect achievable by the above described processing system SYSb in the second example embodiment. Moreover, in the third example embodiment, all of the light reception apparatus 35 is not necessarily disposed in the stage 32. Thus, a downsizing and/or a simplification of the stage 32 is facilitated. Furthermore, a degree of freedom in disposing the light reception apparatus 35 is increased.

Note that the processing system SYSa in the first example embodiment described above may include a feature unique to the third example embodiment. The feature unique to the third example embodiment may include a feature related to the disposition of the light reception apparatus 35 (especially, the disposition of the light reception apparatus 35 outside the hole 323).

(4) Processing System SYSd in Fourth Example Embodiment

Figure 23:
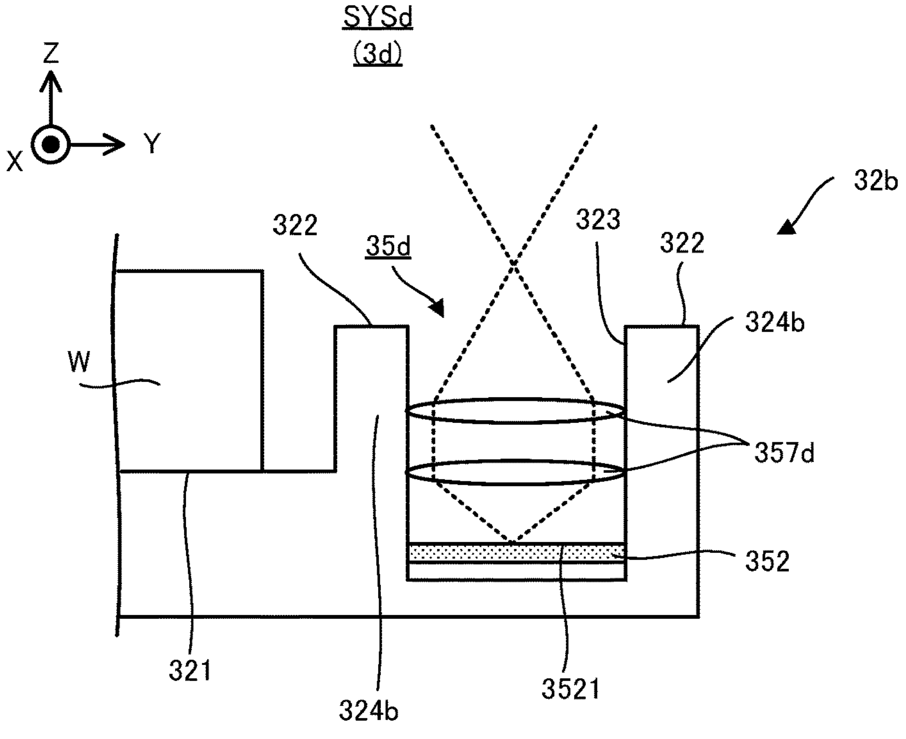
FIG. 23 is a cross-sectional view that illustrates a configuration of the light reception apparatus in a fourth example embodiment.

Next, the processing system SYS in a fourth example embodiment (in the below described description, the processing system SYS in the fourth example embodiment is referred to as a "processing system SYSd") will be described. The processing system SYSd in the fourth example embodiment is different from the above described processing system SYSb in the second example embodiment in that it includes a stage apparatus 3*d* instead of the stage apparatus 3*b*. Another feature of the processing system SYSd may be same as another feature of the processing system SYSb. The stage apparatus 3*d* is different from the stage apparatus 3*b* in that it includes a light reception apparatus 35*d* instead of the light reception apparatus 35. Another feature of the stage apparatus 3*d* may be same as another feature of the stage apparatus 3*b*. Thus, in the below describe description, with reference to FIG. 23, the light reception apparatus 35*d* in the fourth example embodiment will be described. FIG. 23 is a cross-sectional view that illustrates a configuration of the light reception apparatus 35*d* in the fourth example embodiment.

As illustrated in FIG. 23, the light reception apparatus 35*d* is different from the light reception apparatus 35 in that it may not include the beam passing member 351. Furthermore, the light reception apparatus 35*d* is different from the light reception apparatus 35 in that it includes an imaging optical system 357*d*. Another feature of the light reception apparatus 35*d* may be same as another feature of the light reception apparatus 35.

The imaging optical system 357*d* is configured to form, on the light reception surface 3521 of the light reception element 352, an image of an object that is located above the imaging optical system 357*d* (namely, at a side opposite to the light reception surface 3521). Namely, the imaging optical system 357*d* is configured to form, on the light reception surface 3521 that is located at the image side from the imaging optical system 357*d*, the image of the object that is located at the object side from the imaging optical system 357*d*. Thus, the imaging optical system 357*d* and the light reception element 352 are disposed so that an image plane of the imaging optical system 357*d* is same as the light reception surface 3521 of the light reception element 352 or the image plane of the imaging optical system 357*d* is located near the light reception surface 3521 of the light reception element 352

The light reception element 352 optically receives a light that forms the image on the light reception surface 3521. Thus, the light reception element 352 may substantially serve as an imaging element that tis configured to capture an image of the object that is located at the object side from the imaging optical system 357*d*. Namely, the light reception apparatus 35*d* may serve as an imaging apparatus that is configured to capture an image of the object that is located at the object side from the imaging optical system 357*d* by using the light reception element 352 from the stage 32 side viewed from the object.

For example, the light reception element 352 may capture an image of at least a part of the processing head 12. For example, the light reception element 352 may capture an image of at least a part of the irradiation optical system 121 of the processing head 12. For example, the light reception element 352 may capture an image of at least a part of an optical member (for example, the fθ lens 1213) of the irradiation optical system 121. For example, the light reception element 352 may capture an image of at least a part of the measurement head 21.

As described above, the processing head 12 emits the processing light EL. In this case, the light reception element 352 may capture an image of the processing light EL emitted from the processing head 12. Namely, the light reception element 352 may capture the image of at least a part of the processing head 12 from the stage 32 side viewed from the processing head 12. As described above, the measurement head 21 emits the measurement light ML. In this case, the light reception element 352 may capture an image of the measurement light ML emitted from the measurement head 21.

The optical received result by the light reception element 352 (namely, the image captured by the light reception element 352 that serves as the imaging element) may be outputted to the control apparatus 4. The control apparatus 4 may control the processing system SYSd (for example, at least one of the processing apparatus 1, the measurement apparatus 2 and the stage apparatus 3) based on the image captured by the light reception element 352 (namely, a captured result by the light reception element 352). For example, when the light reception element 352 captures the image of the processing head 12, the control apparatus 4 may control a characteristic of the processing light EL based on the captured result by the light reception element 352. In this case, the control apparatus 4 may serve as a beam characteristic change apparatus that is configured to control the characteristic of the processing light EL based on the captured result by the light reception element 352. For example, when the light reception element 352 captures the image of the processing light EL, the control apparatus 4 may control the irradiation position of the processing light EL based on the captured result by the light reception element 352.

Note that a mark that is measurable by the measurement apparatus 2 (namely, a mark that is usable as one example of the mark 356) may be formed at an optical member, which is located at the most incident side, of optical members (a lens and so on) of the imaging optical system 357*d*. This mark may be formed outside an effective area (an area through which the light received by the imaging element 3521 passes) of the imaging optical system 357*d*. Moreover, this mark may be formed at the outer circumference surface 322.

The processing system SYSd in the fourth example embodiment is capable of processing the workpiece W based on the captured result by the light reception apparatus 35*d* that is configured to serve as the imaging apparatus. Therefore, the processing system SYSd is capable of properly processing the workpiece W based on an information that is determinable from the image corresponding to the captured result by the light reception apparatus 35*d*.

Note that at least one of the processing system SYSa in the first example embodiment and the processing system SYSc in the third example embodiment described above may include a feature unique to the fourth example embodiment. The feature unique to the fourth example embodiment may include a feature related to the light reception apparatus 35*d*.

(5) Processing System SYSe in Fifth Example Embodiment

Figure 24:
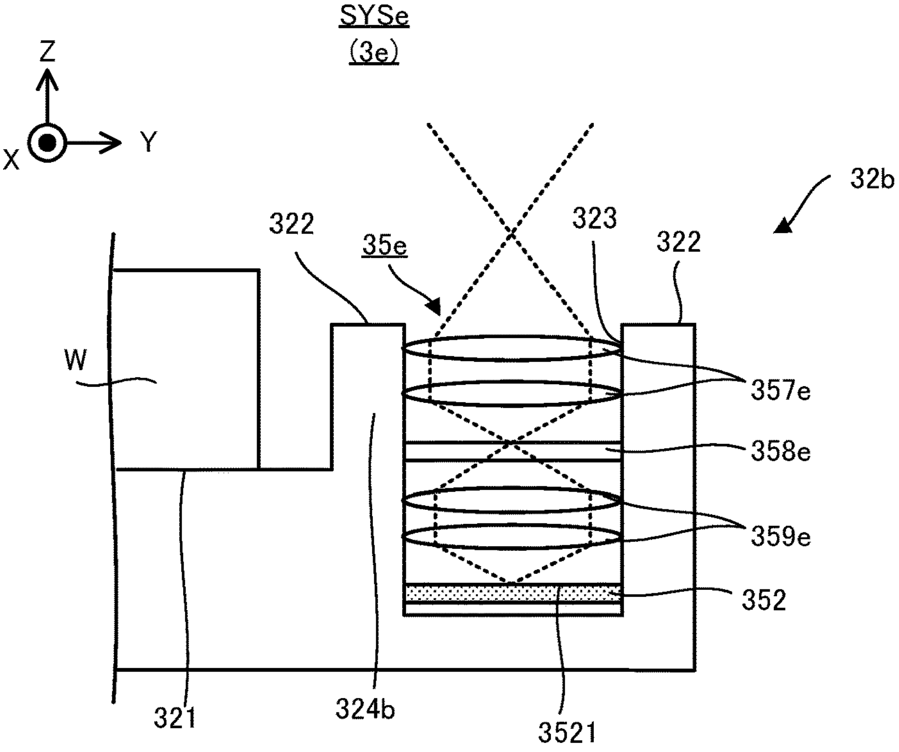
FIG. 24 is a cross-sectional view that illustrates a configuration of the light reception apparatus in a fifth example embodiment.

Next, the processing system SYS in a fifth example embodiment (in the below described description, the processing system SYS in the fifth example embodiment is referred to as a "processing system SYSe") will be described. The processing system SYSe in the fifth example embodiment is different from the above described processing system SYSb in the second example embodiment in that it includes a stage apparatus 3*e* instead of the stage apparatus 3*b*. Another feature of the processing system SYSe may be same as another feature of the processing system SYSb. The stage apparatus 3*e* is different from the stage apparatus 3*b* in that it includes a light reception apparatus 35*e* instead of the light reception apparatus 35. Another feature of the stage apparatus 3*e* may be same as another feature of the stage apparatus 3*b*. Thus, in the below describe description, with reference to FIG. 24, the light reception apparatus 35*e* in the fifth example embodiment will be described. FIG. 24 is a cross-sectional view that illustrates a configuration of the light reception apparatus 35*e* in the fifth example embodiment.

As illustrated in FIG. 24, the light reception apparatus 35*e* is different from the light reception apparatus 35 in that it may not include the beam passing member 351. Furthermore, the light reception apparatus 35*e* is different from the light reception apparatus 35 in that it includes an imaging optical system 357*e*, an index plate 358*e* and an imaging optical system 359*e*. Another feature of the light reception apparatus 35*e* may be same as another feature of the light reception apparatus 35.

Figure 25A:
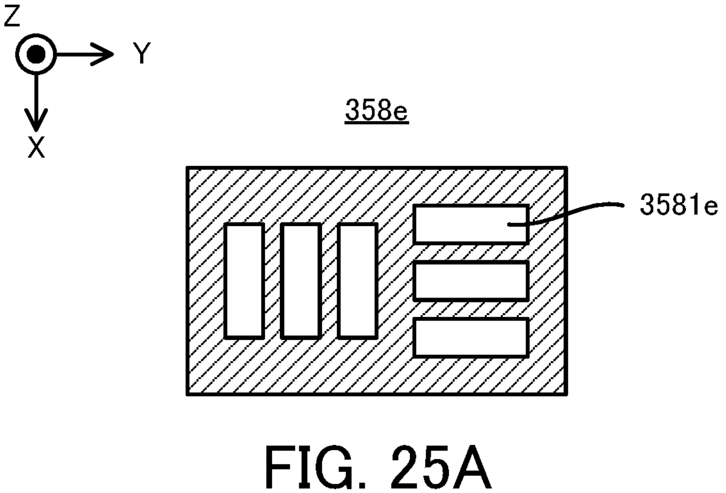
FIG. 25 Each of FIG. 25A
FIG. 25B is a planar view that illustrates one example of an index plate.
Figure 25B:
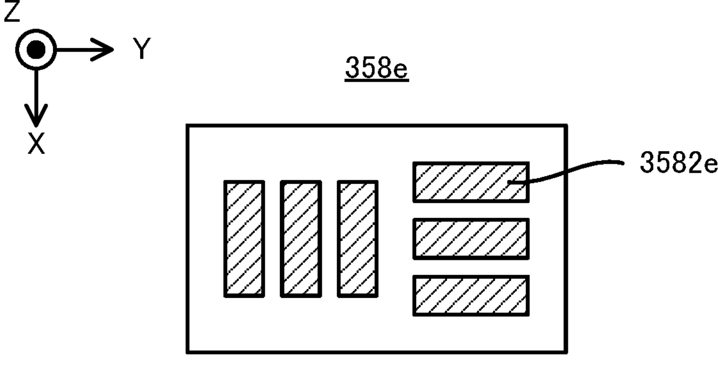

The imaging optical system 357*e* is configured to form an intermediate image on an image plane of the imaging optical system 357*e*. The index plate 358*e* is disposed at the image plane of the imaging optical system 357*e*. The index plate 358*e* is a plate-like member on which a predetermined index is formed. As illustrated in FIG. 25A that is a planar view illustrating one example of the index plate 358*e*, the index may be formed by a passing pattern 3581*e* through which a light entering the index plate 358*e* is allowed to pass. As illustrated in FIG. 25B that is a planar view illustrating another example of the index plate 358*e*, the index may be formed by an attenuation pattern 3582*e* that is configured to attenuate (shield in some cases) the light entering the index plate 358*e*. The imaging optical system 359*e* is configured to form, on the light reception surface 3521 of the light reception element 352, an image of the index plate 358*e* on which the intermediate image is formed by the imaging optical system 357*e* (namely, an image of the index that is formed by at least one of the passing pattern 3581*e* and the attenuation pattern 3582*e*). Thus, the imaging optical system 359*e* and the light reception element 352 are disposed so that an image plane of the imaging optical system 359*e* is located on the light reception surface 3521 of the light reception element 352 or the image plane of the imaging optical system 359*e* is located near the light reception surface 3521 of the light reception element 352.

The light reception element 352 optically receives a light that forms the image (namely, the image of the index plate 358*e*) on the light reception surface 3521. Thus, the light reception element 352 may substantially serve as an imaging element (an imaging apparatus) that tis configured to capture the image of the index plate 358*e*.

The optical received result by the light reception element 352 (namely, the image of the index plate 358*e*) captured by the light reception element 352 that serves as the imaging element) may be outputted to the control apparatus 4. The control apparatus 4 may control the processing system SYSe (for example, at least one of the processing apparatus 1, the measurement apparatus 2 and the stage apparatus 3) based on the image captured by the light reception element 352 (namely, the captured result by the light reception element 352).

Note that the measurement apparatus 2 may measure, as one example of the above described mark 356, the passing pattern 3581*e* (alternatively, the attenuation pattern 3582*e*) formed on the index plate 358*e* through the imaging optical system 357*e*.

The processing system SYSe in the fifth example embodiment is capable of processing the workpiece W based on the captured result by the light reception apparatus 35*e* that is configured to serve as the imaging apparatus. Therefore, the processing system SYSe is capable of properly processing the workpiece W based on an information that is determinable from the image corresponding to the captured result by the light reception apparatus 35*e*.

Note that at least one of the processing system SYSa in the first example embodiment and the processing system SYSc in the third example embodiment to the processing system SYSd in the fourth example embodiment described above may include a feature unique to the fifth example embodiment. The feature unique to the fifth example embodiment may include a feature related to the light reception apparatus 35*e*.

(6) Processing System SYSf in Sixth Example Embodiment

Figure 26:
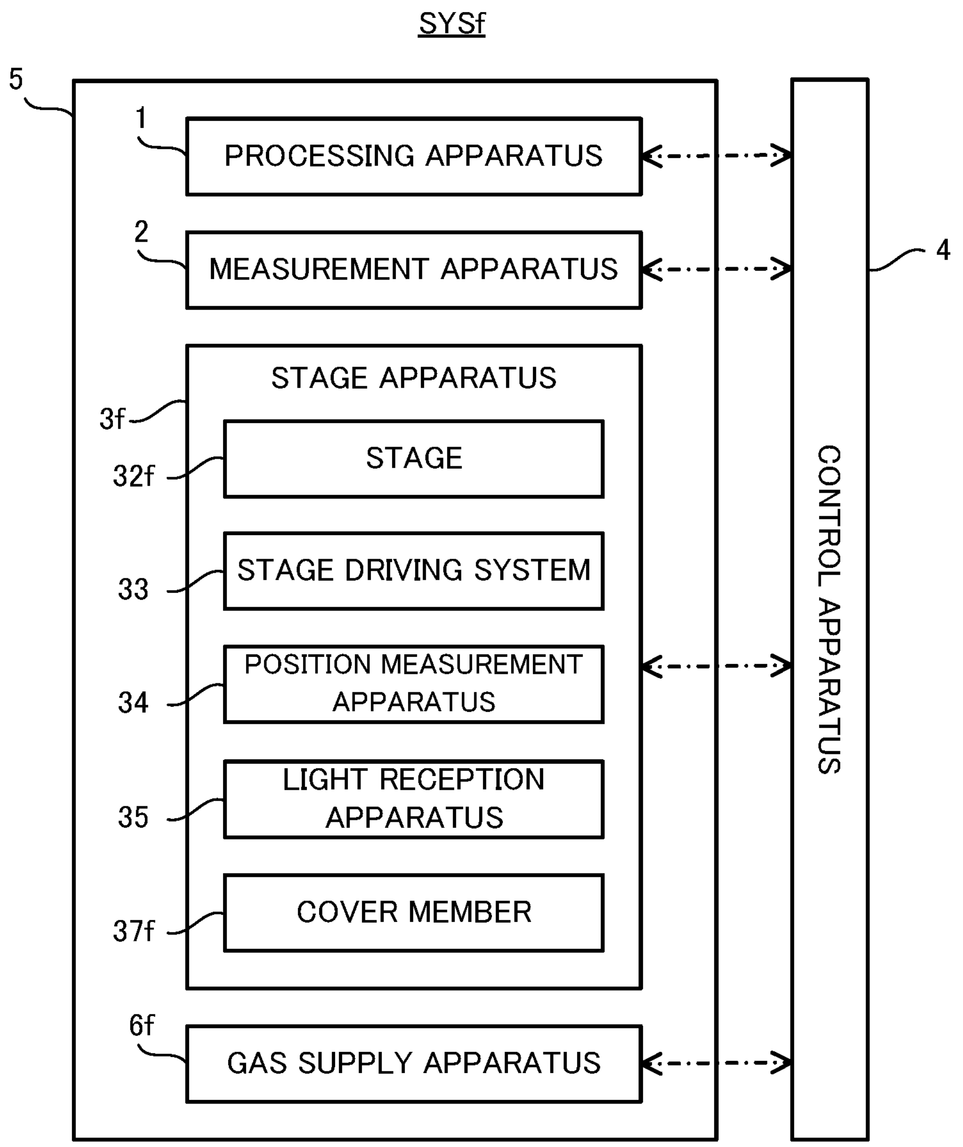
FIG. 26 is a system configuration diagram that illustrates a system configuration of the processing system in a sixth example embodiment.

Next, with reference to FIG. 26, the processing system SYS in a sixth example embodiment (in the below described description, the processing system SYS in the sixth example embodiment is referred to as a "processing system SYSf") will be described. FIG. 26 is a system configuration diagram that illustrates a system configuration of the processing system SYSf in the sixth example embodiment.

Figure 27:
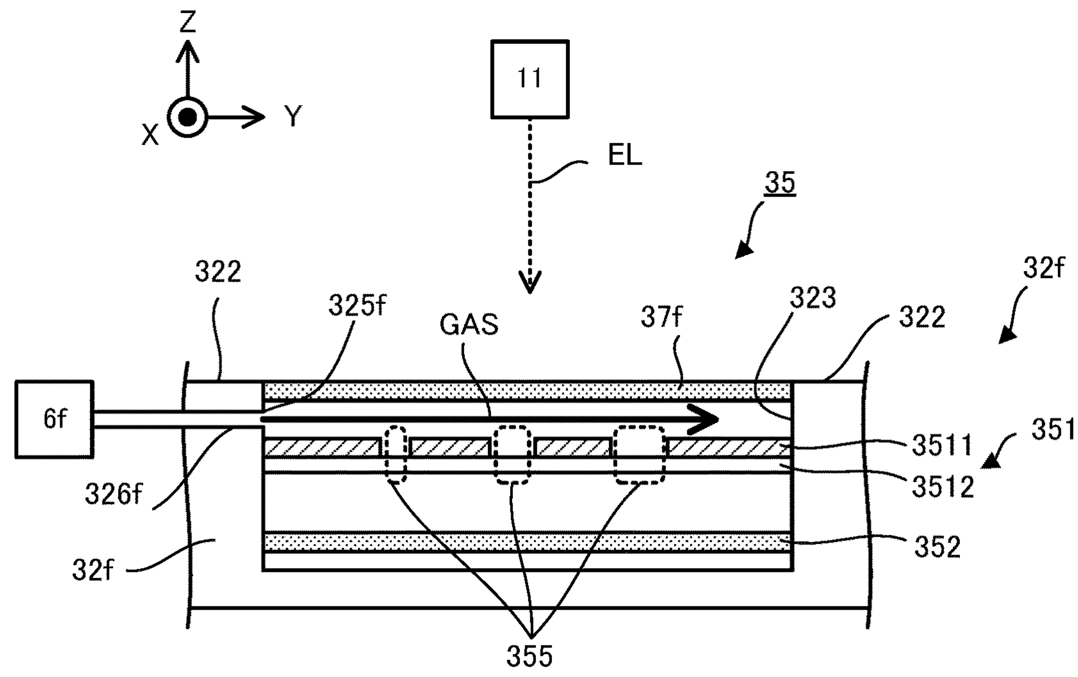
FIG. 27 is a cross-sectional view that illustrates a configuration of the stage including a cover member.
Figure 28:
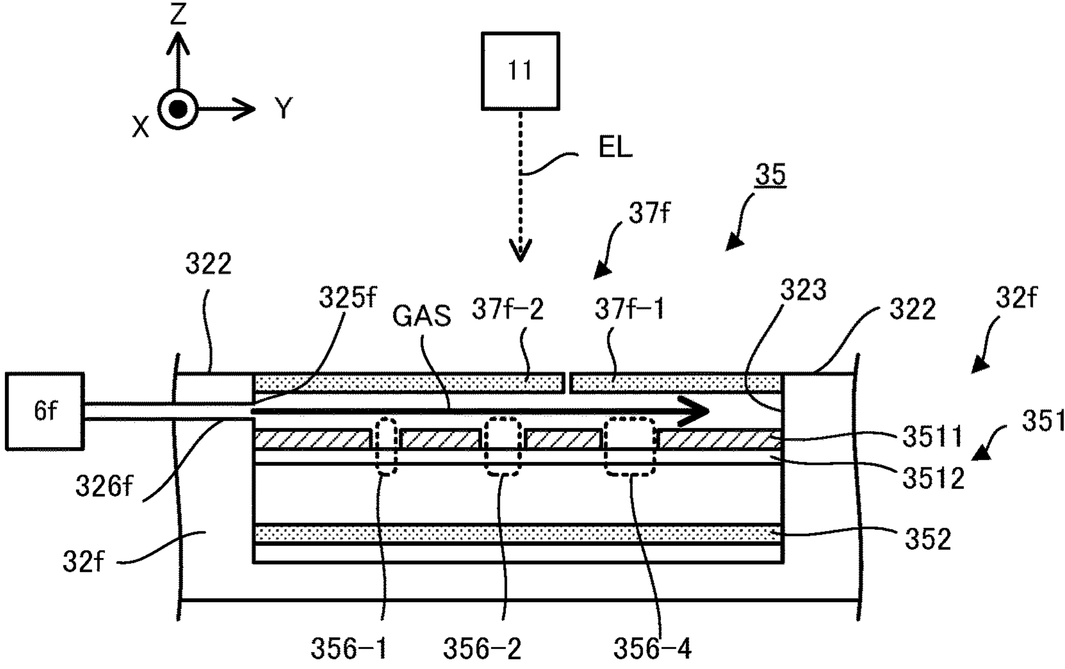
FIG. 28 is a cross-sectional view that illustrates another example of the cover member.

As illustrated in FIG. 26, the processing system SYSf in the sixth example embodiment is different from the above described processing system SYSa in the first example embodiment in that it includes a stage apparatus 3*f* instead of the stage apparatus 3*b*. Furthermore, the processing system SYSf is different from the processing system SYSa in that it further includes a gas supply apparatus 6*f*. Another feature of the processing system SYSf may be same as another feature of the processing system SYSa. The stage apparatus 3*f* is different from the stage apparatus 3*a* in that it includes a stage 32*f* instead of the stage 32. Furthermore, the stage apparatus 3*f* is different from the stage apparatus 3*a* in that it includes a cover member 37*f*. Another feature of the stage apparatus 3*f* may be same as another feature of the stage apparatus 3*a*. Thus, in the below describe description, with reference to FIG. 27, the stage 32*f*, the cover member 37*f* and the gas supply apparatus 6*f* that are unique to the sixth example embodiment will be described. FIG. 27 is a cross-sectional view that illustrates a configuration of the stage 32*f* including the cover member 37*f*.

As illustrated in FIG. 27, the cover member 37*f* is configured to cover at least a part of the light reception apparatus 35. Especially, the cover member 37*f* is configured to cover at least a part of the beam passing member 351. When the cover member 37*f* covers the beam passing member 351, the cover member 37*f* may cover the hole 323, because the light reception apparatus 35 including the beam passing member 351 is disposed in the hole 323. In this case, the cover member 37*f* forms a space in the hole 323 between the beam passing member 351 and the cover member 37*f*. The space formed in the hole 323 by the cover member 37*f* and the beam passing member 351 may be separated from (in other words, isolated from) a space outside the hole 323. Typically, the space formed in the hole 323 by the cover member 37*f* and the beam passing member 351 may be separated from a space through which the processing light EL passes outside the hole 323. Incidentally, in an example illustrated in FIG. 27, an upper surface of the cover member 37*f* is at the same height as the outer circumference surface 322 of the stage apparatus 3*f*, however, the upper surface of the cover member 37*f* may be located in the hole 323 or the upper surface of the cover member 37*f* may protrude from the outer circumference surface 322.

When the cover member 37*f* covers the beam passing member 351 in this manner, an adherence of an unnecessary substance to the beam passing member 351*f* is prevented. Note that at least one of a fume generated due to the irradiation of the processing light EL to the workpiece W, a debris existing in the housing 5 and so on is one example of the unnecessary substance that may be possibly adhered to the beam passing member 351*f*. Here, the unnecessary substance spreading in an atmosphere around the workpiece W may be referred to as the fume. The unnecessary substance adhered to at least one of an inside of the housing 5 and a component located in the housing 5 may be referred to as the debris.

When the unnecessary substance is adhered to the beam passing member 351*f*, there is a possibility that the aperture 353 (the passing area 355) formed in the beam passing member 351 is partially hidden or closed by the unnecessary substance. As a result, such a technical problem occurs that the optical reception of the processing light EL by the light reception element 352 through the aperture 353 (the passing area 355) is possibly affected. Furthermore, such a technical problem occurs that the measurement of the mark 356, which is formed by the passing area 355, by the measurement apparatus 2 is possibly affected. However, in the sixth example embodiment, the adherence of the unnecessary substance to the beam passing member 351*f* is prevented. As a result, there is a lower possibility that the optical reception of the processing light EL by the light reception element 352 through the aperture 353 (the passing area 355) is affected. As a result, the light reception element 352 is capable of optically receiving the processing light EL properly. Moreover, there is a lower possibility that the measurement of the mark 356, which is formed by the passing area 355, by the measurement apparatus 2 is affected. As a result, the measurement apparatus 2 is capable of measuring the mark 356 properly. Thus, the processing system SYSf is capable of properly processing the workpiece W based on the optical received result of the processing light EL and the measured result of the light reception apparatus 35 by the measurement head 21.

Considering that one technical reason why the above described technical problem occurs is that the aperture 353 (the passing area 355) formed in the beam passing member 351 is hidden or closed at least partially by the unnecessary substance, the cover member **37*f* may cover at least the aperture 353 (the passing area 355) formed in the beam passing member 351*f*. Considering that the mark 356 is formed by the aperture 353 (the passing area 355), the cover member 37*f* may cover at least the mark 356. Incidentally, as illustrated in FIG. 27 that is a cross-sectional view illustrating another example of the cover member 37*f*, the cover member 37*f* may separately include a cover member 37*f*-1 that is configured to cover the mark 356 (namely, the passing area 355 forming the mark 356) measured by the measurement apparatus 2 and a cover member 37*f*-2 that is configured to cover the mark 356 that is irradiated with the processing light EL (namely, the passing area 355 through which the processing light EL passes). For example, in the above described description, the cross mark 356-4 is measured by the measurement apparatus 2 and the slit mark 356-1, the fine mark 356-2, the rectangular mark 356-3 and the search mark 356-5 are irradiated with the processing light EL. Thus, the cover member 37*f* may separately include: the cover member 37*f*-1 that is configured to cover the cross mark 356-4; and the cover member 37*f*-2 that is configured to cover at least one of the slit mark 356-1, the fine mark 356-2, the rectangular mark 356-3 and the search mark 356-5**.

Figure 29A:
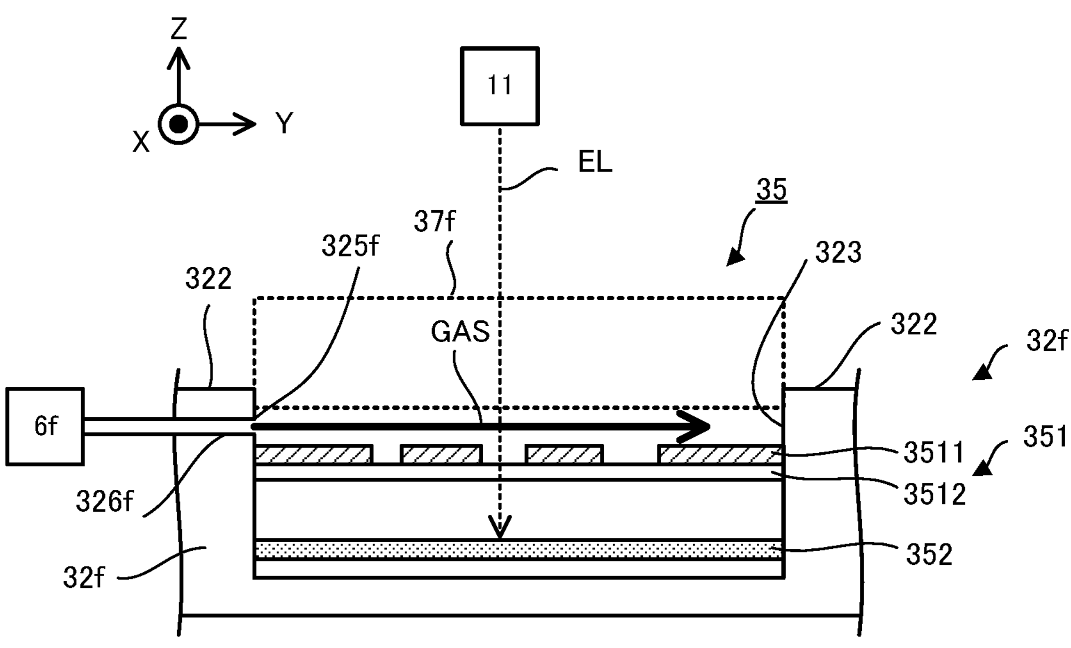
FIG. 29 Each of FIG. 29A
FIG. 29B is a cross-sectional view that illustrates the cover member that does not cover a beam passing member.
Figure 29B:
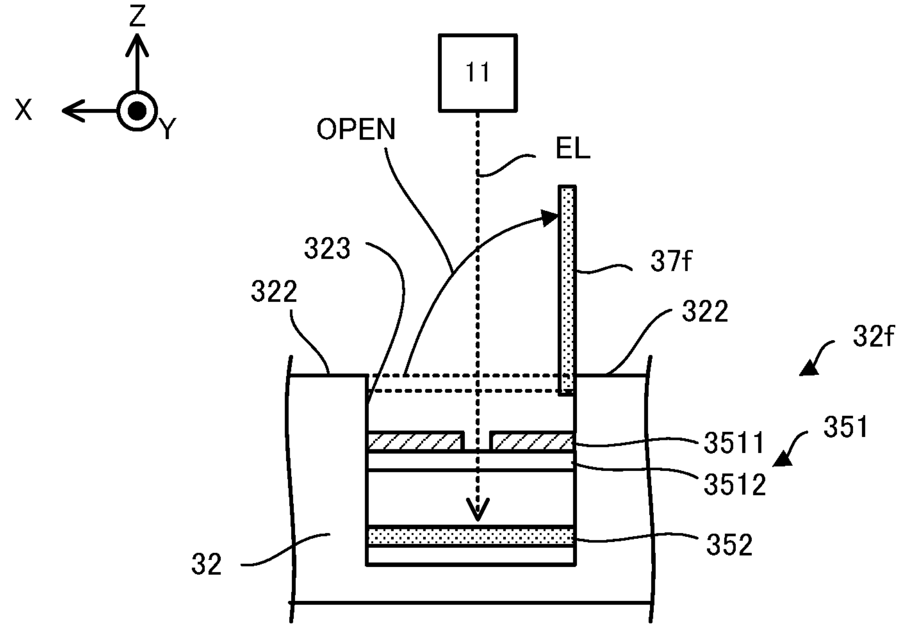

When the cover member **37*f* keeps covering the beam passing member 351, the processing apparatus 1 is not capable of irradiating the passing area 355 formed in the beam passing member 351 with the processing light EL. Similarly, the measurement apparatus 2 is not capable of measuring the mark 356 formed in the beam passing member 351. Thus, a state of the cover member 37*f* may be switched between a first state in which the cover member 37*f* covers the beam passing member 351 and a second state in which the cover member 37*f* does not cover the beam passing member 351. In other words, the cover member 37*f* may move between a first position at which the cover member 37*f* is capable of covering the beam passing member 351 and a second position at which the cover member 37*f* does not cover the beam passing member 351. Note that FIG. 27 illustrates the cover member 37*f* in the first state (namely, located at the first position). On the other hand, FIG. 29A and FIG. 29B illustrate the cover member 37*f*** in the second state (namely, located at the second position).

The cover member **37*f* may be located at the first position at which the cover member 37*f* covers the beam passing member 351 when the processing apparatus 1 irradiates the workpiece W with the processing light EL (namely, in at least a part of a period during which the processing apparatus 1 irradiates the workpiece W with the processing light EL). On the other hand, the cover member 37*f* may be located at the second position at which the cover member 37*f* does not cover the beam passing member 351 when the processing apparatus 1 irradiates the beam passing member 351 with the processing light EL (namely, in at least a part of a period during which the processing apparatus 1 irradiates the beam passing member 351 with the processing light EL). The cover member 37*f* may be located at the second position when the light reception element 352 optically receives the processing light EL from the processing apparatus 1 (namely, in at least a part of a period during which the light reception element 352 optically receives the processing light EL from the processing apparatus 1). The cover member 37*f* may be located at the second position when the measurement apparatus 2 measures the mark 356 (namely, in at least a part of a period during which the measurement apparatus 2 measures the mark 356). As a result, an existence of the cover member 37*f*** does not affect the operation of the processing system SYSf.

As a driving power for moving the cover member **37*f*, a gas supplied from the gas supply apparatus 6*f* may be used. In this case, the cover member 37*f* may include a member that is configured to convert a power of an air to the driving power (for example, an air cylinder). However, anther driving power may be used as the driving power for moving the cover member 37*f***.

The gas supply apparatus **6*f* may supply the gas to a space in the hole 323. Specifically, the gas supply apparatus 6*f* is connected, through a gas supply pipe 326*f*, a gas supply port 325*f* that is formed at a part of the stage 32*f* facing the hole 323. The gas supply apparatus 6*f* may supply the gas to the space in the hole 323 through the gas supply pipe 326*f* and the gas supply port 325*f*. In this case, as illustrated in FIG. 27 and FIG. 29, the gas supply apparatus 6*f* may supply the gas to a space facing an upper surface of the beam passing member 351 (namely, a space at the processing head 12 side from the beam passing member 351**).

When the gas is supplied to the space in the hole 323 (especially, the space facing the upper space of the beam passing member 351), the gas forms a flow of the gas in the space in the hole 323. As a result, the flow of the gas prevent the unnecessary substance from being adhered to the beam passing member 351. Furthermore, the flow of the gas removes the unnecessary substance that has been adhered to the beam passing member 351.

Note that the gas supply apparatus **6*f* may supply the gas to the space in the hole 323 when the processing apparatus 1 irradiates the workpiece W with the processing light EL (namely, in at least a part of a period during which the processing apparatus 1 irradiates the workpiece W with the processing light EL). The gas supply apparatus 6*f* may stop supplying the gas during a period when the processing apparatus 1** does not irradiate the workpiece W with the processing light EL.

The processing system SYSf in the sixth example embodiment is capable of achieving an effect that is same as an effect achievable by the above described processing system SYSa in the first example embodiment. Furthermore, in the processing system SYSf, there is a lower possibility that the unnecessary substance is adhered to the beam passing member 351. Thus, the processing system SYSf is capable of properly processing the workpiece W without being affected from the unnecessary substance. Namely, the processing system SYSf is capable of properly processing the workpiece W based on the optical received result of the processing light EL by the light reception apparatus 35 and the measured result of the light reception apparatus 35 by the measurement head 21.

Incidentally, in the above described description, the processing system SYSf includes both of the cover member **37*f* and the gas supply apparatus 6*f*. However, the processing system SYSf may include the cover member 37*f* but may not include the gas supply apparatus 6*f*. The processing system SYSf may include the gas supply apparatus 6f but may not include the cover member 37**f.

Moreover, considering that one technical reason why the above described technical problem occurs is that the aperture 353 (the passing area 355) is hidden or closed at least partially by the unnecessary substance, a plurality of apertures 353 having same characteristic (a plurality of passing areas 355 having same characteristic) may be formed. Namely, a plurality of marks 356 having same characteristic may be formed. In this case, even when one aperture 353 (one passing area 355, one mark 356) is hidden or closed at least partially by the unnecessary substance, the above described technical problem does not occur when another aperture 353 (another passing area 355, another mark 356) having same characteristic as that of one aperture 353 (one passing area 355, one mark 356) is not hidden or closed by the unnecessary substance. This is because the processing system SYSf is capable of performing the above described operation by using another aperture 353 (another passing area 355, another mark 356) that is not hidden or closed by the unnecessary substance.

Moreover, at least one of the processing system SYSb in the second example embodiment to the processing system SYSe in the fifth example embodiment described above may include a feature unique to the sixth example embodiment. The feature unique to the sixth example embodiment may include a feature related to the cover member 37f and the gas supply apparatus 6f.

(7) Processing System SYSg in Seventh Example Embodiment

Figure 30:
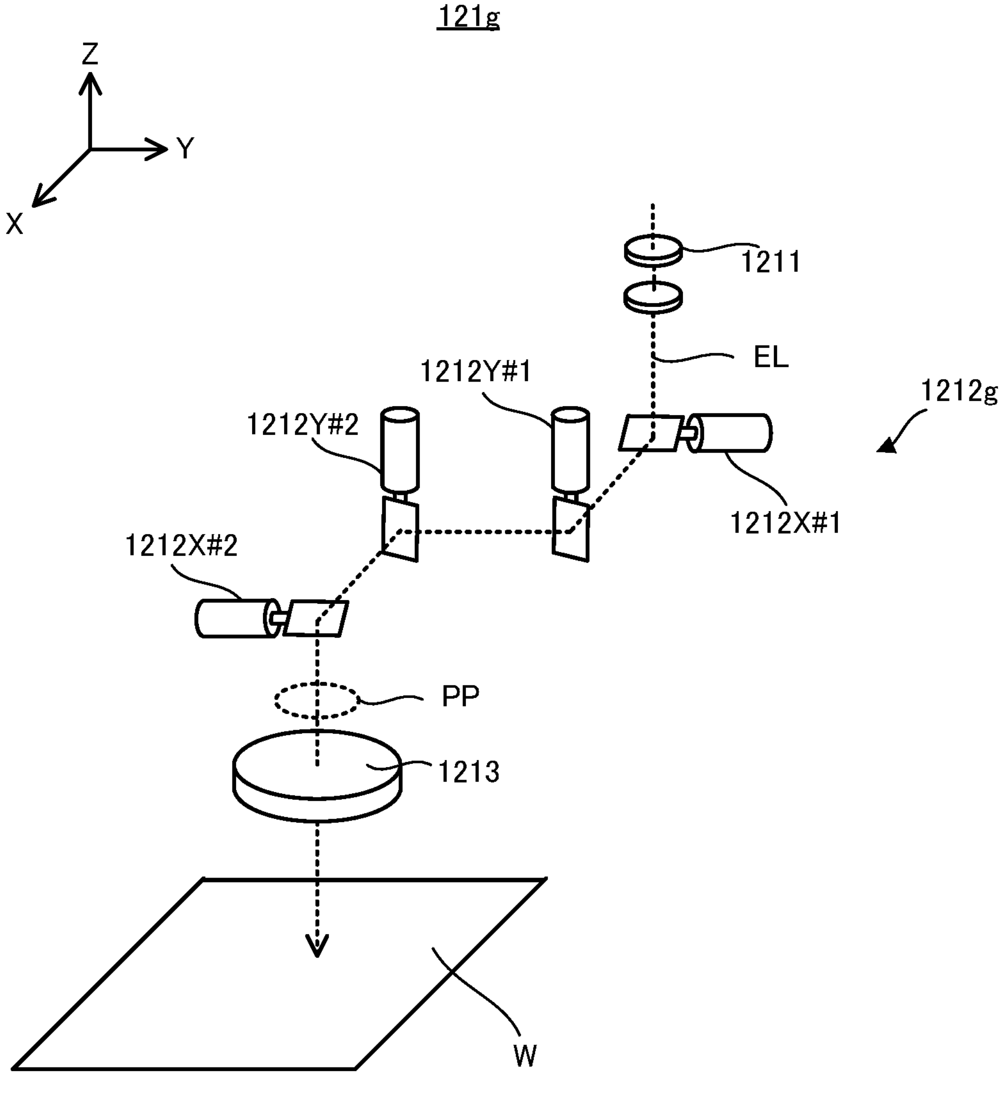
FIG. 30 is a perspective view that illustrates a configuration of the irradiation optical system in a seventh example embodiment.

Next, the processing system SYS in a seventh example embodiment (in the below described description, the processing system SYS in the seventh example embodiment is referred to as a "processing system SYSg") will be described. The processing system SYSg in the seventh example embodiment is different from the above described processing system SYSa in the first example embodiment in that it includes a processing apparatus 1g instead of the processing apparatus 1. Another feature of the processing system SYSg may be same as another feature of the processing system SYSa. The processing apparatus 1g is different from the processing apparatus 1 in that it includes a processing head 12g instead of the processing head 12. Another feature of the processing apparatus 1g may be same as another feature of the processing apparatus 1. The processing head 12g is different from the processing head 12 in that it includes an irradiation optical system 121g instead of the irradiation optical system 121. Another feature of the processing head 12g may be same as another feature of the processing head 12. Thus, in the below describe description, with reference to FIG. 30, the irradiation optical system 121g in the seventh example embodiment will be described. FIG. 30 is a perspective view that illustrates a configuration of the irradiation optical system 121g in the seventh example embodiment.

As illustrated in FIG. 30, the irradiation optical system 121g is different from the irradiation optical system 121 in that it includes a Galvano mirror 1212g instead of the Galvano mirror 1212. Another feature of the irradiation optical system 121g may be same as another feature of the irradiation optical system 121.

The Galvano mirror 1212g is different from the Galvano mirror 1212, which includes the single X sweeping mirror 1212X and the single Y sweeping mirror 1212Y, in that it includes two X sweeping mirrors 1212X and two Y sweeping mirrors 1212Y. Specifically, the Galvano mirror 1212g includes a X sweeping mirror 1212X #1, a X sweeping mirror 1212X #2, a Y sweeping mirror 1212Y #1 and a sweeping mirror 1212Y #2. The processing light EL from the focus change optical system 1211 passes through the X sweeping mirror 1212X #1, the Y sweeping mirror 1212Y #1, the Y sweeping mirror 1212Y #2 and the X sweeping mirror 1212X #2 in this order and then enters the fθ lens 1213. Moreover, each of the X sweeping mirror 1212X #2 and the Y sweeping mirror 1212Y #2 are located at a position that is away from an incident pupil plane PP of the fθ lens 1213. Next, an operation of the Galvano mirror 1212g including the two X sweeping mirrors 1212X and the two Y sweeping mirrors 1212Y will be described.

Firstly, when the X sweeping mirror 1212X #2 rotates or swings, the irradiation position of the processing light EL on the surface of the workpiece W is changed along the X axis direction and the propagating direction of the processing light EL (namely, the emitting direction from the irradiation optical system 121g) is changed along the OY direction (namely, a rotational direction around the Y axis). This is because the X sweeping mirror 1212X #2 is located at the position that is away from the incident pupil plane PP of the fθ lens 1213. As a result, there is a possibility that the processing light EL is not emitted toward a proper emitting direction (for example, a direction that allows the processing light EL to vertically enter the surface of the workpiece W). So, the X sweeping mirror 1212X #1 rotates or swings along with the rotation or the swing of the X sweeping mirror 1212X #2 so that the processing light EL is emitted from the irradiation optical system 121g toward a desired emitting direction. In this case, it may be regarded that the X sweeping mirror 1212X #2 mainly changes the irradiation position of the processing light EL and the X sweeping mirror 1212X #1 mainly changes the emitting direction of the processing light EL. Namely, it may be regarded that the X sweeping mirror 1212X #2 serves as an irradiation position movement member configured to mainly change (namely, move) the irradiation position of the processing light EL and the X sweeping mirror 1212X #1 serves as an emitting direction change member configured to mainly change the emitting direction of the processing light EL. In this case, the processing light EL passes through the X sweeping mirror 1212 #1 that serves as the emitting direction change member and the X sweeping mirror 1212X #2 that serves as the irradiation position movement member in this order and then enters the fθ lens 1213 through the incident pupil plane PP. Thus, typically, a distance (specifically, a distance along the optical path of the processing light EL, the same may be applied in the seventh example embodiment) between the incident pupil plane PP and the X sweeping mirror 1212X #1 is longer than a distance between the incident pupil plane PP and the X sweeping mirror 1212X #2.

However, when the X sweeping mirror 1212X #1 rotates, not only the emitting direction of the processing light EL is changed along the OY direction is changed, but also the irradiation position of the processing light EL on the surface of the workpiece W is changed along the X axis direction. Here, since the distance between the incident pupil plane PP and the X sweeping mirror 1212X #1 is different from the distance between the incident pupil plane PP and the X sweeping mirror 1212X #2, a ratio of a change of the emitting direction of the processing light EL and a change of the irradiation position of the processing light EL per unit rotational amount is different between the X sweeping mirror 1212X #1 and the X sweeping mirror 1212X #2.

Therefore, it is possible to reduce or cancel the change of the irradiation position of the processing light EL due to the rotation or the swing of the X sweeping mirror 1212X #1 and to set the irradiation position of the processing light EL to be a desired position on the workpiece W by the X sweeping mirror 1212X #2.

Similarly, when the Y sweeping mirror 1212Y #2 rotates or swings, the irradiation position of the processing light EL on the surface of the workpiece W is changed along the Y axis direction and the propagating direction of the processing light EL (namely, the emitting direction from the irradiation optical system 121*g*) is changed along the θX direction (namely, a rotational direction around the X axis). This is because the Y sweeping mirror 1212Y #2 is located at the position that is away from the incident pupil plane PP of the fθ lens 1213. As a result, there is a possibility that the processing light EL is not emitted toward a proper emitting direction (for example, a direction that allows the processing light EL to vertically enter the surface of the workpiece W). So, the Y sweeping mirror 1212Y #1 rotates or swings along with the rotation or the swing of the Y sweeping mirror 1212Y #2 so that the processing light EL is emitted from the irradiation optical system 121*g* toward a desired emitting direction. In this case, it may be regarded that the Y sweeping mirror 1212Y #2 mainly changes the irradiation position of the processing light EL and the Y sweeping mirror 1212Y #1 mainly changes the emitting direction of the processing light EL. Namely, it may be regarded that the Y sweeping mirror 1212Y #2 serves as an irradiation position movement member configured to mainly change (namely, move) the irradiation position of the processing light EL and the Y sweeping mirror 1212Y #1 serves as an emitting direction change member configured to mainly change the emitting direction of the processing light EL. In this case, the processing light EL passes through the Y sweeping mirror 1212 #1 that serves as the emitting direction change member and the Y sweeping mirror 1212Y #2 that serves as the irradiation position movement member in this order and then enters the fθ lens 1213 through the incident pupil plane PP. Thus, typically, a distance between the incident pupil plane PP and the Y sweeping mirror 1212Y #1 is longer than a distance between the incident pupil plane PP and the Y sweeping mirror 1212Y #2.

However, when the Y sweeping mirror 1212Y #1 rotates, not only the emitting direction of the processing light EL is changed along the θX direction is changed, but also the irradiation position of the processing light EL on the surface of the workpiece W is changed along the Y axis direction. Here, since the distance between the incident pupil plane PP and the Y sweeping mirror 1212Y #1 is different from the distance between the incident pupil plane PP and the Y sweeping mirror 1212Y #2, a ratio of a change of the emitting direction of the processing light EL and a change of the irradiation position of the processing light EL per unit rotational amount is different between the Y sweeping mirror 1212Y #1 and the Y sweeping mirror 1212Y #2. Therefore, it is possible to reduce or cancel the change of the irradiation position of the processing light EL due to the rotation or the swing of the Y sweeping mirror 1212Y #1 and to set the irradiation position of the processing light EL to be a desired position on the workpiece W by the Y sweeping mirror 1212Y #2.

The control apparatus 4 may control the Galvano mirror 1212 *g* based on the optical received result of the processing light EL by the light reception apparatus 35. Specifically, the control apparatus 4 may calculate the emitting direction of the processing light EL from the irradiation optical system 121*g* based on the optical received result of the processing light EL by the light reception apparatus 35. The control apparatus 4 may control the Galvano mirror 1212 *g* so that the calculated emitting direction is same as the desired direction.

In order to calculate the emitting direction of the processing light EL based on the optical received result of the processing light EL by the light reception apparatus 35, the control apparatus 4 may change a distance between the processing head 12 (especially, the irradiation optical system 121*g*) and the light reception apparatus 35 (especially, the passing area 355), and may perform an operation for obtaining the position (specifically, the position in each of the X axis direction and the Y axis direction) of the stage 32 at the timing when the light reception element 352 optically receives the processing light EL through the same passing area 355 every time this distance is changed. Namely, the control apparatus 4 may perform an operation for changing the distance between the processing head 12 and the light reception apparatus 35 and obtaining the position of the stage 32 at the timing when the light reception element 352 optically receives the processing light EL through the same passing area 355 a plurality of times while changing the distance between the processing head 12 and the light reception apparatus 35. As a result, the control apparatus 4 is capable of calculating the emitting direction of the processing light EL (typically, an incident angle of the processing light EL relative to the surface of the workpiece W or the beam passing member 351) based on the position of the stage 32 that has been obtained a plurality of times. Typically, a line connecting the obtained positions of the stage 32 corresponds to a line along the emitting direction of the processing light EL.

Note that the control apparatus 4 may control the Galvano mirror 1212 *g* without using the optical received result of the processing light EL by the light reception apparatus 35. For example, the control apparatus 4 may control the Galvano mirror 1212 *g* based on an information related to a range in which the removal processing is performed.

The processing system SYSg in the seventh example embodiment is capable of achieving an effect that is same as an effect achievable by the above described processing system SYSa in the first example embodiment.

Note that at least one of the processing system SYSb in the second example embodiment to the processing system SYSf in the sixth example embodiment described above may include a feature unique to the seventh example embodiment. The feature unique to the seventh example embodiment may include a feature related to the irradiation optical system 121*g*.

(8) Processing System SYSh in Eighth Example Embodiment

Figure 31:
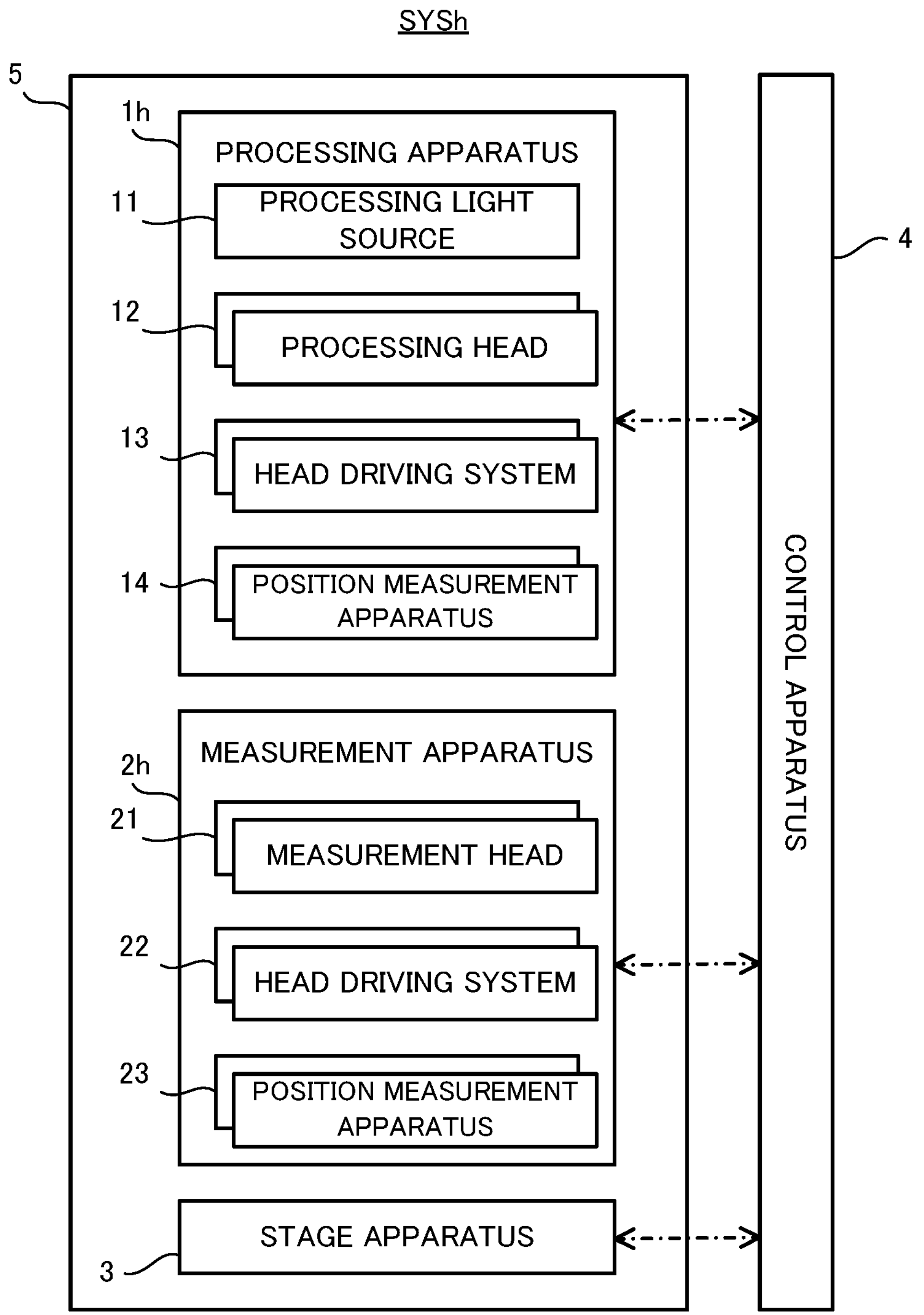
FIG. 31 is a system configuration diagram that illustrates a system configuration of the processing system in an eighth example embodiment.

Next, with reference to FIG. 31, the processing system SYS in a eighth example embodiment (in the below described description, the processing system SYS in the eighth example embodiment is referred to as a "processing system SYSh") will be described. FIG. 31 is a system configuration diagram that illustrates a system configuration of the processing system SYSh in the eighth example embodiment.

As illustrated in FIG. 31, the processing system SYSh in the eighth example embodiment is different from the above described processing system SYSa in the first example embodiment in that it includes a processing apparatus 1*h* and a measurement apparatus 2*h* instead of the processing apparatus 1 and the measurement apparatus 2. Another feature of the processing system SYSh may be same as another feature of the processing system SYSa.

The processing apparatus 1*h* is different from the processing apparatus 1 in that it includes a plurality of processing heads 12. Furthermore, the processing apparatus 1*h* is different from the processing apparatus 1 in that it includes a plurality of head driving systems 13 that are configured to move the plurality of processing heads 12, respectively. However, the processing apparatus 1*h* may include the head driving system 13 that is configured to move at least two processing heads 12 collectively. Furthermore, the processing apparatus 1*h* is different from the processing apparatus 1 in that it includes a plurality of position measurement apparatuses 14 that are configured to measure the positions of the plurality of processing heads 12, respectively. However, the processing apparatus 1*h* may include the position measurement apparatus 14 that is configured to measure the positions of at least two processing heads 12 collectively. Another feature of the processing apparatus 1*h* may be same as another feature of the processing apparatus 1.

The measurement apparatus 2*h* is different from the measurement apparatus 2 in that it includes a plurality of measurement heads 21. Characteristics (for example, at least one of a measurement method, a size of the measurement shot area MSA and a measurement accuracy) of the plurality of measurement heads 21 may be same as each other. The characteristics of at least two of the plurality of measurement heads 21 may be different from each other. Furthermore, the measurement apparatus 2*h* is different from the measurement apparatus 2 in that it includes a plurality of head driving systems 22 that are configured to move the plurality of measurement heads 21, respectively. However, the measurement apparatus 2*h* may include the head driving system 22 that is configured to move at least two measurement heads 21 collectively. Furthermore, the measurement apparatus 2*h* is different from the measurement apparatus 2 in that it includes a plurality of position measurement apparatuses 23 that are configured to measure the positions of the plurality of measurement heads 21, respectively. However, the measurement apparatus 2*h* may include the position measurement apparatus 23 that is configured to measure the positions of at least two measurement heads 21 collectively. Another feature of the measurement apparatus 2*h* may be same as another feature of the measurement apparatus 2.

The processing system SYSh in the eighth example embodiment is capable of achieving an effect that is same as an effect achievable by the above described processing system SYSa in the first example embodiment. Furthermore, the processing system SYSh is capable of irradiating the plurality of positions on the workpiece W with the plurality of processing lights EL through the plurality of processing heads 12 at the same time. As a result, a through-put for processing the workpiece W improves. Furthermore, the processing system SYSh is capable of properly measuring the workpiece W by using the plurality of measurement heads 21.

Incidentally, when the processing system SYSh includes the plurality of processing heads 12, the control apparatus 4 may measure the distance between the apparatus origin point AO and each of a plurality of processing origin points PO that correspond to the plurality of processing heads 12, respectively, in the above described B-CHK operation. Similarly, when the processing system SYSh includes the plurality of measurement heads 21, the control apparatus 4 may measure the distance between the apparatus origin point AO and each of a plurality of measurement origin points MO that correspond to the plurality of measurement heads 21, respectively, in the above described B-CHK operation.

Moreover, the processing system SYSh may include the processing apparatus 1*h* including the plurality of processing heads 12 and the measurement apparatus 2 including the single measurement head 21. The processing system SYSh may include the measurement apparatus 2*h* including the plurality of measurement heads 21 and the processing apparatus 1 including the single processing head 12.

Moreover, at least one of the processing system SYSb in the second example embodiment to the processing system SYSg in the seventh example embodiment described above may include a feature unique to the eighth example embodiment. The feature unique to the eighth example embodiment may include a feature related to the plurality of processing heads 12 and the plurality of measurement heads 21.

(9) Processing System SYSi in Ninth Example Embodiment

Figure 32:
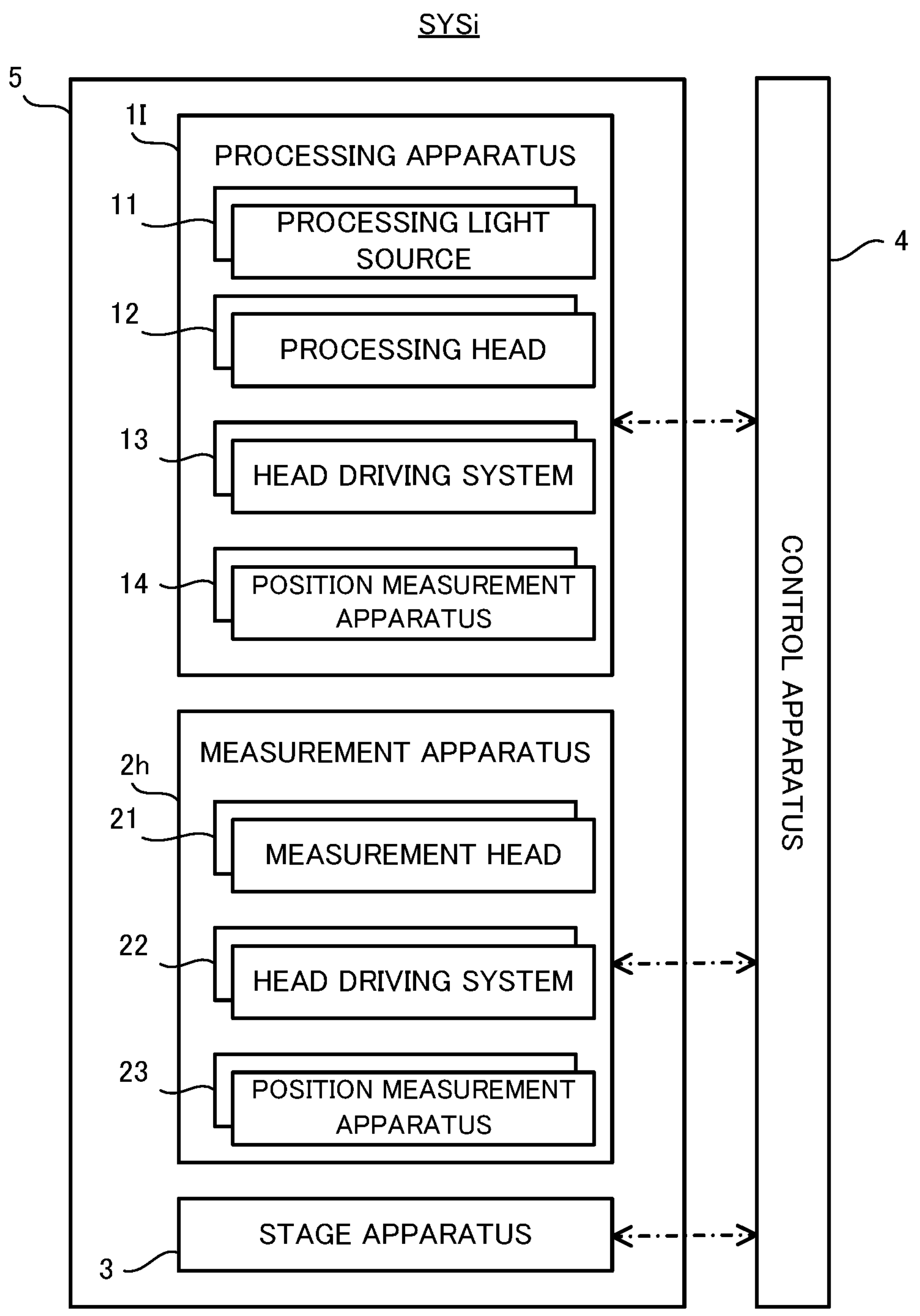
FIG. 32 is a system configuration diagram that illustrates a system configuration of the processing system in a ninth example embodiment.

Next, with reference to FIG. 32, the processing system SYS in a ninth example embodiment (in the below described description, the processing system SYS in the ninth example embodiment is referred to as a "processing system SYSi") will be described. FIG. 32 is a system configuration diagram that illustrates a system configuration of the processing system SYSi in the ninth example embodiment.

As illustrated in FIG. 32, the processing system SYSi in the ninth example embodiment is different from the above described processing system SYSh in the eighth example embodiment in that it includes a processing apparatus 1*i* instead of the processing apparatus 1*h*. Another feature of the processing system SYSi may be same as another feature of the processing system SYSh.

The processing apparatus 1*i* is different from the processing apparatus 1*h* in that it includes a plurality of processing light sources 11 that are configured to respectively generate the plurality of processing light EL emitted from the plurality of processing heads 12, respectively. Another feature of the processing apparatus 1*i* may be same as another feature of the processing apparatus 1*h*.

The plurality of processing light sources 11 may generate the plurality of processing light having the same characteristics, respectively. Alternatively, at least two of the plurality of processing light sources 11 may generate at least two processing light having the different characteristics, respectively. For example, the plurality of processing light sources 11 may include the processing light source 11 that is configured to generate the processing light the ON time of which is of an order of nano-seconds, the processing light source 11 that is configured to generate the processing light the ON time of which is of an order of pico-seconds, and the processing light source 11 that is configured to generate the processing light the ON time of which is of an order of femto-seconds. The processing system SYSi may roughly process the workpiece W by using the processing light the ON time of which is of the order of nano-seconds, may finely process the workpiece W by using the processing light the ON time of which is of the order of pico-seconds, and may perform a finish processing on the workpiece W by using the processing light the ON time of which is of the order of femto-seconds, because processing accuracy of the workpiece W by the processing light EL is higher as the ON time is shorter.

The processing system SYSi in the ninth example embodiment is capable of achieving an effect that is same as an effect achievable by the above described processing system SYSh in the eighth example embodiment. Furthermore, the processing system SYSi is capable of properly processing the workpiece W by using the plurality of processing lights EL having different characteristics.

Moreover, at least one of the processing system SYSb in the second example embodiment to the processing system SYSg in the seventh example embodiment described above may include a feature unique to the ninth example embodiment. The feature unique to the ninth example embodiment may include a feature related to the plurality of processing light sources 11.

(10) Processing System SYSj in Tenth Example Embodiment

Next, the processing system SYS in a tenth example embodiment (in the below described description, the processing system SYS in the tenth example embodiment is referred to as a "processing system SYSj") will be described. The processing system SYSj in the tenth example embodiment is different from the above described processing system SYSa in the first example embodiment in that it may perform an additive processing on the workpiece W by irradiating the workpiece W with the processing light EL. For example, the processing system SYSj may form a three-dimensional structural object ST by performing the additive processing.

As one example, the processing system SYSj may perform the additive processing based on a Laser Metal Deposition (LMD), for example. In this case, the processing system SYSj may form a build object by processing a build material M by the processing light EL. The build material M is a material that is molten by the irradiation of the processing light EL having a predetermined intensity or more. At least one of a metal material and a resin material is usable as the build material M, for example. However, another material that is different from the metal material and the resin material may be used as the build material M. The build material M is a powder-like or grain-like material. Namely, the build material M is a powdery or granular material. However, the build material M may not be the powdery or granular material. For example, at least one of a wired-shape material or a gas material may be used as the build material M. However, the processing system SYSj may form the three-dimensional structural object ST by performing the additive processing based on another additive processing method.

Figure 33:
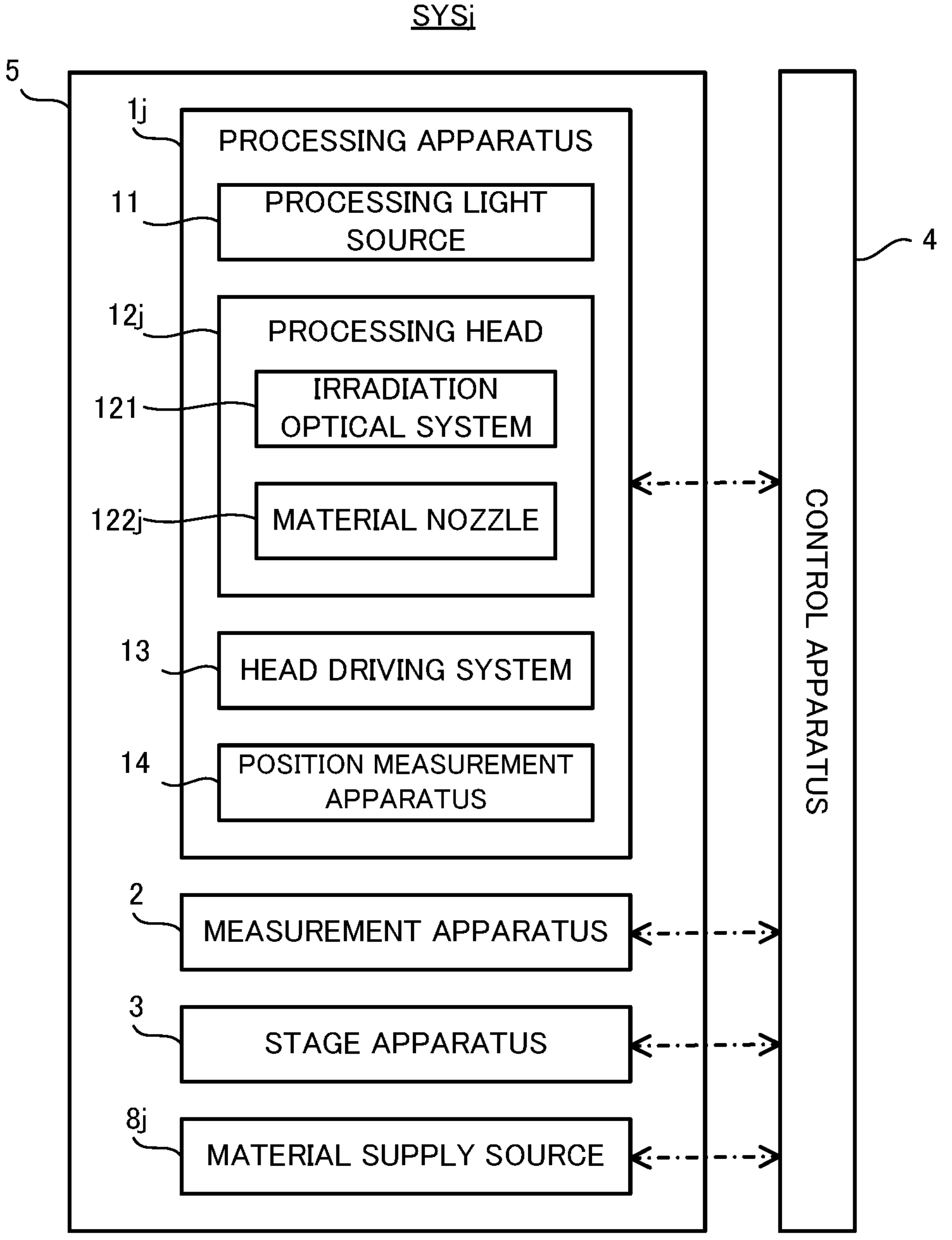
FIG. 33 is a system configuration diagram that illustrates a system configuration of the processing system in a tenth example embodiment.
Figure 34:
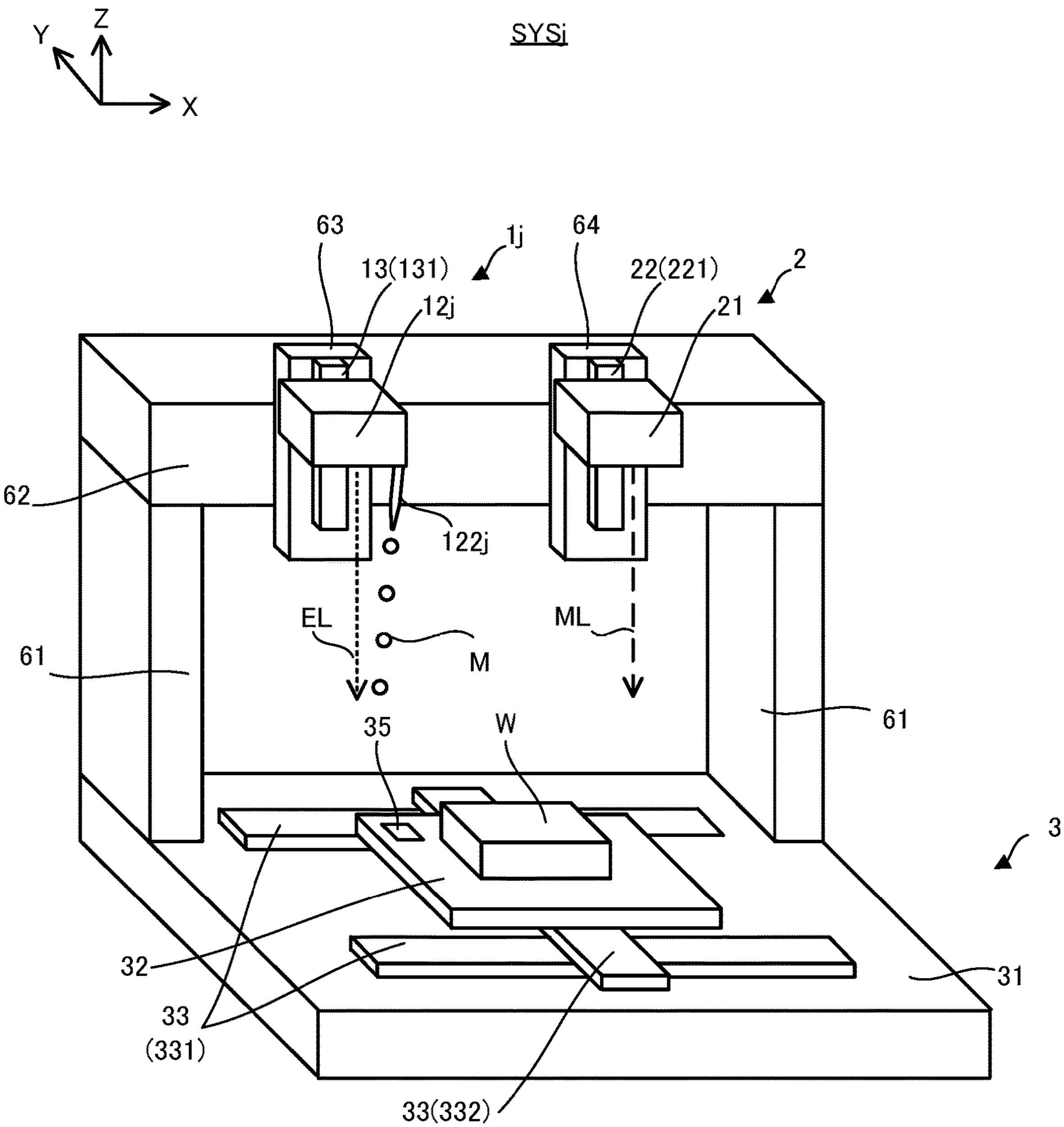
FIG. 34 is a perspective view that conceptionally illustrates an exterior appearance of the processing system in the tenth example embodiment.

FIG. 33 and FIG. 34 illustrates one example of the processing system SYSj in the tenth example embodiment that is configured to perform the additive processing based on the Laser Metal Deposition. FIG. 33 is a system configuration diagram that illustrates a system configuration of the processing system SYSj in the tenth example embodiment. FIG. 34 is a perspective view that illustrates an exterior appearance of the processing system SYSj in the tenth example embodiment. As illustrated in FIG. 33 and FIG. 34, the processing system SYSj is different from the above described processing system SYSa in the first example embodiment in that it includes a processing apparatus 1*j* instead of the processing apparatus 1. The processing system SYSj is different from the processing system SYSa in that it includes a material supply source 8*j*. Another feature of the processing system SYSj may be same as another feature of the processing system SYSa.

The processing apparatus 1*j* is different from the processing apparatus 1 in that it includes a processing head 12*j* instead of the processing head 12. Another feature of the processing apparatus 1*j* may be same as another feature of the processing apparatus 1. The processing head 12*j* is different from the processing head 12 in that it further includes a material nozzle 122*j*. Another feature of the processing head 12*j* may be same as another feature of the processing head 12.

The material nozzle 122*j* is configured to supply (for example, emit, jet, inject or spray) the build material M. Thus, the material nozzle 122*j* may be referred to as a material supply apparatus. Specifically, the material nozzle 122*j* is physically connected to the material supply source 8*j*, which is a supply source of the build material M, through a non-illustrated supply pipe. The material nozzle 122*j* supplies the build material M supplied from the material supply source 8*j*. The material nozzle 122*j* is aligned with relative to the irradiation optical system 121 so as to supply the build material M to the irradiation position of the processing light EL from the irradiation optical system 121 (namely, the target irradiation area EA). Note that the material nozzle 122*j* may be aligned with relative to the irradiation optical system 121 so that the material nozzle 122*j* supplies the build material M to a melt pool formed by the processing light EL emitted from the irradiation optical system 121. Note that the material nozzle 122*j* may not supply the build material M to the melt pool. For example, the processing system SYSj may melt the build material M by the processing light EL from the irradiation optical system 121 before the build material M from the material nozzle 122*j* reaches the workpiece W and allow the molten build material M to adhere to the workpiece W.

The processing system SYSj in the tenth example embodiment is capable of properly performing the additive processing on the workpiece W. Furthermore, the processing system SYSj is capable of properly performing the additive processing on the workpiece W based on the optical received result of the processing light EL by the light reception apparatus 35 and the measured result of the light reception apparatus 35 by the measurement head 21, as with the processing system SYSh in the first example embodiment.

Note that the processing system SYSj that is configured to perform the additive processing may include, as the light reception apparatus 35, the light reception apparatus 35*d* that is described in the above described fourth example embodiment and so on and that is configured to serve as the imaging apparatus. In this case, for example, the light reception element 352 may capture an image of at least a part of the material nozzle 122*j*. The control apparatus 4 may control the processing system SYSj based on the captured result of at least a part of the material nozzle 122*j*. The control apparatus 4 may output an information related to a state of the material nozzle 122*j* based on the captured result of at least a part of the material nozzle 122*j*. In this case, the control apparatus 4 may serve as an information output apparatus that is configured to output the information related to the state of the material nozzle 122*j*. For example, the light reception element 352 may capture an image of at least a part of the build material M supplied from the material nozzle 122*j*. The control apparatus 4 may control the processing system SYSj based on the captured result of at least a part of the build material M. For example, the control apparatus 4 may change (namely, control) a supply aspect of the build material M from the material supply source 8*j* through the material nozzle 122*j* based on the captured result of at least a part of the build material M. The supply aspect of the build material M may include at least one of a supplied amount of the build material M and a supplied timing (a supplied time) of the build material M. In this case, the control apparatus 4 may serve as a material supply aspect change apparatus that is configured to change the supply aspect of the build material M.

Moreover, the processing system SYSj may include both of the processing apparatus 1 (alternatively, the processing head 12) that is configured to perform the removal processing and the processing apparatus 1*j* (alternatively, the processing head 12*j*) that is configured to perform the additive processing. The processing system SYSj may not include the measurement apparatus 2.

Moreover, at least one of the processing system SYSb in the second example embodiment to the processing system SYSi in the ninth example embodiment described above may include a feature unique to the tenth example embodiment. The feature unique to the tenth example embodiment may include a feature related to the additive processing.

(11) Processing System SYSk in Eleventh Example Embodiment

Next, the processing system SYS in an eleventh example embodiment (in the below described description, the processing system SYS in the eleventh example embodiment is referred to as a "processing system SYSk") will be described. The processing system SYSk in the eleventh example embodiment is different from the above described processing system SYSa in the first example embodiment in that it may process the workpiece W by using a tool 123*k* (see FIG. 35 and FIG. 36 described below) for performing a machining processing on the workpiece W in addition to or instead of the processing light EL. Namely, the processing system SYSk is different from the processing system SYSa in that it may perform the machining processing on the workpiece W. For example, the processing system SYSk may perform a cutting processing, a grinding processing, a polishing processing or a cutting-off processing on the workpiece W by making the tool 123*k* contact with the workpiece W. For example, the processing system SYSk may perform the machining processing so that the shape of the workpiece W is a desired shape. For example, the processing system SYSk may perform the machining processing to form a desired structure on the workpiece W. For example, the processing system SYSk may perform the machining processing to form a desired structure on the surface of the workpiece W. For example, the processing system SYSk may perform the machining processing so that the surface of the workpiece W is polished.

Figure 35:
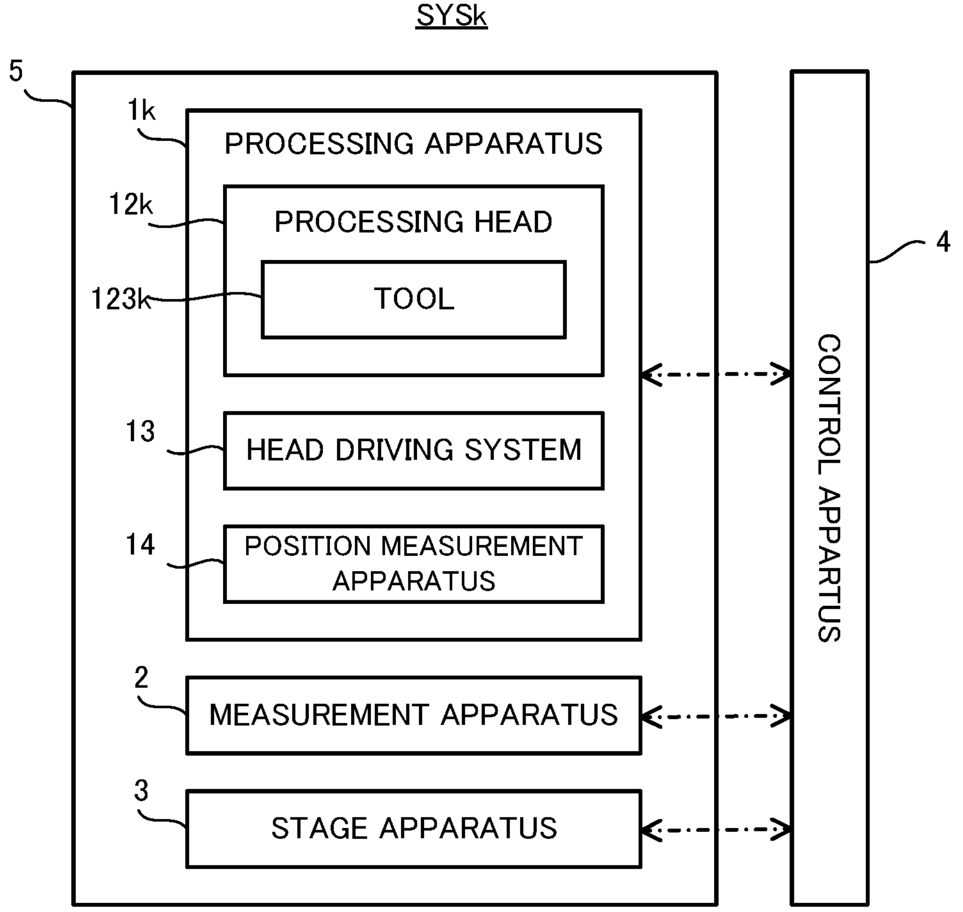
FIG. 35 is a system configuration diagram that illustrates a system configuration of the processing system in an eleventh example embodiment.
Figure 36:
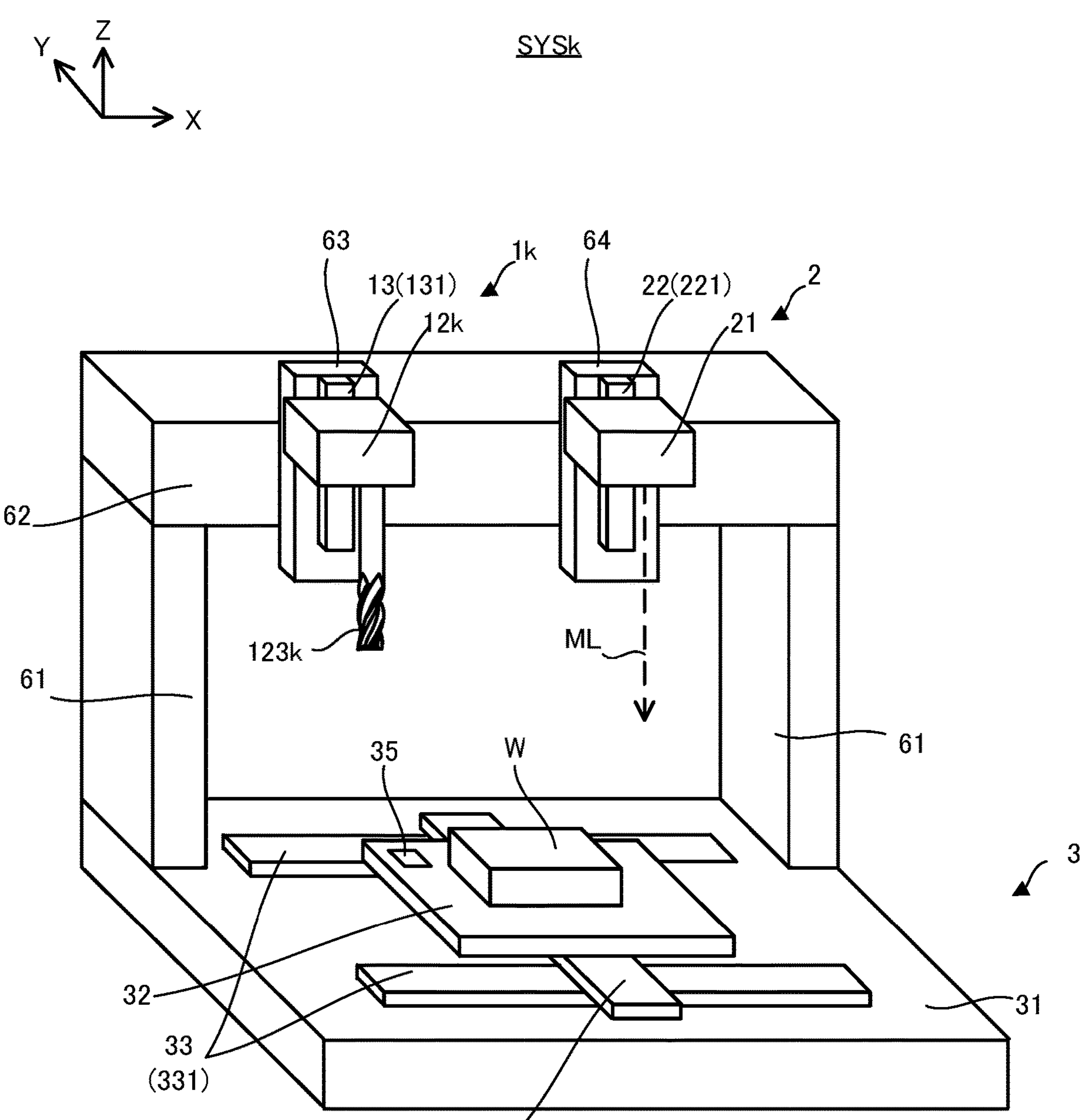
FIG. 36 is a perspective view that conceptionally illustrates an exterior appearance of the processing system in the eleventh example embodiment.

FIG. 35 and FIG. 36 illustrates one example of the processing system SYSk in the eleventh example embodiment. FIG. 35 is a system configuration diagram that illustrates a system configuration of the processing system SYSk in the eleventh example embodiment. FIG. 36 is a cross-sectional view that illustrates a configuration of the processing system SYSk in the eleventh example embodiment. As illustrated in FIG. 35 and FIG. 36, the processing system SYSk is different from the processing system SYSa in that it may not include the processing light source 11. Furthermore, the processing system SYSk is different from the processing system SYSa in that it may not include the irradiation optical system 121. Specifically, the processing system SYSk is different from the processing system SYSa in that it includes a processing apparatus 1*k* including a processing head 12*k* that does not include the irradiation optical system 121 instead of the processing apparatus 1 including the processing head 12 that includes the irradiation optical system 121. Namely, the processing system SYSk is different from the processing system SYSa in that it may not include a component for irradiating the workpiece W with the processing light EL. Furthermore, the processing system SYSk is different from the processing system SYSa in that it includes the processing head 12*k* including the tool 123*k* instead of the processing head 12. Another feature of the processing system SYSk may be same as another feature of the processing system SYSa.

The processing system SYSk in the eleventh example embodiment is capable of properly performing the machining processing on the workpiece W. Furthermore, the processing system SYSk may perform the machining processing on the workpiece W based on the optical received result by the light reception apparatus 35 and the measured result of the light reception apparatus 35 by the measurement head 21.

Note that the processing system SYSk that is configured to perform the machining processing may include, as the light reception apparatus 35, the light reception apparatus 35*d* that is described in the above described fourth example embodiment and so on and that is configured to serve as the imaging apparatus. In this case, for example, the light reception element 352 may capture an image of at least a part of the tool 123*k*. The control apparatus 4 may control the processing system SYSk based on the captured result of at least a part of the tool 123*k*. For example, the control apparatus 4 may change (namely, control) a moving route of the tool 123*k* (namely, a processing route by the tool 123*k*, what we call a processing path (a tool path)) based on the captured result of at least a part of the tool 123*k*. In this case, the control apparatus 4 may serve as a route change apparatus that is configured to change the processing route of the tool 123*k*.

Moreover, the processing system SYSk may include both of the processing apparatus 1 (alternatively, the processing head 12) that is configured to perform the removal processing and the processing apparatus 1*k* (alternatively, the processing head 12*k*) that is configured to perform the machining processing. The processing system SYSk may not include the measurement apparatus 2.

Moreover, at least one of the processing system SYSb in the second example embodiment to the processing system SYSj in the tenth example embodiment described above may include a feature unique to the eleventh example embodiment. The feature unique to the eleventh example embodiment may include a feature related to the machining processing.

(12) Modified Example

In the above described description, the processing system SYS processes the workpiece W by irradiating the workpiece W with the processing light EL. However, the processing system SYS may process the workpiece W by irradiating the workpiece W with any energy beam. In this case, the processing system SYS may include a beam irradiation apparatus that is configured to emit any energy beam in addition to or instead of the processing light source 11. At least one of a charged particle beam, an electromagnetic wave and the like is one example of any energy beam. A least one of an electron beam, an ion beam and the like is one example of the charged particle beam.

(13) Supplementary Note

With respect to the example embodiments described above, the following Supplementary Notes will be further disclosed.

[Supplementary Note 1]

A cover member used by a processing system that includes an irradiation apparatus configured to irradiate an object with an energy beam from a beam source and that is configured to process the object, the cover member covering a passing area through which the energy beam propagating toward a light reception part, which is configured to optically receive the energy beam, is allowed to pass.

[Supplementary Note 2]

The cover member according to the Supplementary Note 1, wherein the cover member is movable between a first position at which the passing area is covered and a second position at which the passing area is not covered.

[Supplementary Note 3]

The cover member according to the Supplementary Note 2, wherein the cover member is located at the first position when the object is irradiated with the energy beam, the cover member is located at the second position when the light reception part optically receives the energy beam.

[Supplementary Note 4]

The cover member according to any one of the Supplementary Notes 1 to 3, wherein the processing system includes a measurement apparatus that is configured to measure the object by a measurement beam, the cover member covers a mark that is measured by the measurement apparatus and that has a predetermined positional relationship relative to the passing area.

[Supplementary Note 5]

A processing system that is configured to process an object by irradiating the object with an energy beam, wherein the processing system includes:

a placing apparatus on which the object is placed;

an irradiation apparatus that is configured to irradiate the object with the energy beam; and a light reception apparatus that is configured to optically receive the energy beam, at least a part of the light reception apparatus is disposed in a hole formed in the placing apparatus.

[Supplementary Note 6]

The processing system according to the Supplementary Note 5, wherein the light reception apparatus includes:

a beam passing member having a passing area through which the energy beam is allowed to pass; and a light reception part that is configured to optically receive the energy beam that has passed through the passing area.

[Supplementary Note 7]

The processing system according to the Supplementary Note 6 including an attenuation area in which the energy beam is attenuated and that is disposed to be adjacent to the passing area.

[Supplementary Note 8]

The processing system according to the Supplementary Note 6 or 7, wherein the beam passing member is disposed in the hole so that the passing are is located below a placement surface on which the object is placed.

[Supplementary Note 9]

The processing system according to any one of the Supplementary Notes 6 to 8, wherein the beam passing member is located to be away from an aperture of a hole, which faces toward the irradiation apparatus, toward a side opposite to the irradiation apparatus.

[Supplementary Note 10]

The processing system according to any one of the Supplementary Notes 6 to 9 including a cover member that covers the passing area of the beam passing member.

[Supplementary Note 11]

The processing system according to the Supplementary Note 10, wherein the cover member is movable between a first position at which the passing area is covered and a second position at which the passing area is not covered.

[Supplementary Note 12]

The processing system according to the Supplementary Note 2, wherein the cover member is located at the first position when the object is irradiated with the energy beam, the cover member is located at the second position when the light reception part optically receives the energy beam.

[Supplementary Note 13]

The processing system according to any one of the Supplementary Notes 10 to 12, wherein the cover member covers the beam passing member.

[Supplementary Note 14]

The processing system according to any one of the Supplementary Notes 5 to 13, wherein the hole is formed at an area that is different from a placement surface on which the object is placed.

[Supplementary Note 15]

The processing system according to any one of the Supplementary Notes 5 to 14, wherein the placing apparatus includes a convex part that is formed at an area that is different from a placement surface on which the object is placed, the hole is adjacent to the convex part.

[Supplementary Note 16]

The processing system according to the Supplementary Note 15, wherein the hole is surrounded by the convex part.

[Supplementary Note 17]

The processing system according to any one of the Supplementary Notes 5 to 16 further including a beam converged position change apparatus that is configured to change a converged position of the energy bean along a propagating direction of the energy beam, the beam converged position change apparatus being configured to change the converged position by using an information related to a distance between a placement surface on which the object is placed and at least a part of the light reception part along the propagating direction.

[Supplementary Note 18]

The processing system according to any one of the Supplementary Notes 5 to 17, wherein the attenuation area shield the energy beam.

[Supplementary Note 19]

The processing system according to any one of the Supplementary Notes 5 to 18, wherein the passing area does not attenuate the energy beam.

[Supplementary Note 20]

A processing system that is configured to process an object, wherein the processing system includes:

a placing apparatus on which the object is placed;

a processing apparatus that is configured to process the object; and an imaging apparatus that is disposed in the placing apparatus and that is configured to capture an image of at least a part of the processing apparatus.

[Supplementary Note 21]

A processing system that is configured to process an object, wherein the processing system includes:

a placing apparatus on which the object is placed;

a processing apparatus that is configured to process the object; and an imaging apparatus that is configured to capture an image of at least a part of the processing apparatus from the placing apparatus side relative to at least a part of the processing apparatus.

[Supplementary Note 22]

The processing system according to the Supplementary Note 20 or 21, wherein the processing apparatus includes an irradiation optical system that is configured to irradiate the object with an energy beam, the imaging apparatus is configured to capture an image of an optical member of the irradiation optical system.

[Supplementary Note 23]

The processing system according to the Supplementary Note 22 further including a beam characteristic change apparatus that is configured to change a characteristic of the energy beam based on an captured result by the imaging apparatus.

[Supplementary Note 24]

The processing system according to any one of the Supplementary Notes 20 to 23, wherein the processing apparatus includes an irradiation optical system that is configured to irradiate the object with an energy beam and a material supply apparatus that is configured to supply a material to an irradiation position of the energy beam, the imaging apparatus is configured to capture an image of a part of the material supply apparatus.

[Supplementary Note 25]

The processing system according to the Supplementary Note 24 further including an information output apparatus that is configured to output an information related to a state of the material supply apparatus based on an captured result by the imaging apparatus.

[Supplementary Note 26]

The processing system according to any one of the Supplementary Notes 20 to 25, wherein the processing apparatus includes an irradiation optical system that is configured to irradiate the object with an energy beam and a material supply apparatus that is configured to supply a material to an irradiation position of the energy beam, the imaging apparatus is configured to capture an image of the material from the material supply apparatus.

[Supplementary Note 27]

The processing system according to the Supplementary Note 26 further including a material supply aspect change apparatus that is configured to change a supply aspect of the material by the material supply apparatus based on an captured result by the imaging apparatus.

[Supplementary Note 28]

The processing system according to any one of the Supplementary Notes 20 to 27, wherein the processing apparatus includes a tool for performing a machining processes the object, the imaging apparatus is configured to capture an image of at least a part of the tool.

[Supplementary Note 29]

The processing system according to the Supplementary Note 28 further including a route change apparatus that is configured to change a processing route of the tool based on an captured result by the imaging apparatus.

[Supplementary Note 30]

The processing system according to any one of the Supplementary Notes 20 to 29, wherein the imaging apparatus includes:

a first optical system that is configured to form an intermediate image;

an index plate that is disposed at a position at which the intermediate image is formed;

a second optical system that is configured to form an image of the index plate; and an imaging element that is disposed at a position at which the image of the index plate is formed.

[Supplementary Note 31]

A processing system that is configured to process an object, wherein the processing system includes:

a placing apparatus on which the object is placed;

a processing apparatus that is configured to process the object by irradiating the object with an energy beam; and an imaging apparatus that is disposed in the placing apparatus and that is configured to capture an image of the energy beam.

[Supplementary Note 32]

A processing system that is configured to process an object, wherein the processing system includes:

a placing apparatus on which the object is placed;

a processing apparatus that is configured to process the object by irradiating the object with an energy beam; and an imaging apparatus that is configured to capture an image of the energy beam from the placing apparatus side relative to the processing apparatus.

[Supplementary Note 33]

The processing system according to the Supplementary Note 32 or 33 further including a control apparatus that is configured to control an irradiation position of the energy beam based on an captured result by the imaging apparatus.

[Supplementary Note 34]

The processing system according to any one of the Supplementary Notes 31 to 33, wherein the imaging apparatus includes:

a first optical system that is configured to form an intermediate image;

an index plate that is disposed at a position at which the intermediate image is formed;

a second optical system that is configured to form an image of the index plate; and an imaging element that is disposed at a position at which the image of the index plate is formed.

[Supplementary Note 35]

A processing system that is configured to process an object by irradiating the object with an energy beam from a beam source, wherein the processing system comprises:

a placing apparatus on which the object is placed so as to be movable;

an irradiation apparatus that is configured to irradiate the object with the energy beam and that includes an emitting direction change member configured to change an emitting direction of the energy beam;

a beam measurement apparatus that is configured to measure the emitting direction of the energy beam; and a control apparatus that is configured to control the emitting direction change member based on a measured result of the energy beam by the beam measurement apparatus.

[Supplementary Note 36]

The processing system according to the Supplementary Note 35, wherein the beam measurement apparatus includes:

a beam passing member having an attenuation area in which the energy beam is attenuated and a passing area through which the energy beam is allowed to pass; and a light reception part that is configured to optically receive the energy beam that has passed through the passing area.

[Supplementary Note 37]

The processing system according to the Supplementary Note 36, wherein the beam measurement apparatus is configured to measure the emitting direction of the beam a plurality of times while changing a distance between the irradiation apparatus and the passing area.

[Supplementary Note 38]

The processing system according to any one of the Supplementary Notes 35 to 37, wherein the irradiation apparatus includes a condensing optical system that is configured to condense the energy beam, the emitting direction change member is disposed between the beam source and the condensing optical system so as to be rotatable.

[Supplementary Note 39]

The processing system according to the Supplementary Note 39, wherein the emitting direction change member is disposed at a position that is away from an incident pupil position of the condensing optical system.

[Supplementary Note 40]

The processing system according to the Supplementary Note 38 or 39, wherein the irradiation apparatus includes an irradiation position movement member that is disposed between the beam source and the condensing optical system so as to be rotatable and that is configured to move an irradiation position of the energy beam.

[Supplementary Note 41]

The processing system according to the Supplementary Note 40, wherein a distance between an incident pupil of the condensing optical system and the emitting direction change member is longer than a distance between the incident pupil and the irradiation position movement member.

The features of each example embodiment described above may be appropriately combined with each other. A part of the features of each example embodiment described above may not be used. Moreover, the disclosures of all publications and United States patents related to an apparatus and the like cited in each embodiment described above are incorporated in the disclosures of the present application by reference if it is legally permitted.

The present invention is not limited to the above described examples and is allowed to be changed, if desired, without departing from the essence or spirit of the invention which can be read from the claims and the entire specification, and a processing system and a measurement member, which involve such changes, are also intended to be within the technical scope of the present invention.

DESCRIPTION OF REFERENCE CODES

1 processing apparatus
12 processing head
2 measurement apparatus
21 measurement head
3 stage apparatus
32 stage
35 light reception apparatus
351 beam passing member
352 light reception element
4 control apparatus
EL processing light
SYS processing system

The invention claimed is:

1. A processing system that is configured to process an object by irradiating the object with an energy beam, wherein the processing system comprises:

a placing apparatus on which the object is placed;

an irradiation apparatus that is configured to irradiate the object with the energy beam;

a light reception apparatus that includes: a beam passing member having an attenuation area in which the energy beam is attenuated and a passing area through which the energy beam is allowed to pass; and a light reception part that is configured to optically receive the energy beam that has passed through the passing area; and a cover member that is attached to the light reception apparatus and that covers the passing area and is configured to separate a first space that includes the light reception part from a second space through which the energy beam passes before reaching the first space.

2. The processing system according to claim 1, wherein the cover member is movable between a first position at which the passing area is covered and a second position at which the passing area is not covered.

3. The processing system according to claim 2, wherein the cover member is located at the first position when the object is irradiated with the energy beam, and the cover member is located at the second position when the light reception part optically receives the energy beam.

4. The processing system according to claim 2, wherein the beam passing member is disposed in a hole formed in the placing apparatus, and the cover member and the beam passing member form the first space in the hole when the cover member is located at the first position.

5. The processing system according to claim 4, further comprising a gas supply apparatus that is configured to supply a gas into the first space in the hole.

6. The processing system according to claim 5, wherein the cover member is moved by using the gas from the gas supply apparatus.

7. The processing system according to claim 2, wherein the beam passing member is separated from the second space through which the energy beam passes when the cover member is located at the first position.

8. The processing system according to claim 1, further comprising a gas supply apparatus that is configured to supply a gas into the first space at the irradiation apparatus side of the beam passing member.

9. The processing system according to claim 8, wherein the gas supply apparatus is configured to prevent a substance from being adhered to at least a part of the passing area by supplying the gas.

10. The processing system according to claim 8, wherein the gas supply apparatus is configured to remove a substance adhered to at least a part of the passing area by supplying the gas.

11. The processing system according to claim 1, further comprising a measurement apparatus that is configured to measure the object by a measurement beam, wherein the beam passing member includes a mark that is measured by the measurement apparatus, and the cover member covers the mark.

12. The processing system according to claim 1, wherein the beam passing member includes the attenuation area and a plurality of passing areas.

13. The processing system according to claim 12, wherein a relative position of the energy beam, with which the beam passing member is irradiated, relative to the beam passing member changes along a direction along which the plurality of passing areas are arranged.

14. The processing system according to claim 12, wherein a size of an area that is irradiated with the energy beam on the beam passing member by the irradiation apparatus is larger than a pitch of the passing areas in a direction along which the plurality of passing areas are arranged.

15. The processing system according to claim 12, wherein a size of an area that is irradiated with the energy beam on the beam passing member by the irradiation apparatus is equal to or smaller than a pitch of the passing areas in a direction along which the plurality of passing areas are arranged.

16. The processing system according to claim 12, wherein the irradiation apparatus is configured to emit the energy beam so that, in at least a part of a period during which the energy beam that passes through one passing area of the plurality of passing areas reaches the light reception part, the energy beam that passes through another one passing area of the plurality of passing areas, which is different from the one passing area, reaches the light reception part.

17. The processing system according to claim 1, wherein the processing system further comprises:

a measurement apparatus that is configured to measure at least one of the object and at least a part of the light reception apparatus;

a movement apparatus that is configured to move the placing apparatus;

an obtaining apparatus that is configured to obtain an information related to a position of the placing apparatus; and a control apparatus that is configured to control the movement apparatus, at least a part of the light reception apparatus is disposed in the placing apparatus, and the control apparatus is configured to:

move the placing apparatus to a measurement allowable position at which the measurement apparatus is allowed to measure at least a part of the light reception apparatus;

obtain, by using the obtaining apparatus, a measurement position information related to the position of the placing apparatus that has moved to the measurement allowable position; and control the position of the placing apparatus based on the measurement position information.

18. The processing system according to claim 1, wherein the processing system further comprises:

a measurement apparatus that is configured to measure at least one of the object and at least a part of the light reception apparatus;

a movement apparatus that is configured to move the placing apparatus;

an obtaining apparatus that is configured to obtain an information related to the position of the placing apparatus; and a control apparatus that is configured to control the movement apparatus, at least a part of the light reception apparatus is disposed in the placing apparatus, and the control apparatus is configured to:

move the placing apparatus to a irradiation allowable position at which the irradiation apparatus is allowed to irradiate at least a part of the light reception apparatus with the energy beam;

obtain, by using the obtaining apparatus, an irradiation position information related to the position of the placing apparatus that has moved to the irradiation allowable position; and control the position of the placing apparatus based on the irradiation position information.

19. A processing system that is configured to process an object by irradiating the object with an energy beam, wherein the processing system comprises:

a placing apparatus on which the object is placed;

an irradiation apparatus that is configured to irradiate the object with the energy beam;

a light reception apparatus that includes: a beam passing member having an attenuation area in which the energy beam is attenuated and a passing area through which the energy beam is allowed to pass; and a light reception part that is configured to optically receive the energy beam that has passed through the passing area; and a cover member that covers the passing area, the cover member is movable between a first position at which the passing area is covered and a second position at which the passing area is not covered, the beam passing member is disposed in a hole formed in the placing apparatus, the cover member and the beam passing member form a space in the hole when the cover member is located at the first position, and the processing system further comprises a gas supply apparatus that is configured to supply a gas into the space in the hole.

20. A processing system that is configured to process an object by irradiating the object with an energy beam, wherein the processing system comprises:

a placing apparatus on which the object is placed;

an irradiation apparatus that is configured to irradiate the object with the energy beam;

a light reception apparatus that includes: a beam passing member having an attenuation area in which the energy beam is attenuated and a passing area through which the energy beam is allowed to pass; and a light reception part that is configured to optically receive the energy beam that has passed through the passing area;

a cover member that covers the passing area; and a measurement apparatus that is configured to measure the object by a measurement beam, the beam passing member includes a mark that is measured by the measurement apparatus, and the cover member covers the mark.

21. A processing system that is configured to process an object by irradiating the object with an energy beam, wherein the processing system comprises:

a placing apparatus on which the object is placed;

an irradiation apparatus that is configured to irradiate the object with the energy beam;

a light reception apparatus that includes: a beam passing member having an attenuation area in which the energy beam is attenuated and a passing area through which the energy beam is allowed to pass; and a light reception part that is configured to optically receive the energy beam that has passed through the passing area;

a cover member that covers the passing area;

a measurement apparatus that is configured to measure at least one of the object and at least a part of the light reception apparatus;

a movement apparatus that is configured to move the placing apparatus;

an obtaining apparatus that is configured to obtain an information related to a position of the placing apparatus; and a control apparatus that is configured to control the movement apparatus, at least a part of the light reception apparatus is disposed in the placing apparatus, the control apparatus is configured to:

move the placing apparatus to a measurement allowable position at which the measurement apparatus is allowed to measure at least a part of the light reception apparatus;

obtain, by using the obtaining apparatus, a measurement position information related to the position of the placing apparatus that has moved to the measurement allowable position; and control the position of the placing apparatus based on the measurement position information.

22. A processing system that is configured to process an object by irradiating the object with an energy beam, wherein the processing system comprises:

a placing apparatus on which the object is placed;

an irradiation apparatus that is configured to irradiate the object with the energy beam;

a light reception apparatus that includes: a beam passing member having an attenuation area in which the energy beam is attenuated and a passing area through which the energy beam is allowed to pass; and a light reception part that is configured to optically receive the energy beam that has passed through the passing area;

a cover member that covers the passing area;

a measurement apparatus that is configured to measure at least one of the object and at least a part of the light reception apparatus;

a movement apparatus that is configured to move the placing apparatus;

an obtaining apparatus that is configured to obtain an information related to the position of the placing apparatus; and a control apparatus that is configured to control the movement apparatus, at least a part of the light reception apparatus is disposed in the placing apparatus, the control apparatus is configured to:

move the placing apparatus to a irradiation allowable position at which the irradiation apparatus is allowed to irradiate at least a part of the light reception apparatus with the energy beam;

obtain, by using the obtaining apparatus, an irradiation position information related to the position of the placing apparatus that has moved to the irradiation allowable position; and control the position of the placing apparatus based on the irradiation position information.

23. The processing system according to claim 1, wherein the light reception apparatus is disposed on the placing apparatus.

24. A processing system that is configured to process an object by irradiating the object with an energy beam, wherein the processing system comprises:

a placing apparatus on which the object is placed;

an irradiation apparatus that is configured to irradiate the object with the energy beam;

a light reception apparatus that is disposed on the placing apparatus and includes: a beam passing member having an attenuation area in which the energy beam is attenuated and a passing area through which the energy beam is allowed to pass; and a light reception part that is configured to optically receive the energy beam that has passed through the passing area; and a cover member that is provided on the placing apparatus and that covers the passing area and is configured to separate a first space that includes the light reception part from a second space through which the energy beam passes.

* * * * *